(12) United States Patent
Ulyanov et al.

(10) Patent No.: US 6,950,712 B2
(45) Date of Patent: *Sep. 27, 2005

(54) SYSTEM AND METHOD FOR NONLINEAR DYNAMIC CONTROL BASED ON SOFT COMPUTING WITH DISCRETE CONSTRAINTS

(75) Inventors: Sergei V. Ulyanov, Crema (IT); Sergei Panfilov, Crema (IT); Kazuki Takahashi, Crema (IT)

(73) Assignee: Yamaha Hatsudoki Kabushiki Kaisha (JP)

(*) Notice: Subject to any disclaimer, the term of this patent is extended or adjusted under 35 U.S.C. 154(b) by 363 days.

This patent is subject to a terminal disclaimer.

(21) Appl. No.: 10/209,671

(22) Filed: Jul. 30, 2002

(65) Prior Publication Data

US 2004/0030420 A1 Feb. 12, 2004

(51) Int. Cl.[7] ............ G06F 9/00; G05B 13/80
(52) U.S. Cl. ............ 700/28; 700/31; 700/50; 701/40; 701/44; 701/57; 701/77; 706/2; 706/4; 706/13
(58) Field of Search .............. 700/28–31, 47–50; 701/37, 40, 44, 57, 59, 77, 98, 106; 706/2, 4, 13

(56) References Cited

U.S. PATENT DOCUMENTS

| | | | | |
|---|---|---|---|---|
| 5,126,933 A | * | 6/1992 | White, III | 700/47 |
| 5,175,678 A | * | 12/1992 | Frerichs et al. | 700/47 |
| 5,285,377 A | * | 2/1994 | Sugasaka et al. | 700/47 |
| 5,993,194 A | * | 11/1999 | Lemelson et al. | 431/14 |
| 6,032,139 A | * | 2/2000 | Yamaguchi et al. | 706/13 |
| 6,078,843 A | * | 6/2000 | Shavit | 700/48 |
| 6,212,466 B1 | * | 4/2001 | Ulyanov et al. | 701/99 |
| 6,216,083 B1 | * | 4/2001 | Ulyanov et al. | 701/106 |
| 6,349,293 B1 | * | 2/2002 | Yamaguchi | 706/2 |
| 6,411,944 B1 | * | 6/2002 | Ulyanov | 706/13 |
| 6,415,272 B1 | * | 7/2002 | Ulyanov | 706/2 |
| 6,463,371 B1 | * | 10/2002 | Ulyanov et al. | 701/40 |
| 6,496,761 B1 | * | 12/2002 | Ulyanov et al. | 701/37 |
| 6,549,830 B2 | * | 4/2003 | Harada et al. | 701/21 |
| 6,701,236 B2 | * | 3/2004 | Ulyanov et al. | 701/40 |
| 6,721,718 B2 | * | 4/2004 | Ulyanov | 706/2 |
| 6,735,576 B1 | * | 5/2004 | Kaji et al. | 706/1 |

OTHER PUBLICATIONS

"Design of sophisticated fuzzy logic controllers using genetic algorithms", Ng et al., Proceedings of the Third IEEE Conference on Fuzzy Systems, IEEE World Congress on Computational Intelligence, Jun. 26–29, 1994, pps. 1708–1712, vol. 3.*

(Continued)

*Primary Examiner*—Emanuel Todd Voeltz
(74) *Attorney, Agent, or Firm*—Knobbe Martens Olson & Bear LLP

(57) ABSTRACT

A control system using a genetic analyzer based on discrete constraints is described. In one embodiment, a genetic algorithm with step-coded chromosomes is used to develop a teaching signal that provides good control qualities for a controller with discrete constraints, such as, for example, a step-constrained controller. In one embodiment, the control system uses a fitness (performance) function that is based on the physical laws of minimum entropy. In one embodiment, the genetic analyzer is used in an off-line mode to develop a teaching signal for a fuzzy logic classifier system that develops a knowledge base. The teaching signal can be approximated online by a fuzzy controller that operates using knowledge from the knowledge base. The control system can be used to control complex plants described by nonlinear, unstable, dissipative models. In one embodiment, the step-constrained control system is configured to control stepping motors.

58 Claims, 42 Drawing Sheets

OTHER PUBLICATIONS

"Fuzzy controllers for semi–active suspension system generated through genetic algorithms", Hashiyama et al., IEEE International Conference on Systems, Man and Cybernetics, Oct. 22–25, 1995, pps. 4361–4366, vol. 5.*

"Genetic algorithm–based optimization of fuzzy logic controller using characteristic parameters", Park et al., IEEE International Conference on Evolutionary Computation, Nov. 29–Dec. 1, 1995, pps. 831–836, vol. 2.*

"Learning systems in intelligent control: an appraisal of fuzzy, neural and genetic algorithm control applications", Linkens et al., IEE Proceedings–Control Theory and Applications, Jul. 1996, pps. 367–386, vol. 4, Issue 4.*

"Some applications of soft computing methods in system modelling and control", Lantos, International Conference on Intelligent Engineering Systems, Sep. 15–17, 1997, pps. 469–474.*

"Tuning of a neuro–fuzzy controller by gentic algorithm", Seng et al., IEEE Transactions on Systems, Man and Cybernetics, Apr. 1999, pps. 226–236, vol. 29, Issue 2.*

"GA optimisation of rule based in a fuzzy logic control of a solar power plant", Luk et al., International Conference on Electric Utility Deregulation and Restructuring and Power Technologies, Apr. 4–7, 2000, pps. 221–225.*

"Design of high performance fuzzy controllers using flexible parameterized memebership functions and intelligent genetic algorithms", Ho et al., Proceedings of the 2002 Congress on Evolutionary Computation, May 12–17, 2002, pps. 1378–1383, vol. 2.*

* cited by examiner

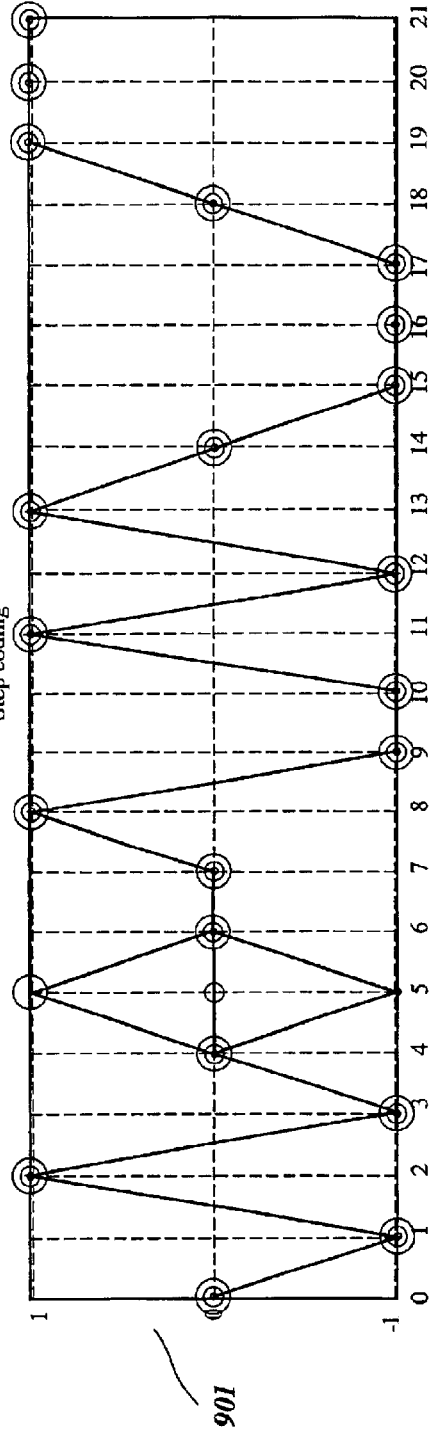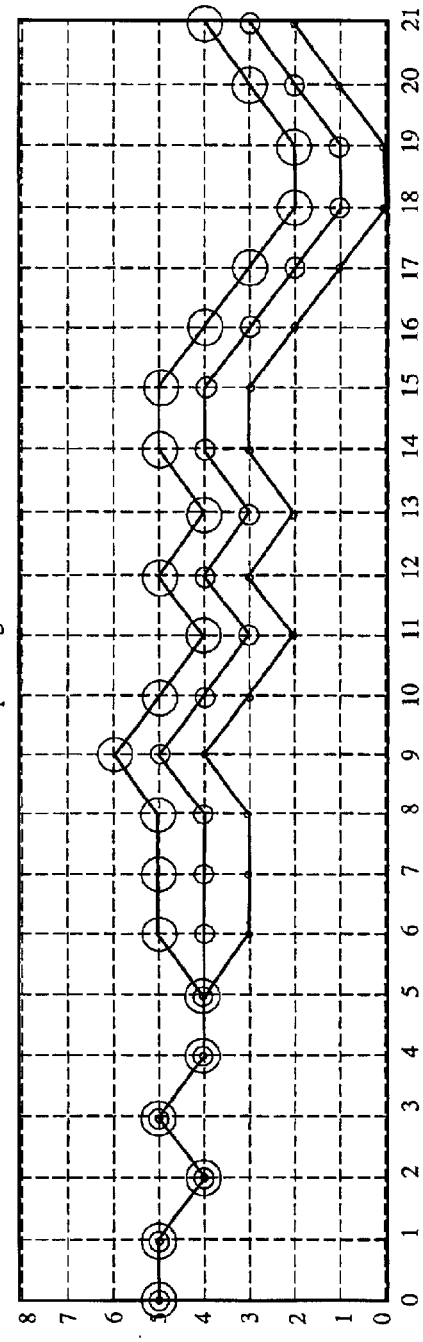
Figure 9A
Figure 9B

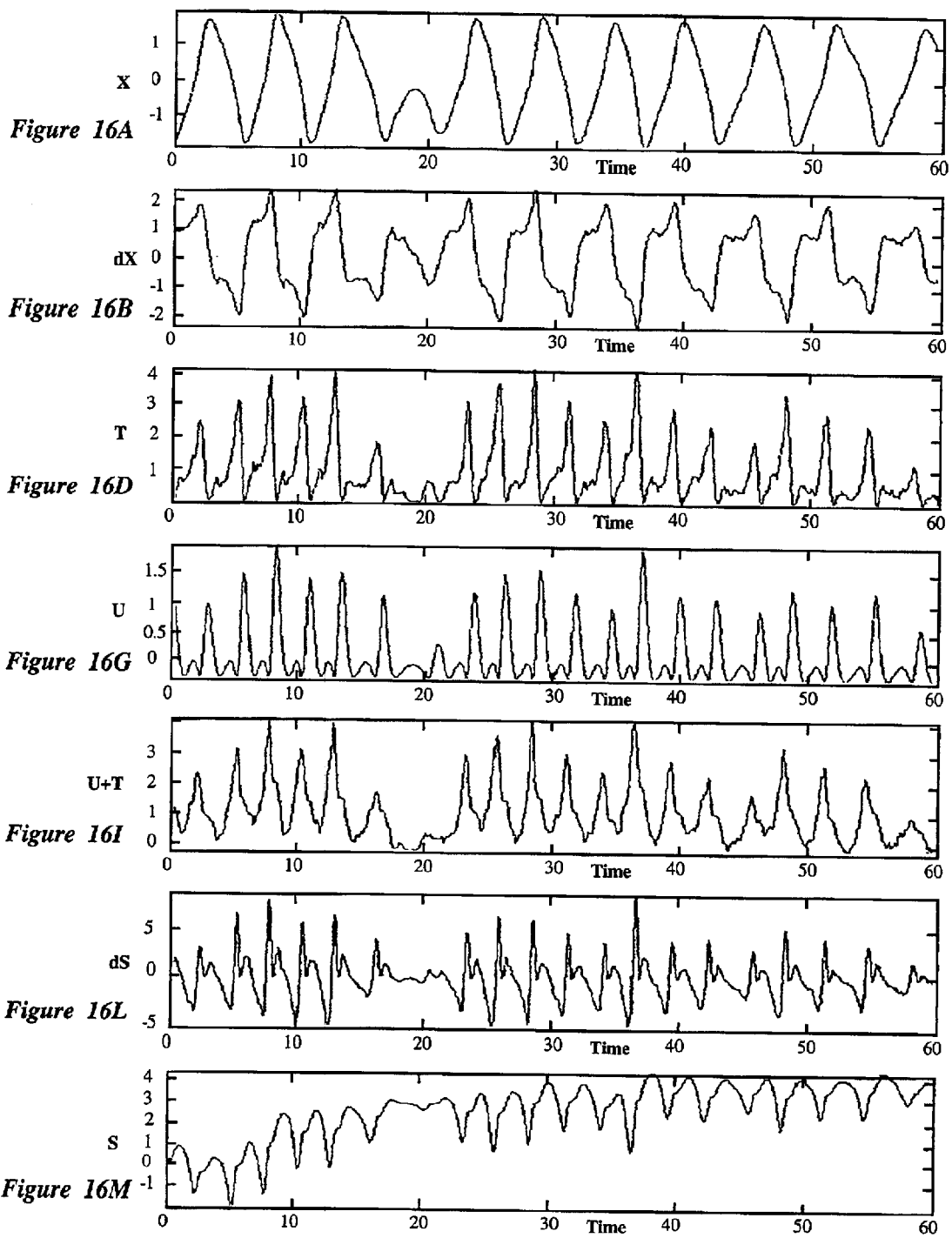

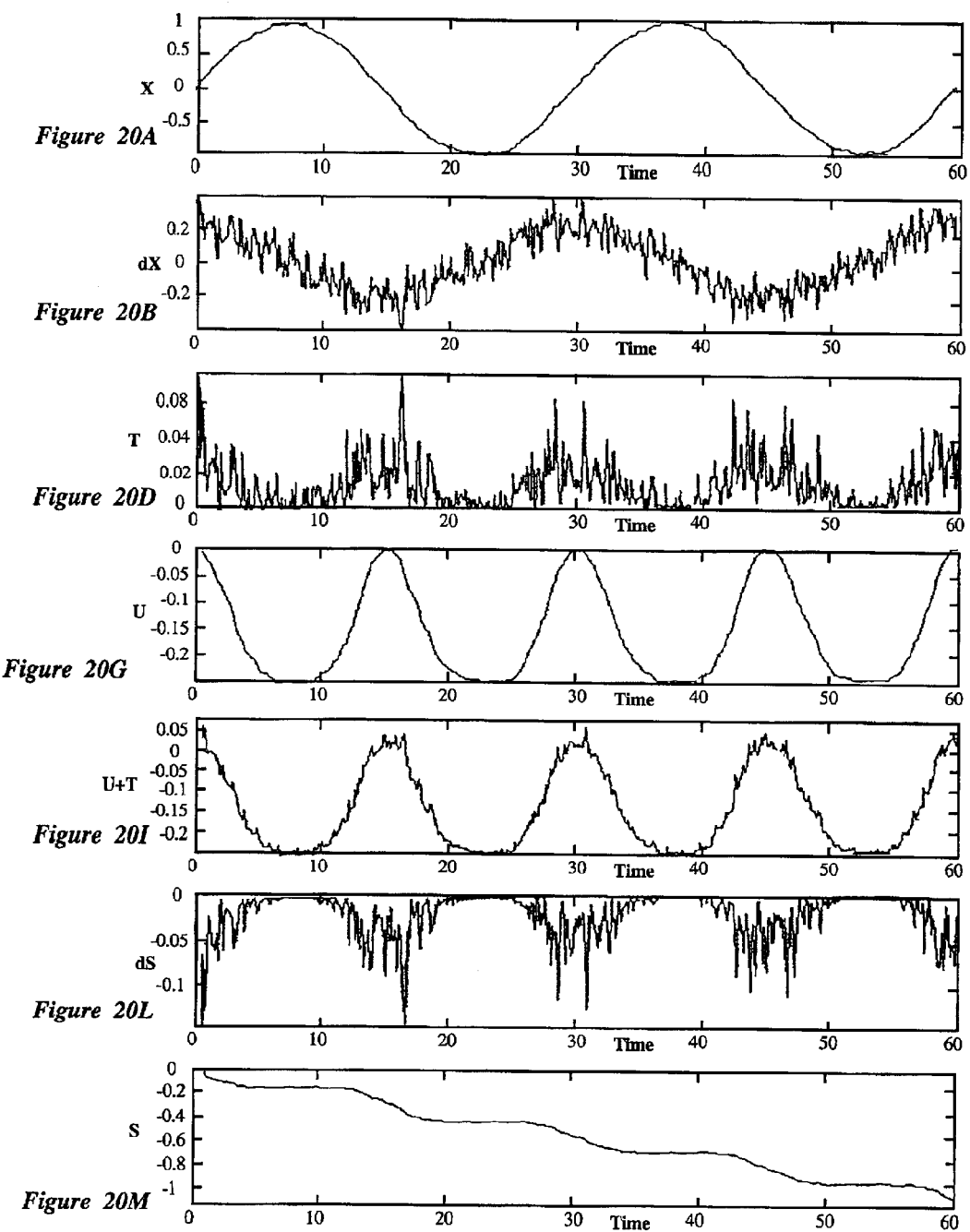

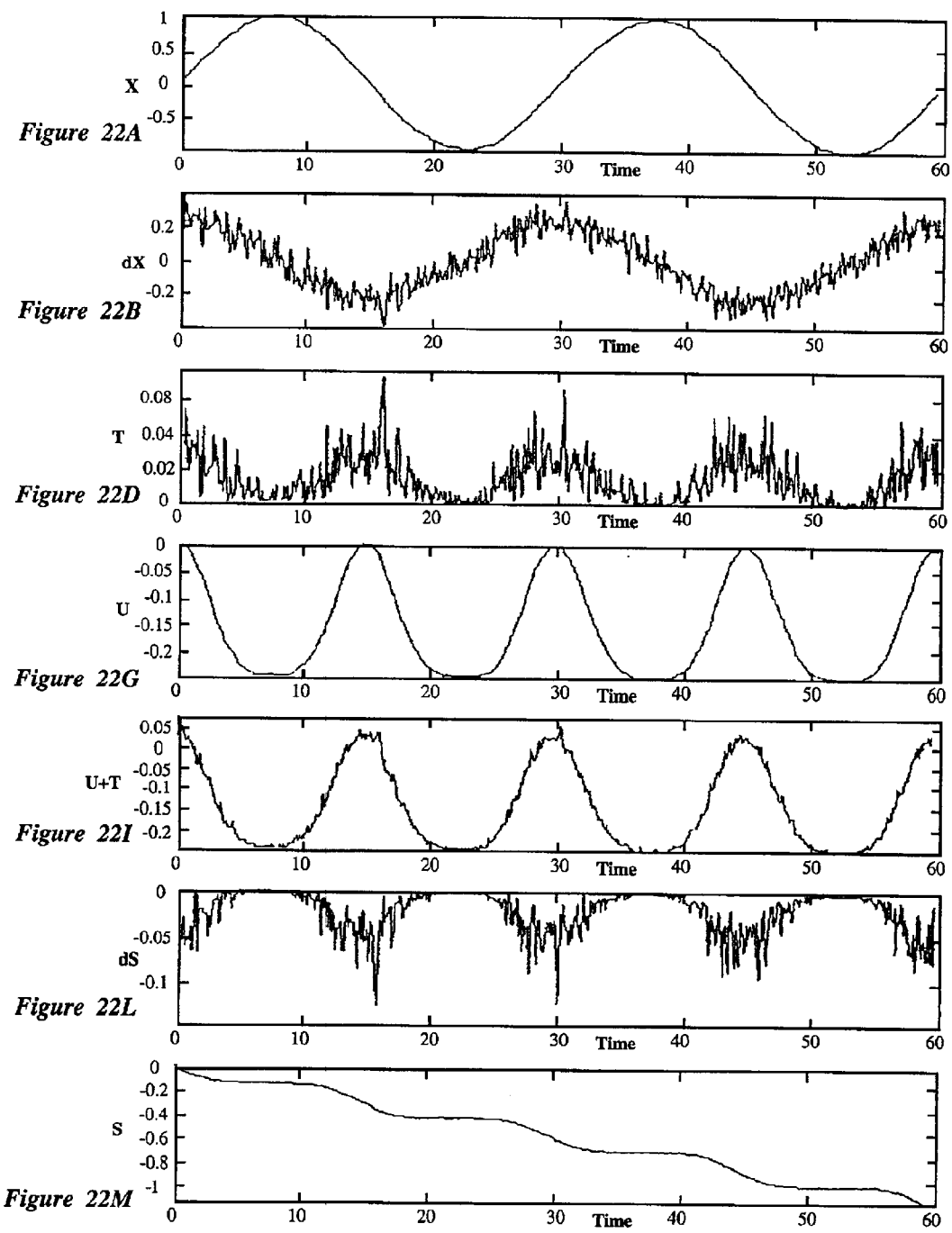

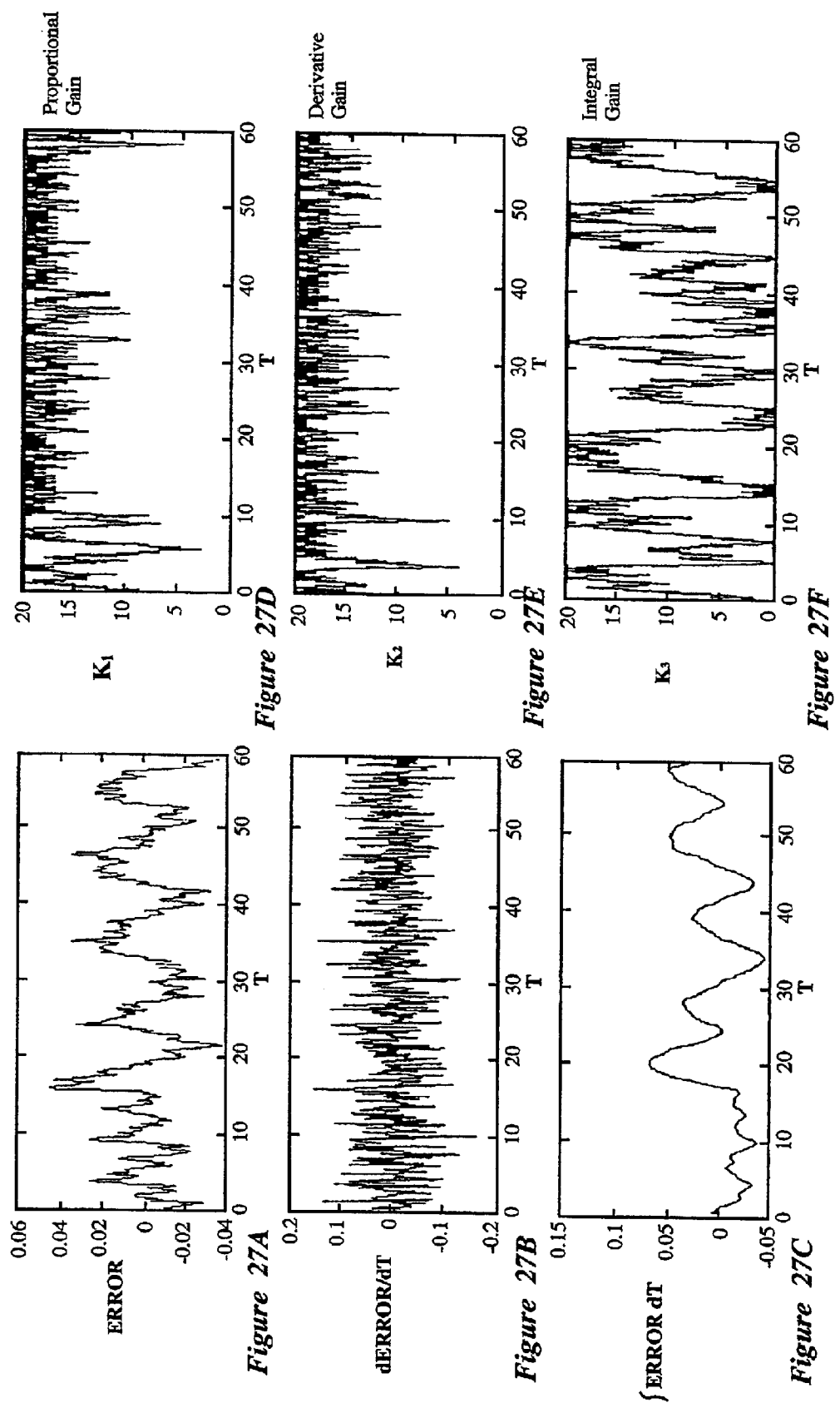

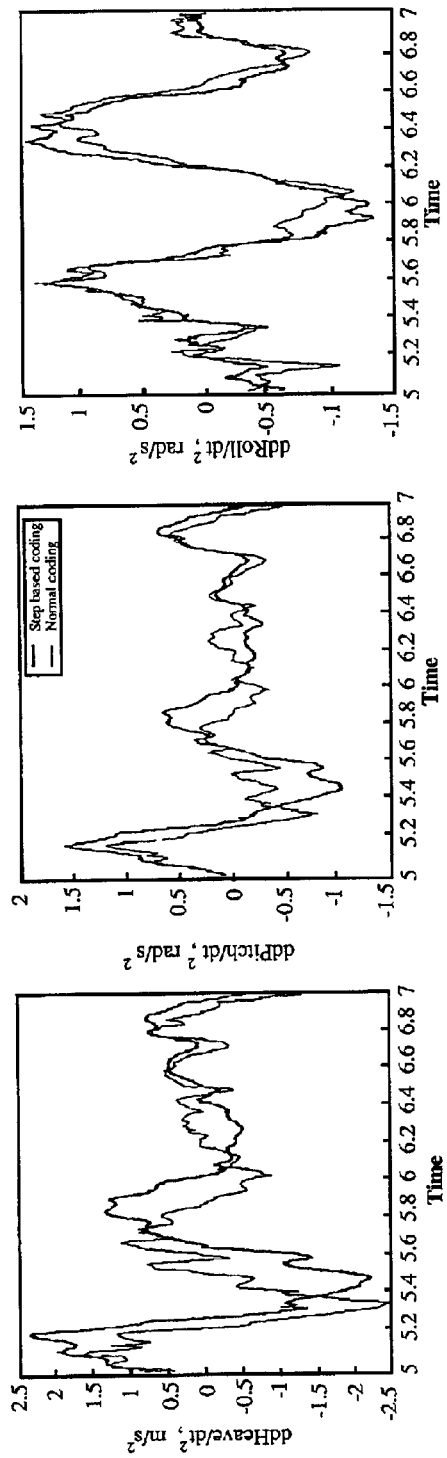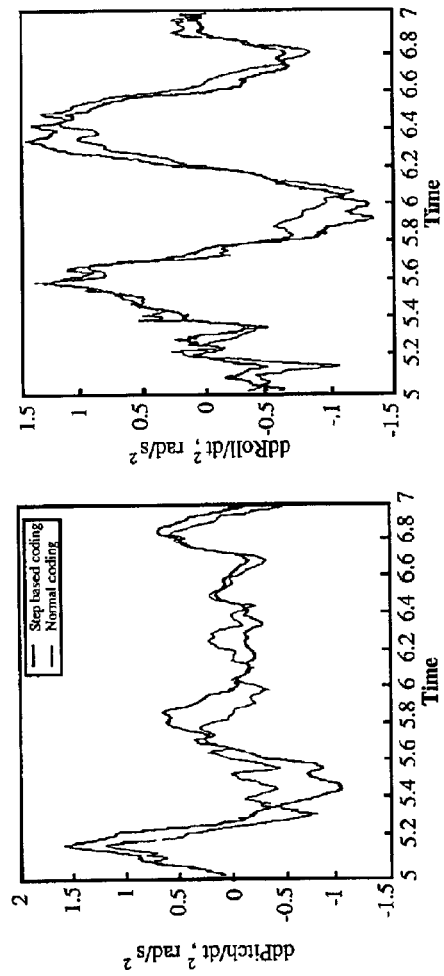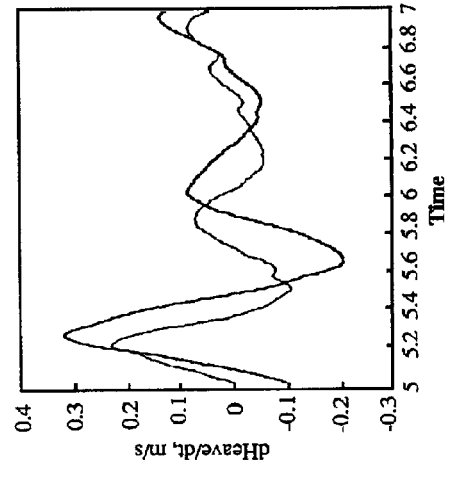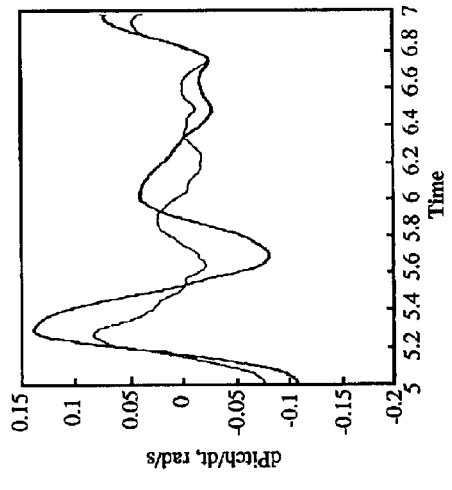
Figure 32A
Figure 32B
Figure 32C
Figure 32D
Figure 32E
Figure 32F

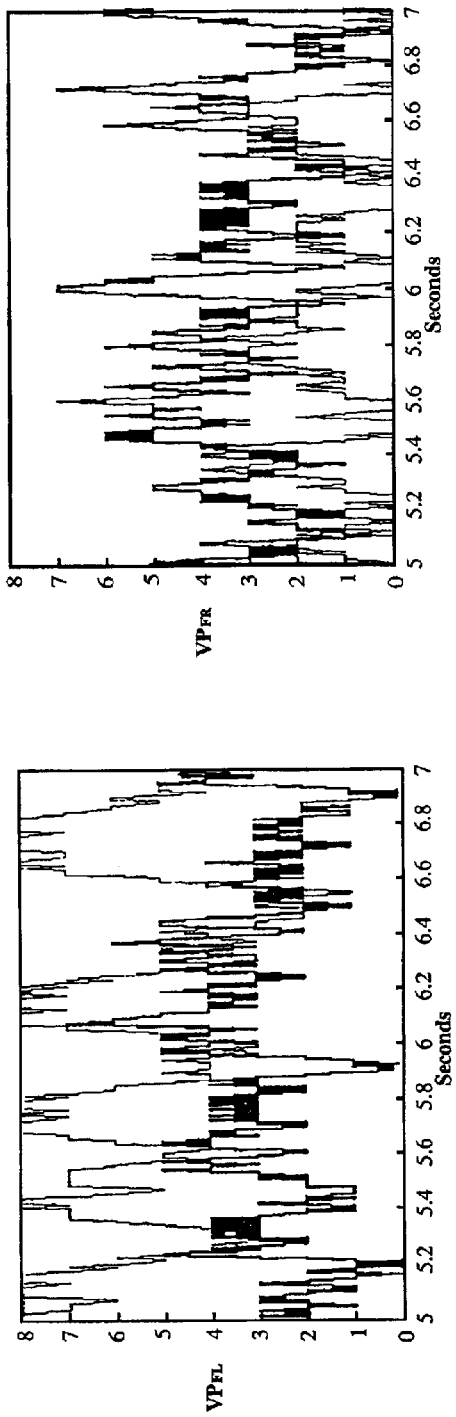
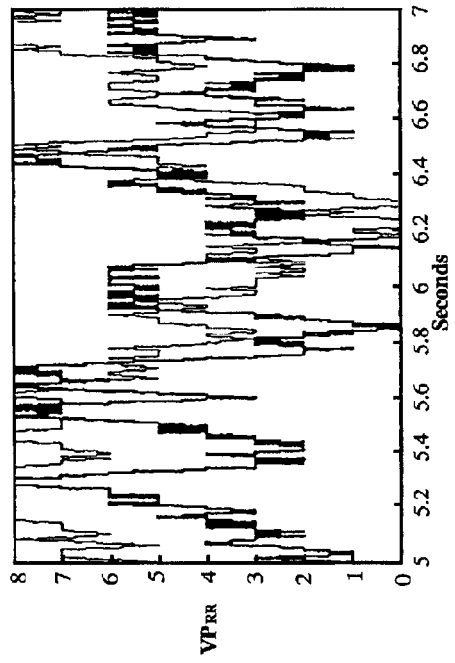
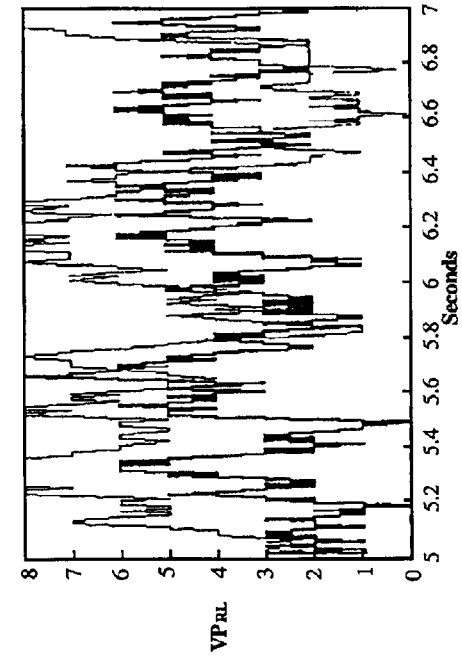

oil flow in each rotary valve position

SYSTEM AND METHOD FOR NONLINEAR DYNAMIC CONTROL BASED ON SOFT COMPUTING WITH DISCRETE CONSTRAINTS

BACKGROUND OF THE INVENTION

1. Field of the Invention

The invention relates in generally to nonlinear electronic control system optimization.

2. Description of the Related Art

Feedback control systems are widely used to maintain the output of a dynamic system at a desired value in spite of external disturbances that would displace it from the desired value. For example, a household space-heating furnace, controlled by a thermostat, is an example of a feedback control system. The thermostat continuously measures the air temperature inside the house, and when the temperature falls below a desired minimum temperature the thermostat turns the furnace on. When the interior temperature reaches the desired minimum temperature, the thermostat turns the furnace off. The thermostat-furnace system maintains the household temperature at a substantially constant value in spite of external disturbances such as a drop in the outside temperature. Similar types of feedback controls are used in many applications.

A central component in a feedback control system is a controlled object, a machine or a process that can be defined as a "plant", whose output variable is to be controlled. In the above example, the "plant" is the house, the output variable is the interior air temperature in the house and the disturbance is the flow of heat (dispersion) through the walls of the house. The plant is controlled by a control system. In the above example, the control system is the thermostat in combination with the furnace. The thermostat-furnace system uses simple on-off feedback control system to maintain the temperature of the house. In many control environments, such as motor shaft position or motor speed control systems, simple on-off feedback control is insufficient. More advanced control systems rely on combinations of proportional feedback control, integral feedback control, and derivative feedback control. A feedback control based on a sum of proportional feedback, plus integral feedback, plus derivative feedback, is often referred as a PID control.

A PID control system is a linear control system that is based on a dynamic model of the plant. In classical control systems, a linear dynamic model is obtained in the form of dynamic equations, usually ordinary differential equations. The plant is assumed to be relatively linear, time invariant, and stable. However, many real-world plants are time varying, highly non-linear, and unstable. For example, the dynamic model may contain parameters (e.g., masses, inductance, aerodynamics coefficients, etc.), which are either only approximately known or depend on a changing environment. If the parameter variation is small and the dynamic model is stable, then the PID controller may be satisfactory. However, if the parameter variation is large or if the dynamic model is unstable, then it is common to add adaptive or intelligent (AI) control functions to the PID control system.

AI control systems use an optimizer, typically a non-linear optimizer, to program the operation of the PID controller and thereby improve the overall operation of the control system.

Classical advanced control theory is based on the assumption that near of equilibrium points all controlled "plants" can be approximated as linear systems. Unfortunately, this assumption is rarely true in the real world. Most plants are highly nonlinear, and often do not have simple control algorithms. In order to meet these needs for a nonlinear control, systems have been developed that use soft computing concepts such as genetic algorithms (GA), fuzzy neural networks (FNN), fuzzy controllers and the like. By these techniques, the control system evolves (changes) in time to adapt itself to changes that may occur in the controlled "plant" and/or in the operating environment.

Many controlled plants must be moved from one control state to another control state in a stepwise fashion. For example, a stepping motor moves by stepping in controlled increments and cannot be arbitrarily moved from a first shaft position to a second shaft position without stepping through all shaft positions in between the first shaft position and the second shaft position. Prior art control systems based on soft computing with genetic analyzer are not necessarily well suited for plants that must be changed or controlled in a stepwise fashion, in part because of the operation of the genetic analyzer. The chromosomes of a genetic analyzer are typically coded with the values of one or more control parameters used to control the plant. The genetic optimizer finds new control parameters without regard to the value of the previous control parameters or the constraints imposed by the plant in moving from the previous control parameters to the new control parameters.

SUMMARY

The present invention solves these and other problems by providing a genetic analyzer based on discrete constraints. In one embodiment, a Genetic Algorithm with step-coded chromosomes is used to develop a teaching signal that provides good control qualities for a controller with discrete constraints, such as, for example, a step-constrained controller. The step-coded chromosomes are chromosomes where at least a portion of the chromosome is constrained to a stepwise alphabet. The step-coded chromosome can also have portion which are position coded (i.e., coded in a relatively more continuous manner that is not stepwise constrained).

In one embodiment, the control system uses a fitness (performance) function that is based on the physical laws of minimum entropy. In one embodiment, the genetic analyzer is used in an off-line mode to develop a teaching signal for a fuzzy logic classifier system that develops a knowledge base. The teaching signal can be approximated online by a fuzzy controller that operates using knowledge from the knowledge base. The control system can be used to control complex plants described by nonlinear, unstable, dissipative models. In one embodiment, the step-constrained control system is configured to control stepping motors, stepwise actuators, or other step-constrained systems.

In one embodiment, the control system comprises a learning system, such as a neural network that is trained by a genetic analyzer. The genetic analyzer uses a fitness function that maximizes sensor information while minimizing entropy production.

In one embodiment, a suspension control system uses a difference between the time differential (derivative) of entropy from the learning control unit and the time differential of the entropy inside the controlled process (or a model of the controlled process) as a measure of control performance. In one embodiment, the entropy calculation is based on a thermodynamic model of an equation of motion for a controlled process plant that is treated as an open dynamic system.

The control system is trained by a genetic analyzer that generates a teaching signal for each solution space. The optimized control system provides an optimum control signal based on data obtained from one or more sensors. For example, in a suspension system, a plurality of angle and position sensors can be used. In an off-line learning mode (e.g., in the laboratory, factory, service center, etc.), fuzzy rules are evolved using a kinetic model (or simulation) of the vehicle and its suspension system. Data from the kinetic model is provided to an entropy calculator that calculates input and output entropy production of the model. The input and output entropy productions are provided to a fitness function calculator that calculates a fitness function as a difference in entropy production rates for the genetic analyzer constrained by one or more constraints. The genetic analyzer uses the fitness function to develop training signals for the off-line control system. Control parameters (in the form of a knowledge base) from the off-line control system are then provided to an online control system in the plant that, using information from the knowledge base, develops a control strategy.

One embodiment includes a method for controlling a nonlinear object (a plant) by obtaining an entropy production difference between a time differentiation ($dS_u/dt$) of the entropy of the plant and a time differentiation ($dS_c/dt$) of the entropy provided to the plant from a controller. A step-coded genetic algorithm that uses the entropy production difference as a fitness (performance) function evolves a control rule in an off-line controller. The nonlinear stability characteristics of the plant are evaluated using a Lyapunov function. The genetic analyzer minimizes entropy and maximizes sensor information content.

In one embodiment, the control method also includes evolving a control rule relative to a variable of the controller by means of a genetic algorithm. The genetic algorithm uses a fitness function based on a difference between a time differentiation of the entropy of the plant ($dS_u/dt$) and a time differentiation ($dS_c/dt$) of the entropy provided to the plant. The variable can be corrected by using the evolved control rule.

In one embodiment, the invention comprises a self-organizing control system adapted to control a nonlinear plant. The control system includes a simulator configured to use a thermodynamic model of a nonlinear equation of motion for the plant. In one embodiment, the thermodynamic model is based on a Lyapunov function (V), and the simulator uses the function V to analyze control for a state stability of the plant. The control system calculates an entropy production difference between a time differentiation of the entropy of the plant ($dS_u/dt$) and a time differentiation ($dS_c/dt$) of the entropy provided to the plant by a low-level controller that controls the plant. The entropy production difference is used by a genetic algorithm to obtain an adaptation function wherein the entropy production difference is minimized in a constrained fashion. The teaching signal is provided to a fuzzy logic classifier that determines one or more fuzzy rules by using a learning process. The fuzzy logic controller is also configured to form one or more control rules that set a control variable of the controller in the vehicle.

In one embodiment, the invention includes a new physical measure of control quality based on minimum production entropy and using this measure for a fitness function of genetic algorithm in optimal control system design. This method provides a local entropy feedback loop in the step-constrained control system. The entropy feedback loop provides for optimal control structure design by relating stability of the plant (using a Lyapunov function) and controllability of the plant (based on production entropy of the step-constrained control system). The stepc-constrained control system is applicable to a wide variety of control systems, including, for example, control systems for mechanical systems, bio-mechanical systems, robotics, electro-mechanical systems, etc.

BRIEF DESCRIPTION OF THE FIGURES

FIG. 9A shows a schemata where gene 5 is a step-coded wildcard.

FIG. 9B shows outputs of a step-coded control system corresponding to the schemata of FIG. 9A.

FIGS. 27A–27F are graphs that show control errors and control signals obtained using the coding method according to Table 2.

FIGS. 32A–32F are graphs that show control, on an interval between 5 and 7 seconds, from FIGS. 30A–30F.

FIGS. 33A–33D are graphs that show control, on the interval between 5 and 7 seconds, from FIGS. 31A–31D.

DETAILED DESCRIPTION

Figure 1:
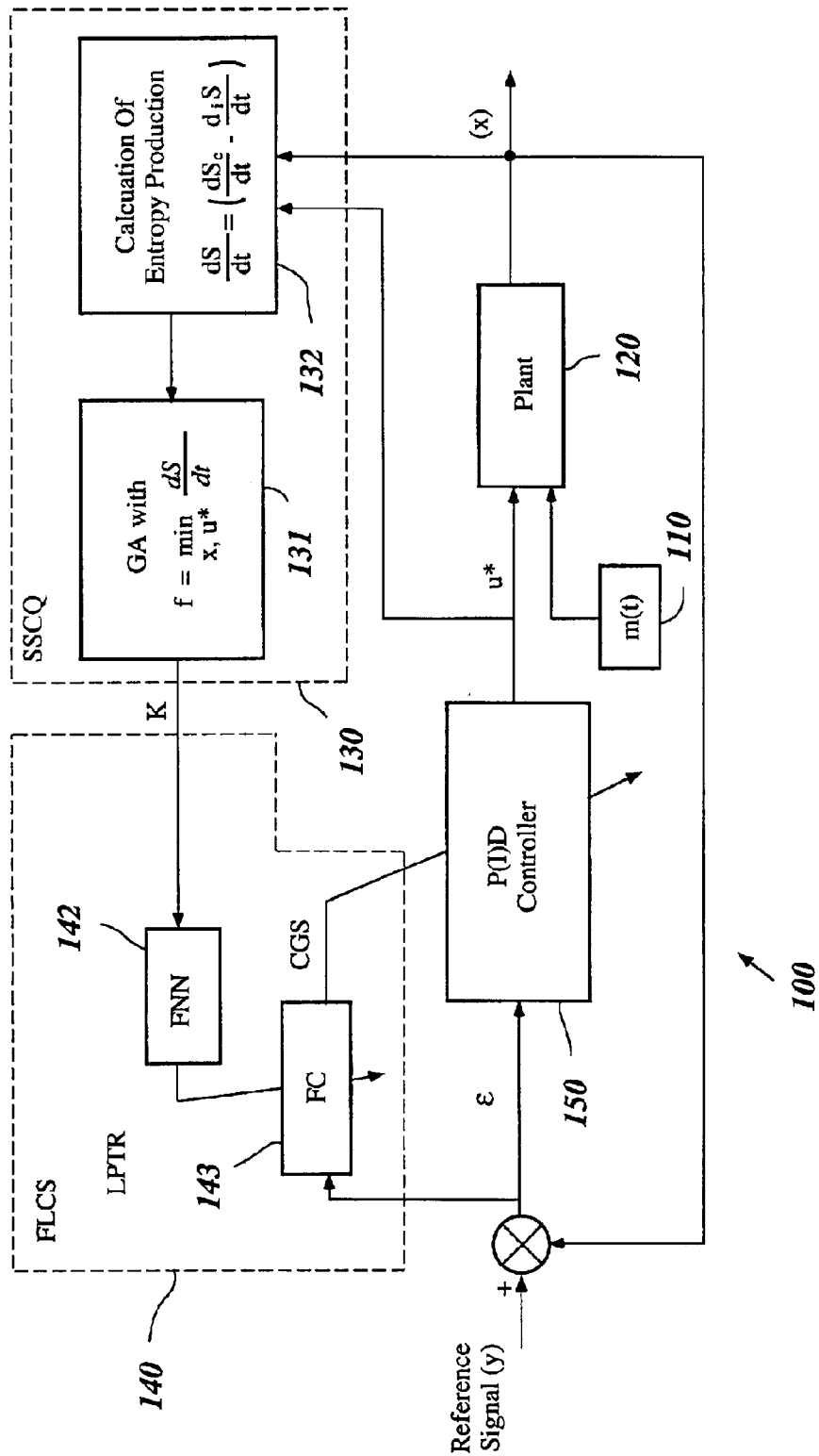
FIG. 1 shows the general Structure of a Self-Organization Intelligent Control System Based on Soft Computing.

FIG. 1 is a block diagram of a control system 100 for controlling a plant based on soft computing. In the controller 100, a reference signal y is provided to a first input of an adder 105. An output of the adder 105 is an error signal $\epsilon$, which is provided to an input of a Fuzzy Controller (FC) 143 and to an input of a Proportional-Integral-Differential (PID) controller 150. An output of the PID controller 150 is a control signal u*, which is provided to a control input of a plant 120 and to a first input of an entropy-calculation module 132. A disturbance m(t) 110 is also provided to an input of the plant 120. An output of the plant 120 is a response x, which is provided to a second input of the entropy-calculation module 132 and to a second input of the adder 105. The second input of the adder 105 is negated such that the output of the adder 105 (the error signal $\epsilon$) is the value of the first input minus the value of the second input.

An output of the entropy-calculation module 132 is provided as a fitness function to a Genetic Analyzer (GA) 131. An output solution from the GA 131 is provided to an input of a FNN 142. An output of the FNN 132 is provided as a knowledge base to the FC 143. An output of the FC 143 is provided as a gain schedule to the PID controller 150.

The GA 131 and the entropy calculation module 132 are part of a Simulation System of Control Quality (SSCQ) 130. The FNN 142 and the FC 143 are part of a Fuzzy Logic Classifier System (FLCS) 140.

Using a set of inputs, and the fitness function 132, the genetic algorithm 131 works in a manner similar to an evolution process to arrive at a solution which is, closer to optimal. The genetic algorithm 131 generates sets of "chromosomes" (that is, possible solutions) and then sorts the chromosomes by evaluating each solution using the fitness function 132. The fitness function 132 determines where each solution ranks on a fitness scale. Chromosomes (solutions) that are more fit, are those which correspond to solutions that rate high on the fitness scale. Chromosomes that are less fit are those which correspond to solutions that rate low on the fitness scale.

Chromosomes that are more fit are kept (survive) and chromosomes that are less fit are discarded (die). New chromosomes are created to replace the discarded chromosomes. The new chromosomes are created by crossing pieces of existing chromosomes and by introducing mutations.

The PID controller 150 has a linear transfer function and thus is based upon a linearized equation of motion for the controlled "plant" 120. Prior art genetic algorithms used to program PID controllers typically use simple fitness functions and thus do not solve the problem of poor controllability typically seen in linearization models. As is the case with most optimizers, the success or failure of the optimization often ultimately depends on the selection of the performance (fitness) function.

Evaluating the motion characteristics of a nonlinear plant is often difficult, in part due to the lack of a general analysis method. Conventionally, when controlling a plant with nonlinear motion characteristics, it is common to find certain equilibrium points of the plant and the motion characteristics of the plant are linearized in a vicinity near an equilibrium point. Control is then based on evaluating the pseudo (linearized) motion characteristics near the equilibrium point. This technique is scarcely, if at all, effective for plants described by models that are unstable or dissipative.

Computation of optimal control based on soft computing includes the GA 131 as the first step of global search for optimal solution on a fixed space of positive solutions. The GA 131 searches for a set of control weights K for the plant. The weight vector $K=\{k_1, \ldots, k_n\}$ is used by a conventional proportional-integral-differential (PID) controller 150 in the generation of the signal $\delta(K)$ which is applied to the plant. The entropy $S(\delta(K))$ associated to the behavior of the plant on this signal is assumed as a fitness function to minimize. The GA 131 is repeated several times at regular time intervals in order to produce a set of weight vectors. The vectors generated by the GA 131 are then provided to the FNN 142 and the output of the FNN 142 to the fuzzy controller 143. The output of the fuzzy controller 143 is a collection of gain schedules for the PID controller 150. For soft computing systems based on GA, there is very often no real control law in the classical control sense, but rather, control is based on a physical control law such as minimum entropy production.

Figure 2:
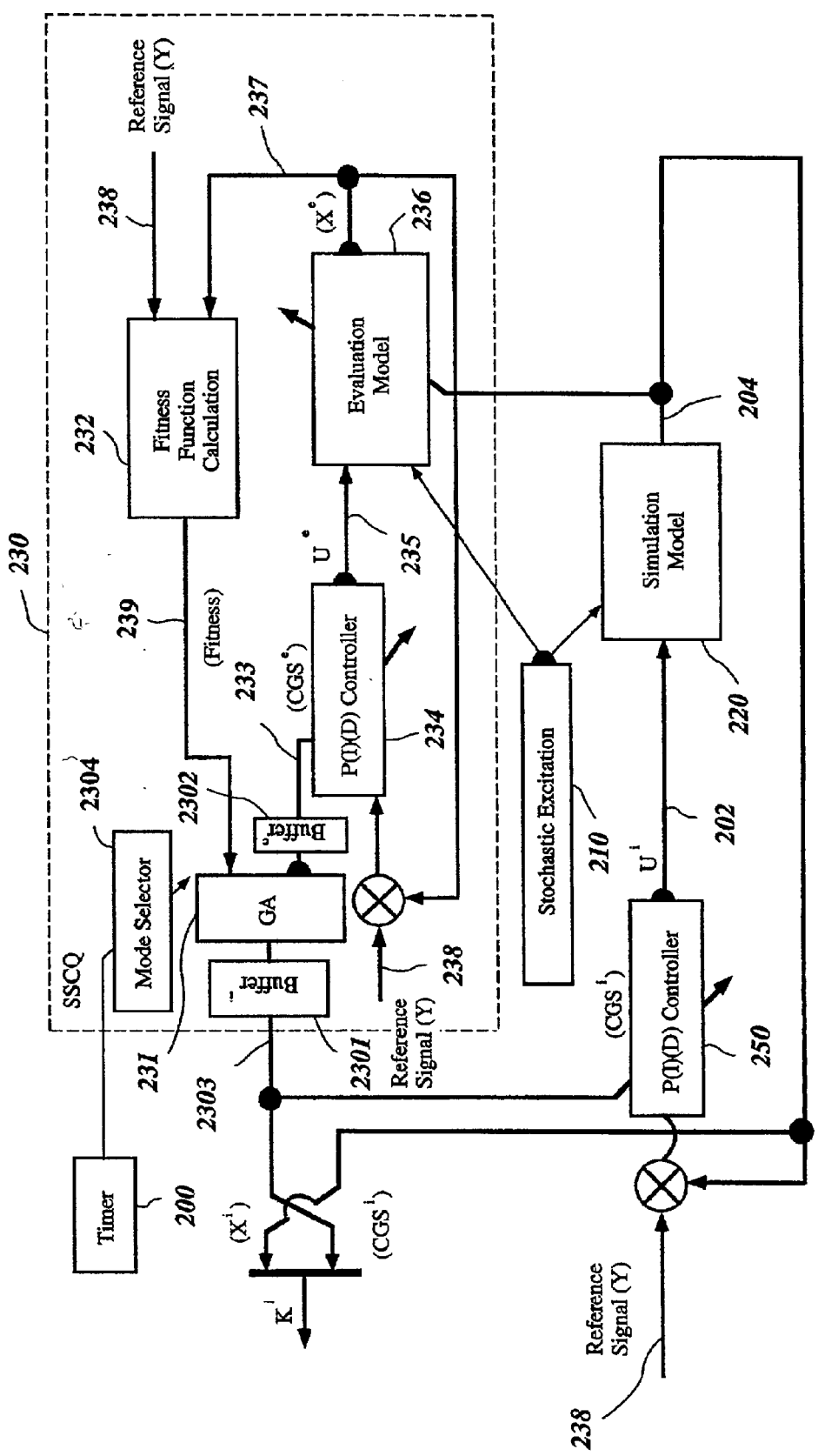
FIG. 2 shows the Simulation System of Control Quality (SSCQ).
Figure 10:
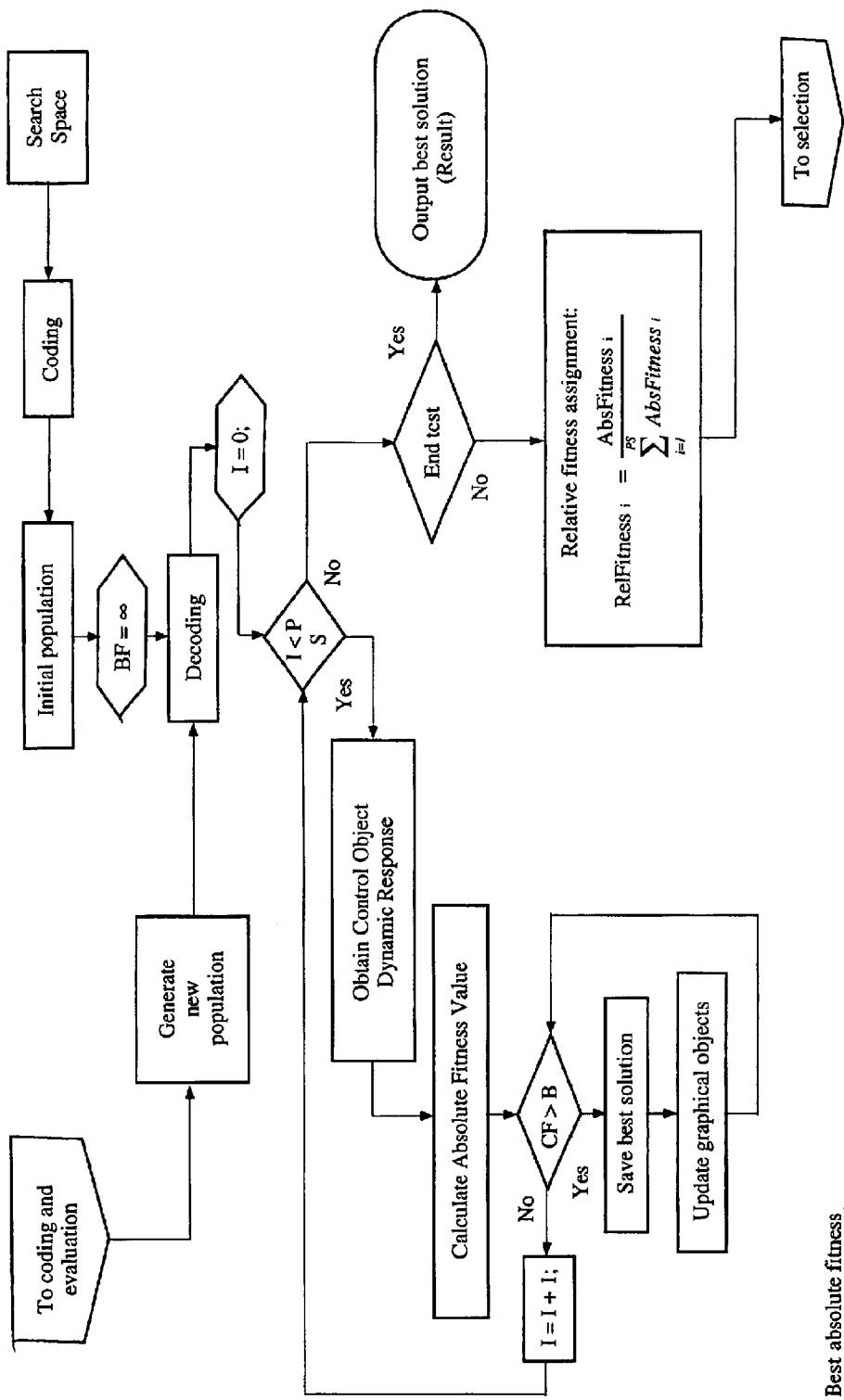
FIG. 10 is a flowchart of coding and evaluation operations of the genetic algorithm.

One embodiment of the SSCQ 130, shown in FIG. 2, is an off-line block that produces the teaching signal $K_i$ for the FLCS 140. FIG. 10 shows the structure of an SSCQ 230. The SSCQ 230 is one embodiment of the SSCQ 130. In addition to the SSCQ 230, FIG. 2 also shows a stochastic excitation signal generator 210, a simulation model 220, a PID controller 250, and a timer 20. The SSCQ 230 includes a mode selector 229, a buffer$^i$ 2301, a GA 231, a buffer$^e$ 2302, a PID controller 234, a fitness function calculator 232, and an evaluation model 236.

The Timer 200 controls the activation moments of the SSCQ 230. An output of the timer 200 is provided to an input of the mode selector 2304. The mode selector 2304 controls operational modes of the SSCQ 230. In the SSCQ 230, a reference signal y is provided to a first input of the fitness function calculator 232. An output of the fitness function calculator 232 is provided to an input of the GA 231. A CGS$^e$ output of the GA 231 is provided to a training input of the PID controller 234 through the buffer 2302. An output U$^e$ of the controller 234 is provided to an input of the evaluation model 236. An X$^e$ output of the evaluation model 236 is provided to a second input of the fitness function calculator 232. A CGS$^i$ output of the GA 231 is provided (through the buffer 2301) to a training input of the PID controller 250. A control output from the PID controller 250 is provided to a control input of the suspension system simulation model 220. The stochastic excitation generator 210 provides a stochastic excitation signal to a disturbance input of the simulation model 220 and to a disturbance input of the evaluation model 236. A response output X$^i$ from the system simulation model 220 is provided to a training input of the evaluation model 236. The output vector K$^i$ from the SSCQ 230 is obtained by combining the CGS$^i$ output from the GA 1031 (through the buffer 2301) and the response signal X$^i$ from the system simulation model 220.

The stochastic excitation signal generator 210 generates the excitation signal. The excitation signal can be excitation obtained using stochastic simulations, or it can be real measured environment. The block 210 produces the excitation signal for each time moment generated by the timer 200.

The simulation model 220 is a kinetic model of the control object. Simulation system of control quality (SSCQ) 230 is a main optimization block on the structure. It is a discrete time block, and its sampling time is typically equal to the sampling time of the control system.

Entropy production rate is calculated inside the evaluation function 232, and its values are included in the output (X$^e$) of the evaluation model.

The following time variables are used:

| | |
|---|---|
| T | the time of SSCQ calls; |
| T$^c$ | Sampling time of the control system; |
| T$^e$ | Evaluation (Observation) time of the SSCQ; |
| t$^c$ | Integration interval of the simulation model with fixed control parameters, t$^c \in$[T; T + T$^c$]; and |
| t$^e$ | Evaluation (Observation) time interval of the SSCQ, t$^e \in$[T; T + T$^e$]. |

Figure 3:
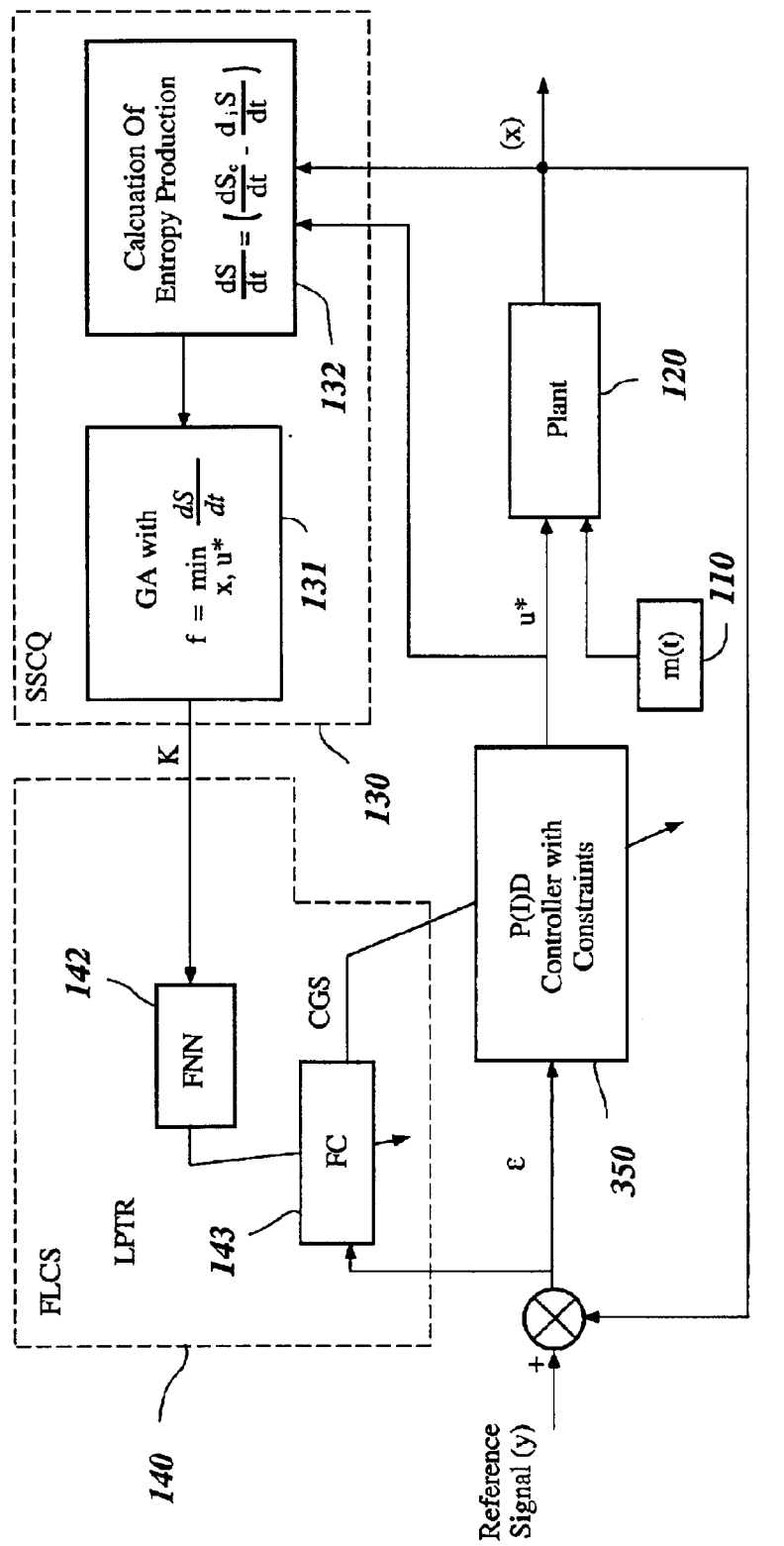
FIG. 3 shows the general Structure of a Self-Organization Intelligent Control System Based on Soft Computing with the Constraint Control System.

In many embodiments, the SSCQ 130 can be used to perform optimal control of different kinds of nonlinear dynamic systems, when the control system unit is used to generate discrete impulses to the control actuator, which then increases or decreases the control coefficients depending on the specification of the control actuator (FIG. 3).

Figure 4:
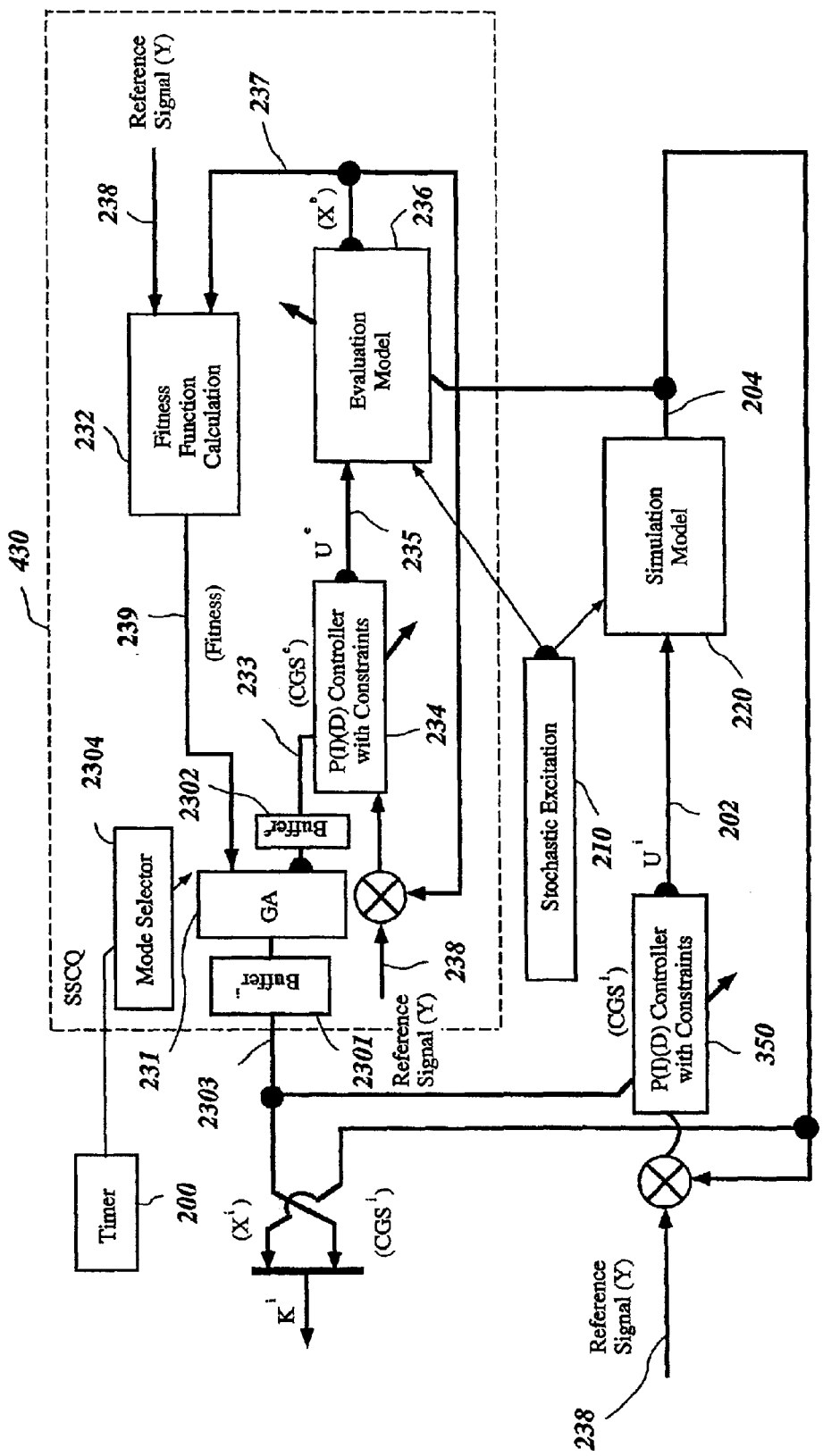
FIG. 4 shows the Simulation System of Control Quality for Constraint Control System.
Figure 5A:
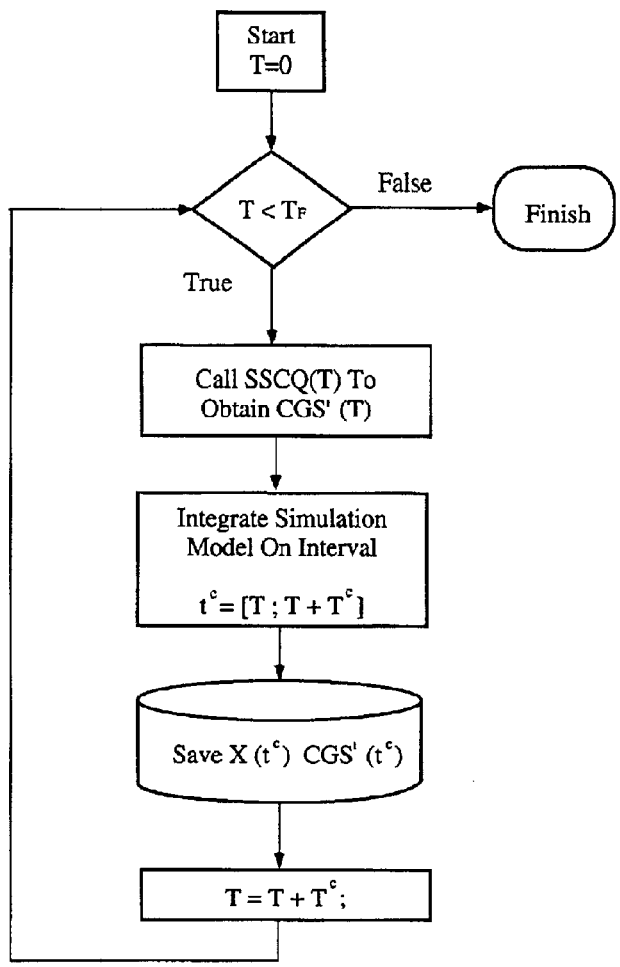
FIG. 5A shows the block scheme of simulation of a dynamic system model with the SSCQ.

The structure of an SSCQ 430 for a discrete or step-constrained control actuator is shown in FIG. 4 and described in more detail in the text in connection with FIG. 4. The SSCQ 430 is similar to the SSCQ 230 and thus the flowchart of FIG. 5A can be used to describe both. FIG. 5A illustrates the following five steps:

1. At the initial moment (T=0) the SSCQ block 230 or 430 is activated and generates the initial control signal 2303 CGS$^i$(T).
2. The simulation model 220 is integrated using the stochastic excitation signal from the stochastic excitation generator 210 and the control signal CGS$^i$(T) 2303 from the first time interval t$^c$ and it generates the output X$^i$ 204
3. The output of X$^i$ 204 with the output of the CGS$^i$(T) 2301 is saved into the data file as a teaching signal K$^i$.
4. The time T is incremented by T$^c$ (in pseudo-code, T=T+T$^c$).
5. Sequence 1–4 is repeated until the end of the stochastic signal is reached.

In general, the SSCQ has two operating modes:

1. Updating the buffer$^i$ 2301 using genetic algorithm 231; and
2. Extraction CGS$^i$(T) from buffer$^i$ 2301.

Figure 5B:
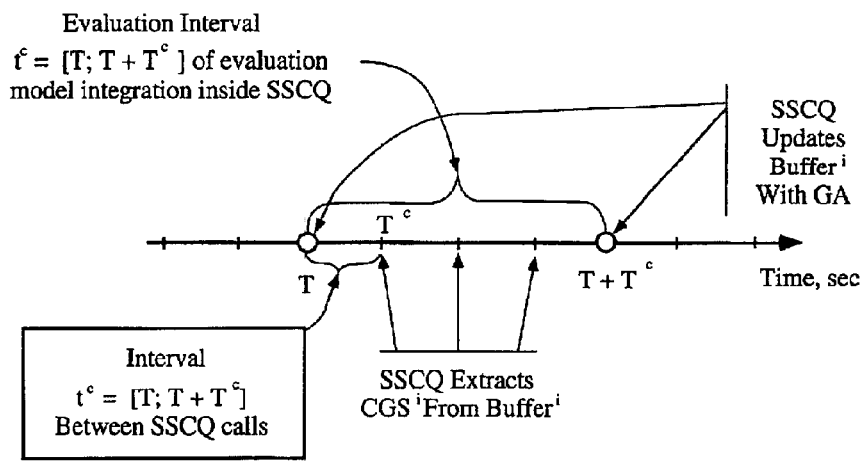
FIG. 5B shows the temporal representation of the SSCQ modes.

The current mode of the SSCQ 2304 controlled by the mode selector 2304 using the information of the current time moment T, as it is presented in FIG. 5B.

Figure 6:
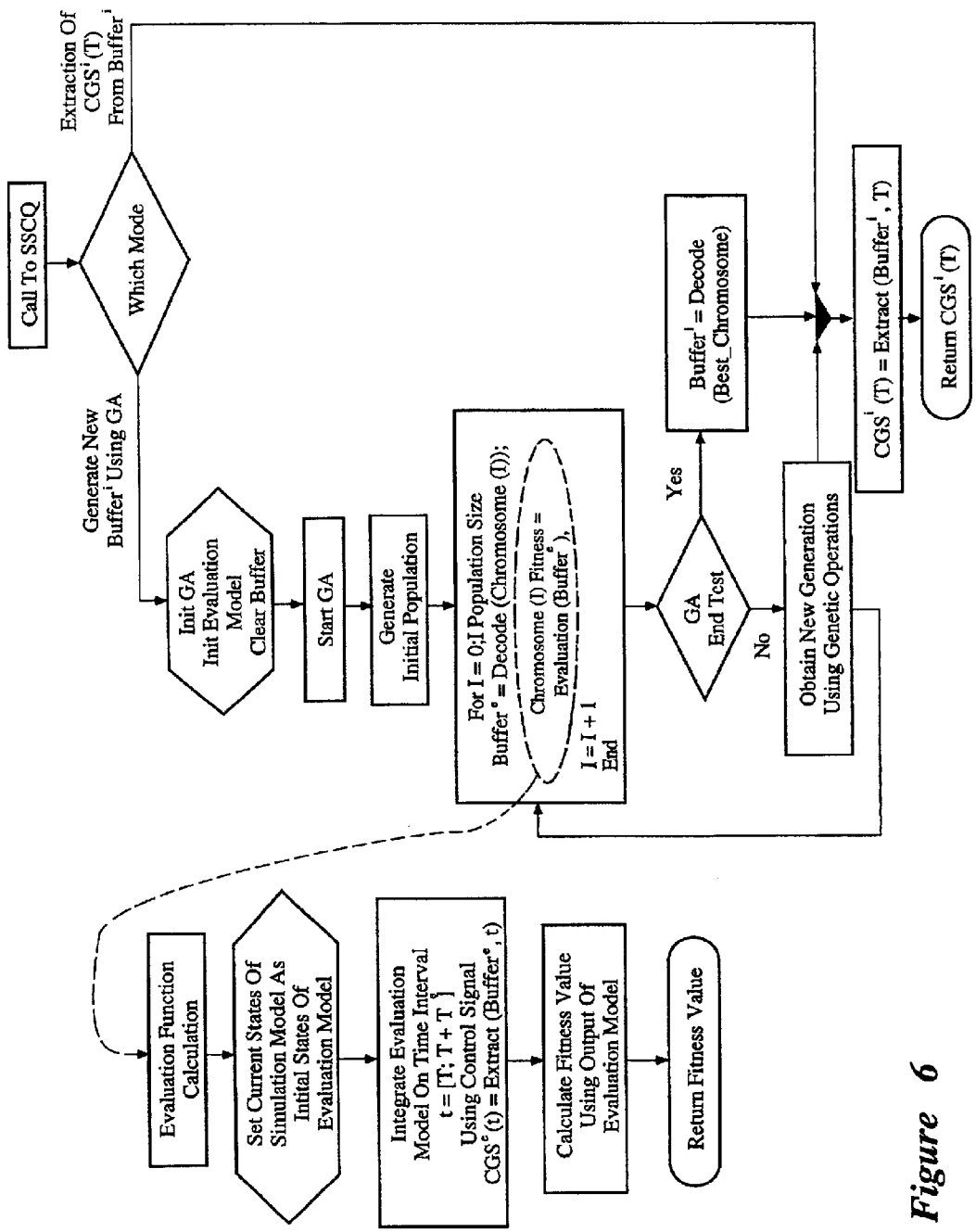
FIG. 6 is a flowchart of the SSCQ.

FIG. 6 is a flowchart of SSCQ calls, and it combines the following steps:

1. Selection of modes: if it is a GA mode then go to step 2, otherwise go to step 10;
2. Initialize the GA; Initialize parameters of Evaluation model; Clear buffer$^i$;
3. Start the Genetic Algorithm 231;
4. Generate the Initial population;
5. For each chromosome, assign fitness values by the following steps:
   i. Set the current states X$^i$(T) 204 as initial states of the evaluation model 236; decode the current chromosome and write the decoded results into the evaluation buffer$^e$ 2302;
   ii. Integrate the evaluation model 236 on the time interval t$^e$ using the stochastic signal from the generator 210 and the control signal CGS$^e$(t$^e$) from the buffer$^e$ 2302; and
   iii. Calculate the fitness value inside the block 232 using the output X$^e$, which is a response of evaluation model 236 to the control signals CGS$^e$(t$^e$) which are coded into the current chromosome;
6. Perform a GA end test. If the GA end test returns true, then end the GA and go to step 9; otherwise, proceed to step 7
7. Perform genetic operations on the current generation to obtain a new generation;
8. Repeat steps 5–7 until the GA end test result is positive;
9. Decode the best chromosome of the final generation, and write the decoded result into the buffer$^i$ 2301.
10. Extract from the buffer$^i$ 2301 the current control value CGS$^i$(T) 2303.

The structure of the buffer$^i$ 2301 and the buffers 2302 is presented in Table 1 below as a set of row vectors, where first element in each row is time value, and the other elements are the control parameters associated with the time value. Thus buffer$^i$ 2301 stores optimal control values for the evaluation time interval $t^e$ to control the simulation model, and the buffer$^e$ 2302 stores temporal control values for evaluation on the interval $t^e$ for calculation of the fitness function.

TABLE 1

| Time* | CGS$^{i(e)}$ | | |
|---|---|---|---|
| T | $K_p(T)$** | $K_I(T)$ | $K_D(T)$ |
| $T + T^c$ | $K_p(T + T^c)$ | $K_I(T + T^c)$ | $K_D(T + T^c)$ |
| ... | ... | ... | ... |
| $T + T^e$ | $K_p(T + T^e)$ | $K_I(T + T^e)$ | $K_D(T + T^e)$ |

The models used for the simulation 220 and for the evaluation 236 are typically similar models. There are many different methods for numerical integration of systems of differential equations. Practically, these methods can be classified into two main classes:

a) Variable-step integration methods with control of integration error; and b) Fixed-step integration methods without integration error control.

Numerical integration using methods of type a) are very precise, but time-consuming. Methods of type b) are faster, but with smaller precision. During each SSCQ call in GA mode, the genetic algorithm 231 calls the fitness function hundreds of times. Each calculation generally includes integration of the model of the dynamic system, which results in exponential computational complexity growths.

By choosing a small enough integration step size, it is possible to adjust the fixed step solver so that the integration error on a relatively small time interval (like the evaluation interval $t^e$) will be small, thus allowing the use of fixed step integration in the evaluation loop for integration of the evaluation model 236. In order to reduce total integration error, it is possible to use the results of high-order variable step integration in the simulation model 220 as initial conditions for evaluation model integration.

To obtain better precision, it is typically advantageous to use variable step solvers to integrate the evaluation model. Unfortunately, such variable step solvers can be prohibitively slow, especially if the dynamic model is relatively complicated, as in the case of a suspension system model.

Inside the SSCQ 230, the fitness function calculation block 232 computes the fitness function using the response ($X^e$) 237 of the evaluation model 236 on the control signal $CGS^e(t^e)$ and the reference signal Y 238.

The fitness function is considered as a vector of selected components of a matrix ($x^e$) of the response of the evaluation model 236. Its squared absolute value in general form is the following:

$$\text{Fitness}^2 = \sum_{t \in [T;T^e]} \left[ \sum_i w_i (x_{it}^e)^2 + \sum_j w_j (y_j - x_{jt}^e)^2 + \sum_k w_k f(x_{kt}^e)^2 \right] \to \min \quad (1)$$

where:

i is the index of state variables which should be minimized by their absolute value; j is the index of state variables whose control error should be minimized; k is the index of state variables whose frequency components should be minimized; $y_j$ are the components of the reference signal Y 238; and $w_r$, r=i, j, k are weighting factors which express the relative importance of the corresponding parameter. By setting these weighting factors, it is possible to choose those elements of output of the evaluation model that are more correlated with the required behavior of the control object. For example, for control of an automotive suspension system, such coefficients can be used to represent the importance of the corresponding elements from a human comfort viewpoint. At the beginning of development, the weighting factors can have some empirical values and they can then be adjusted using experimental results.

Extraction of frequency components can be done using standard digital filtering design techniques for obtaining the parameters of filter. The standard difference equation can be applied to the $x_k^e$ column elements of the matrix $X^e$:

$$a(1)f(x_k^e(t^e(N))) = b(1)x_k^e(t^e(N)) + b(2)x_k^e(t^e(N-1)) + \ldots + \quad (2)$$
$$b(n_b + 1)x_k^e(t^e(N - n_b)) -$$
$$a(2)x_k^e(t^e(N-1)) - \ldots -$$
$$a(n_a + 1)x_k^e(t^e(N - n_a))$$

where a,b are parameters of the filter; N is the number of the current point; and $n_b$, $n^a$ specify the order of the filter. In case of a Butterworth filter, $n_b = n_a$.

Every electromechanical control system has a certain time delay, which is usually caused by the analog to digital conversion of the sensor signals, computation of the control gains in the computation unit, by mechanical characteristics of the control actuator, and so on. Additionally, many control units do not have continuous characteristics. For example, when the control actuators are step motors, such step motors can change only one step up or one step down during a control cycle. From an optimization point of view, such a stepwise constraint can constrain the search space of the genetic algorithm 131 in the SSCQ 130. In other words, to control a step-motor with N positions, it is not necessary to check all the possible N positions each time the stepper motor position is updated. It is enough to check only the cases when the stepper motor position is going change one step up, one step down, or hold position. This gives only 3 possibilities, and thus reduces the search space from the size of N points to three points. Such reduction of the search space will lead to better performance of the genetic algorithm 131, and thus will lead to better overall performance of the intelligent control system.

As described above, in many embodiments, the SSCQ 130 can be used to perform optimal control of different kinds of nonlinear dynamic systems, when the control system unit is used to generate discrete impulses to the control actuator, which then increases or decreases the control coefficients depending on the specification of the control actuator (see e.g., FIG. 3).

Without loss of generality, the conventional PID controller 150 in the control system 100 (shown in FIG. 1) can be replaced by a PID controller 350 with discrete constraints, as shown in FIG. 3 to create a new control system 300. This type of control is called step-constraint control. The structure of the SSCQ 130 for step-constraint control is shown in FIG. 4, which is a block diagram of a step-constrained SSCP 430. The SSCQ 430 is similar to the SSCQ 230 in many respects. The difference between the SSCQ structure 230 described in FIG. 2 and the SSCQ structure 430 in FIG. 4 lies in the structures of the buffer$^t$ 2301 and the buffer$^e$ 2302 and the addition of constraints to the PID controllers 234 and 350. Moreover, the PID controllers in the SSCQ 430 are constrained by discrete constraints and at least a portion of the chromosomes of the GA 231 in the SSCQ 430 are step-coded rather than position-coded. In the case of step-constrained control, the SSCQ buffers 2301 and 2301 have the structure presented in the Table 2, and can be realized by a new coding method for discrete constraints in the GA 131.

TABLE 2

| Time* | CGS$^{i(e)}$ | | |
|---|---|---|---|
| T | STEP$_p$(T)** | STEP$_I$(T) | STEP$_D$(T) |
| T + T$^c$ | STEP$_p$(T + T$^c$) | STEP$_I$(T + T$^c$) | STEP$_D$(T + T$^c$) |
| ... | ... | ... | ... |
| T + T$^e$ | STEP$_p$(T + T$^e$) | STEP$_I$(T + T$^e$) | STEP$_D$(T + T$^e$) |

In Table 2, the Time column corresponds to time assigned after decoding of a chromosome, and STEP denotes the changing direction values from the stepwise alphabet {-1, 0,1} corresponding to (STEP UP, HOLD, STEP DOWN) respectively.

In order to map such step-like control signals into the real parameters of the controller, an additional model of the control system that accepts such step-like inputs is developed by addition of the following transformation:

$$K_i(t + T^c, \text{STEP}) = \begin{cases} \text{if (STEP = 1) \&} (K_i(t) < K_i^{\max}) \text{ then } K_i(t) + \text{STEP\_UP} \\ \text{if (STEP = -1) \&} (K_i(t) > K_i^{\min}) \text{ then } K_i(t) - \text{STEP\_DOWN} \\ \text{else } K_i(t) \end{cases} \quad (3)$$

Figure 7A:
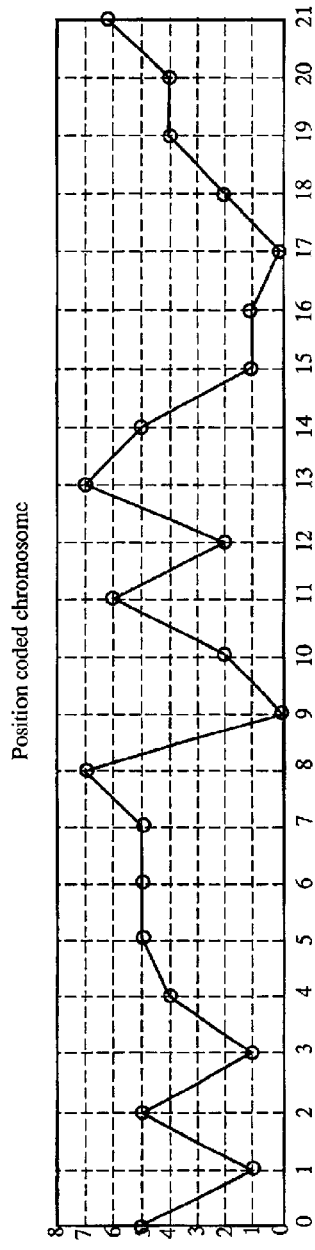
FIG. 7A shows normally coded chromosomes.
Figure 7B:
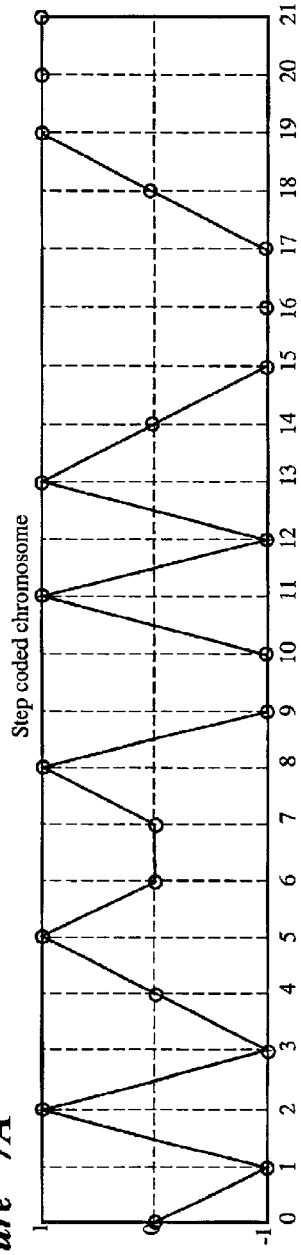
FIG. 7B shows step-based coding of the chromosomes.
Figure 7C:
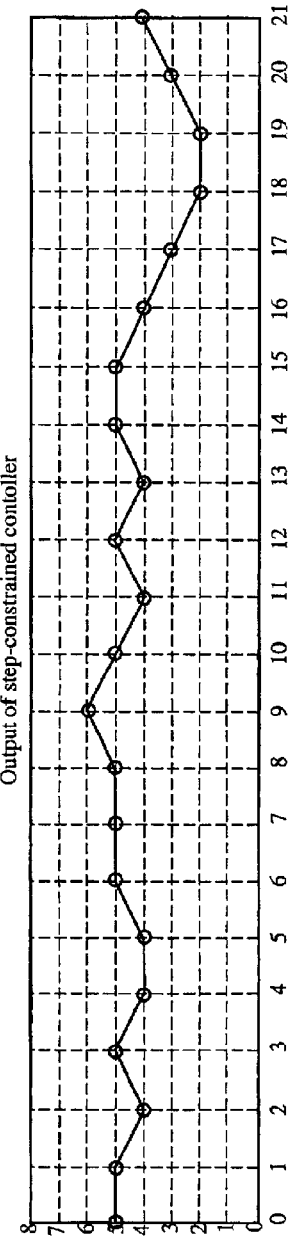
FIG. 7C is a graph showing output of the step-constraint control system.

An example of the comparison of the chromosomes of the GA 231 in the case of step based coding and in the case of position coding is shown in FIGS. 7A–7C.

For example, in FIG. 7A the chromosome generated by the genetic algorithm 231 is presented, for the control of the proportional step-constraint controller, with a step value 1, a minimum value 0, and a maximum value 8 (ordinate axis), and with a controller sampling time T$^c$ of one second. The evaluation time T$^e$ in FIGS. 7A–7C is 20 seconds.

FIG. 7B shows values of a chromosome generated by the GA 231 using step-based coding.

The chromosome presented in FIG. 7A and FIG. 7B is then passed through the controller, and the actual control signal accepted by the controller is presented on the FIG. 7C. The signal accepted by the controller is the same for both the chromosomes shown in FIGS. 7A and 7B.

Figure 8A:
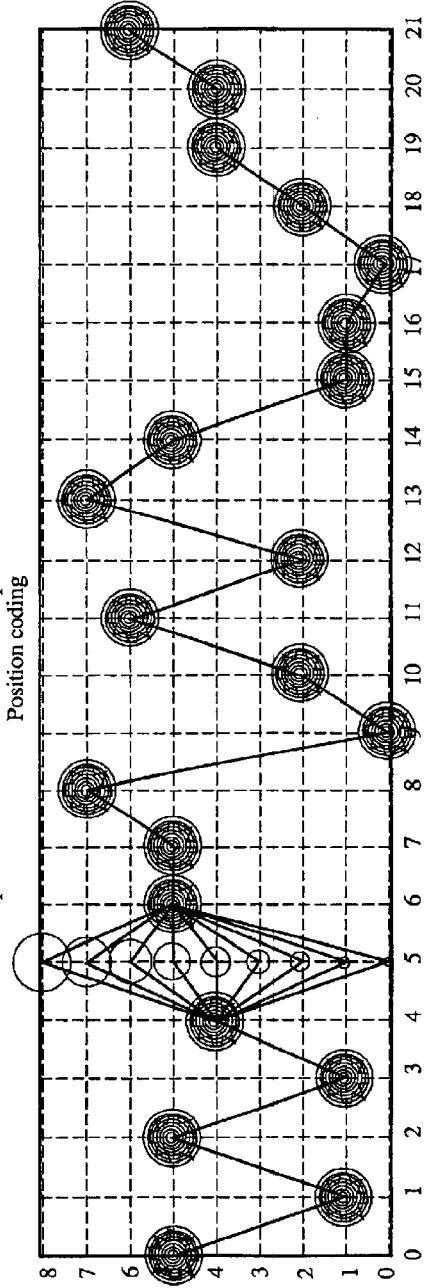
FIG. 8A shows a schemata where gene 5 is a position-coded wildcard.
Figure 8B:
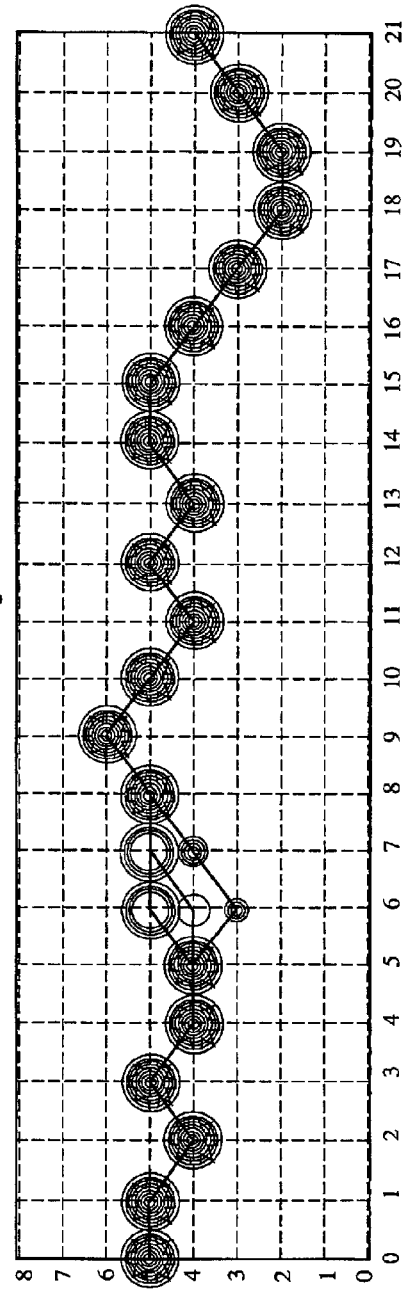
FIG. 8B shows outputs of a position-coded control system corresponding to the schemata of FIG. 8A.

In FIG. 8, the chromosome described in FIG. 7A is shown when position 5 is a wildcard. Concentric circles at position five are used in FIGS. 8A and 8B to indicate each combination which can be obtained, changing the value in the position number five. In totality, there are 9 different combinations as shown in FIG. 8A, but mechanical constraints of the control system prohibit all of the combinations except the three shown in FIG. 8B. Note that the GA can check all 9 combinations independently, even if they give the same controller output. Also note that the step constraints of the controller will cause a relatively rapid vanishing of the effect of the wildcard. Thus, the genetic operations such as mutation, described later, typically only produce local effects.

In FIG. 9, the chromosome described in FIG. 7B is presented, when the position 5 is a wildcard. Each concentric circle indicates a combination, which can be obtained by changing the value in the position number five. In total, there are 3 different combinations (FIG. 9A), and all of them will affect on the output of the control system (FIG. 9B). Note that the GA 430 can check only three combinations and they will have different fitness values. The vanishing of the effect of the wildcard in this case can be caused only by reaching the limits of the control signal range. Thus, the genetic operations, such as mutation, will have global effect, and the building blocks of such a chromosome correspond better to the Goldberg principles for effective coding.

Step-based coding reduces the search space of the GA 430. In this case, the range of the control signal for the GA search space is relatively unimportant. The relatively more important parameters are the evaluation time T$^e$, the controller's sampling time T$^C$, and the number of control parameters for optimization.

GA Theory

Genetic algorithms are stochastic search algorithms, based on the mechanism of natural evolution. A population of individuals evolves from one generation to another such that the best (most fit) individuals will increase their number and quality, and the worst (less fit) will vanish. Mathematically, any evolutionary algorithm can be described as a system of the following elements:

$$GA = <C, F, P^0, \mu, \Omega, \Gamma, \Delta, \Psi>,$$

Where C is a coding system; F is a fitness function (quality criteria); P$^0$ is an initial population; $\mu$ is a size of the population; $\Omega$ is a selection operation; $\Gamma$ is a crossover operation; P$^{CR}$ is a probability of the crossover operation; $\Delta$ is a mutation operation, P$^{MU}$ is a probability of the mutation operation; $\Psi$ and is a termination condition.

The coding system C is a unitary transformation, which defines the map between physical solution space and the mathematical space in which evolutionary (genetic) operations are defined. A simple example of the coding is a binary coding which is a map between real numbers into binary strings:

$$A \xrightarrow{c} B: A \in R^n, B \in B^l = \{0, 1\}^l,$$

where R$^n$ is a space of real vectors of dimension n, B$^l$ is a space of binary strings of the length l. In this case with the larger l provides a more realistic mathematical representation of R$^n$. In many realizations, binary coding is used because it is easy to define a number of evolutionary operations on binary strings. Moreover, since digital computers are based on binary logic, it is easy to store populations as a set of binary numbers.

The initial population P$^0$ is a set of the elements defined in the coding space. Usually, it is taken from uniform distribution among all elements of the search space, in one embodiment of the strings from B$^l$.

The size of the population $\mu$ is the number of individuals (chromosomes) in the population.

The fitness function F is a quality criterion, which defines how good a certain individual of the population is relatively to other elements of the population. The fitness function is usually calculated as a response of the certain function or of the certain dynamic system to the information coded in the corresponding individual (chromosome). For complex optimization problems evolving a number of calculations, the fitness function calculation is the most time-consuming part of any optimization algorithm, including evolutionary algorithms. In most cases, after calculating the absolute values of the fitness functions, the relative (normalized) values are used to distribute the importance inside population.

Figure 11:
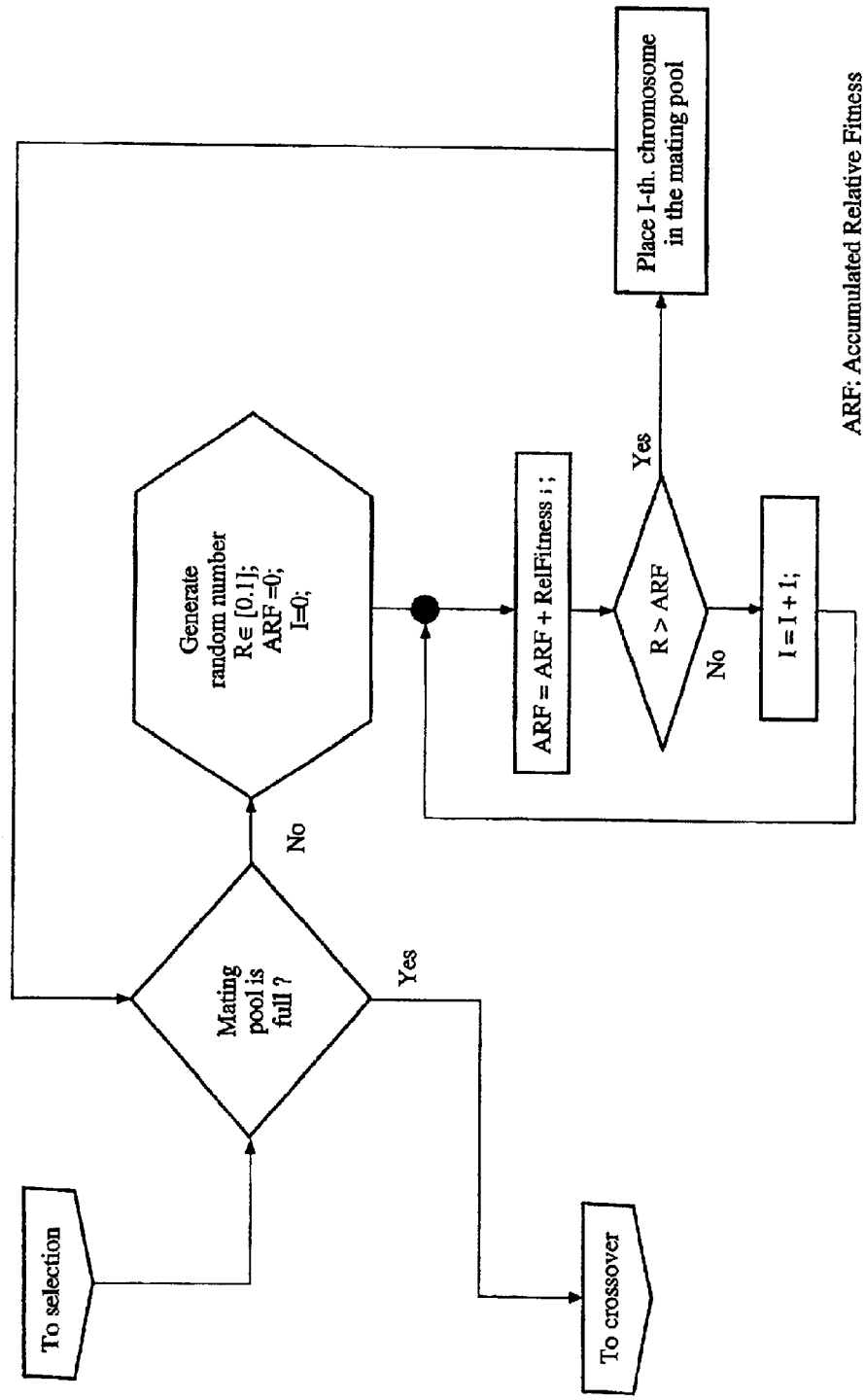
FIG. 11 is a flow chart of the roulette wheel (Monte-Carlo) selection operation.

FIG. 10 is a flowchart of the coding and evaluation operations of a genetic algorithm. Selection $\Omega$ is a probabilistic operation, defined to reproduce more chromosomes with high fitness values into the next generation. In one embodiment, selection selects a set of individuals from initial population into a set known as a mating pool. The mating pool is usually an intermediate population of the size $\mu$ from which the individuals will be taken for the genetic operations. In most genetic algorithm realizations, the selection is based on Monte-Carlo method also known as the roulette wheel method shown in FIG. 11. Each sector of the roulette wheel represents an individual of the population, and the size of each sector is proportional to the relative fitness of the corresponding individual. If the wheel is rotated, the probability of the individuals with higher relative fitness to be selected is proportional to its relative fitness (size of the sector of the roulette wheel).

Figure 12:
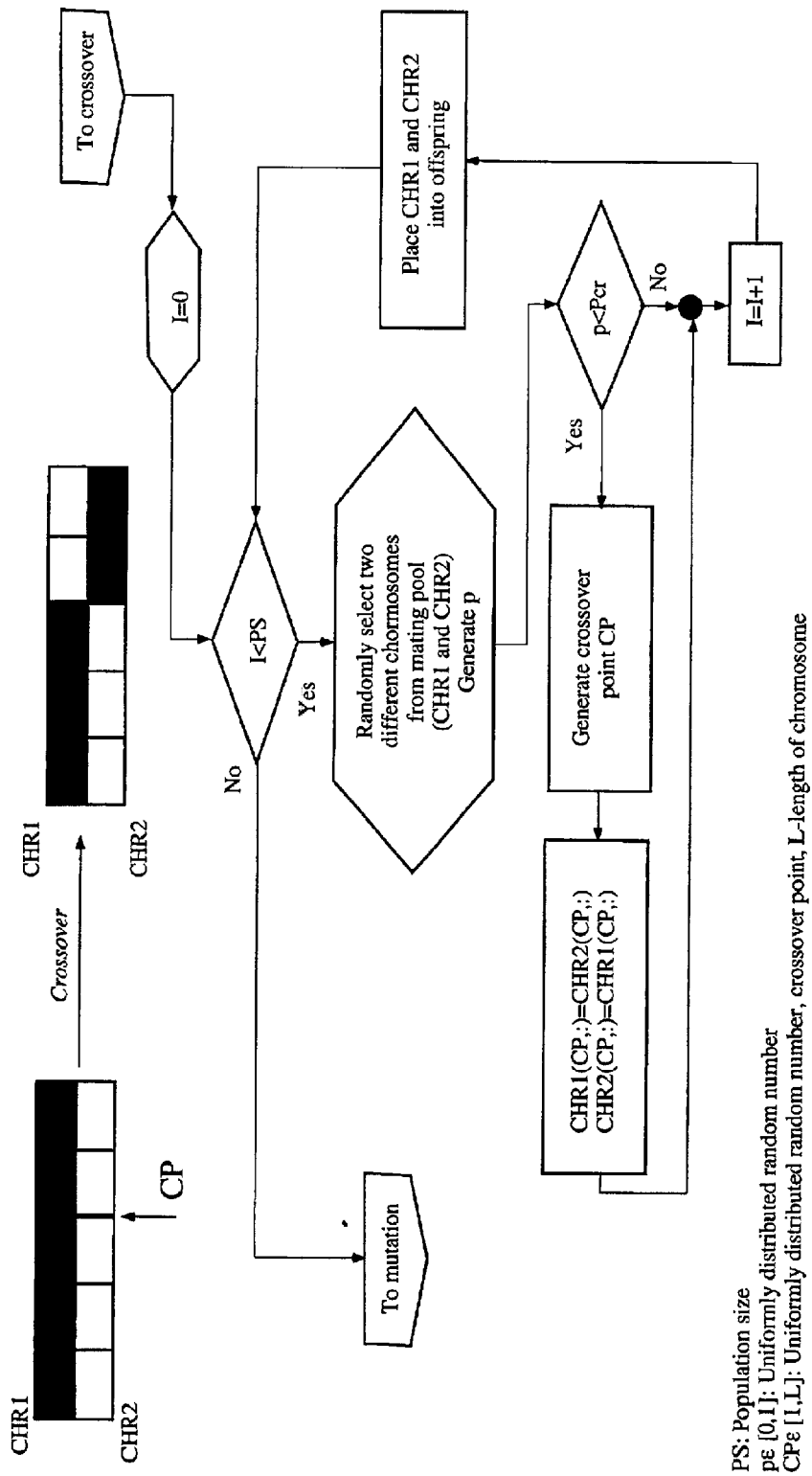
FIG. 12 is a flow chart of crossover operation.

FIG. 12 is a flowchart of the crossover operation of a typical genetic algorithm. The crossover operation $\Gamma$ is a probabilistic operation, aimed to share information between best individuals of the population. The probability of the crossover operation $p^{CR}$ is usually predefined. The input to the crossover operation $\Gamma$ is a mating pool, obtained from the selection operation $\Omega$. The mechanism of the crossover operation is the following:

1. Select two chromosomes from the mating pool;
2. Generate a uniformly distributed random number from [0 1]. If the generated number is less than $P^{CR}$, then proceed with the following steps;
3. Generate a crossover point (uniformly distributed random integer number from [1 1]);
4. Replace the right parts of the selected chromosomes, starting from the crossover point;
5. Place chromosomes into the new population;
6. Repeat steps 1–5 until the new population is full.

Figure 13:
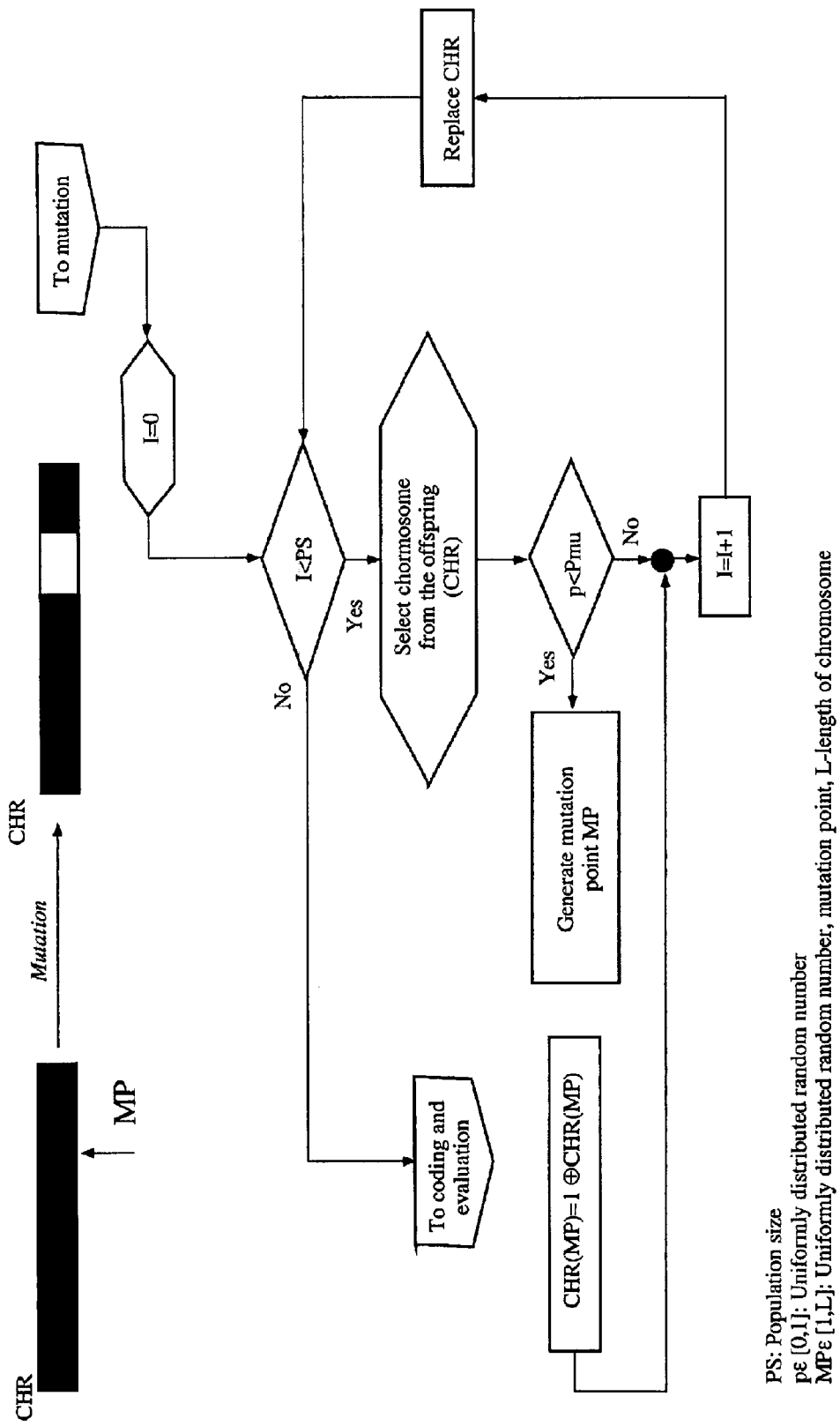
FIG. 13 is a flowchart of mutation operation.

FIG. 13 is a flowchart of the mutation operation. The mutation operation $\Delta$ is a probabilistic operation, aimed to introduce new information into a population. The probability of mutation operation $P^{MU}$ is predefined, depending on the parameters of the search space. Usually, the probability of mutation is less than the probability of crossover. The mutation operation $\Delta$ is applied after crossover. The input to mutation is the new generation, obtained after the crossover operation. The mechanism of the mutation operation is the following:

1. Select the first chromosome from the new generation;
2. Generate a uniformly distributed random number form [0 1] and if this number is less than $P^{MU}$ proceed with step 3, otherwise go to the step 5;
3. Generate a mutation point (uniformly distributed random integer number from [1 1]);
4. Apply to the gene pointed by mutation point the following transformation: gene(mutation point)=gene (mutation point) $\oplus 1$, where $\oplus$ denotes to modulo 2 addition as follows: $0\oplus 0=0$, $0\oplus 1=1$, $1\oplus 0=1$, $1\oplus 1=0$.
5. Select the next chromosome and repeat steps 2–4 until the last chromosome of the new population passed through mutation process.

The termination condition $\Psi$ of the genetic algorithm can be predefined in different ways depending on the problem. In one embodiment, it can be a certain number of generations on which population should be evolved. In some cases it can be some indication that the algorithm has converged in some sense. In one embodiment, the convergence criterion can be based on a difference between the best fitness value of the current and of the previous generation. If this difference is less than a predefined number, then algorithm stops. In one embodiment, the algorithm is assumed to be converged when an entire generation includes the same or similar individuals.

Every genetic algorithm has a certain set of parameters, including: $\mu$ the size of the population; GN the maximum number generations; $P^{CR}$ the crossover operation probability; and $P^{MU}$ the mutation operation probability.

These parameters depend on the parameters of the search space. The parameters are obtained using principles from the Holland theorem of schemata. The description of the Holland theorem requires some additional definitions, described as follows. A schemata is a representation of the group of the individuals of the population, with similar genotypes, (e.g., selecting a common part of the chromosomes), and replacing the different parts with asterisks (to denote wildcards). For example, given a binary alphabet, the chromosomes: [1 0 1 1 1] and [1 0 1 0 0 1], could be represented as the following schemata: S=[1 0 1 * * 1], where '*' means that position can be any value.

An individual who matches the schemata in its defined positions is called a representative of the schema.

The order of the schema o(S) is the number of its defined positions. For the above schema S, the order is o(S)=4.

The distance between the leftmost bit positions $b_{left}$ and the rightmost bit positions $b_{right}$ holding ether 1 or 0 is called the defining length of the schema $\delta(S)$ and is calculated as: $\delta(S)=b_{right}-b_{left}$. For the above example, $\delta(S)=6-3=3$.

Implicit Parallelism of Genetic Algorithms

For strings of length l, each string represents $2^l$ schemata. For example, the string 1101 has length equal 4, and therefore represents $2^4=16$ following schemata:

1100, 110*, 11*0, 11**, 1*00, 1*0*, 10, 1*, *100, *10*, *1*0, *1, 00, **0*, *0, 0*, ****.

If there is a population of n strings, the total number of schemata, $N_S$ is $2^l \leq N_S \leq n2^l$. Since each string can represent many schemata, it means that GA operations defined on a population of strings possess a much larger number of schemata in parallel. This property is called implicit parallelism of GA.

If some schema S has n(S,t) representative strings in a population at time t, then it is possible to calculate how many representatives of the given schema will appear in the next generation n(S,t+1). This number depends upon the operations of selection, crossover, and mutation. The effects of each will be considered separately, and then combined.

Selection

According to the structure of the selection operation, the probability $p(x_i)$ that an individual $x_i$ will be copied into the next generation depends upon the ratio of its fitness value $f(x_i)$ to the total fitness F of all individuals in the population:

$$p(x_i)=f(x_i)/F. \quad (4)$$

Thus, the probability, $p(S_i)$, of a string $S_i$ which is a representative of the schema S being copied to the next generation is defined as:

$$p(S_i)=f(S_i)/F, \quad (5)$$

where $f(S_i)$ is a fitness value of string $S_i$, F is a total fitness of all strings in the population.

According to the formula (4), each representative $S_i$ of schema S is copied to a mating pool $Nf(S_i)/F$ times. Hence, $$n(S, t+1) = \sum_{i=1}^{n} Nf(S_i)/F. \quad (6)$$

Consider the average fitness of schema S which is as follows:

$$f(S) = \frac{\sum_{i=1}^{n} f(S_i)}{n}. \qquad (7)$$

From Equation (7):

$$\sum_{i=1}^{n} f(S_i) = f(S)n. \qquad (8)$$

By using Equation (8) it is possible to rewrite Equation (7) as follows:

$$n(S,t+1)=n(S,t)Nf(S)/F, \qquad (9)$$

where f(S) is the average of the fitness functions of schema S; n is the number of non-overlapping representatives strings; and F is the total of all fitness functions taken across all strings (N) in the population.

Consider f(P)=F/N which is the average of the fitness over all string in the population. Then Equation (9) can be written as:

$$n(S,t+1)=n(S,t)f(S)/f(P). \qquad (10)$$

This shows that the number of representatives of a schema grows from generation to generation at a rate that depends upon the ratio of their average fitness to the average fitness of the population. Schemata with large fitness show increasing numbers of representatives. Schemata with small fitness show decreasing numbers.

Given a schema, which has fitness greater than the average of a population, for example, as follows $$f(S)=(1+k)f(P)=f(P)+kf(P), \qquad (11)$$

then $$n(S,t+1)=n(S,t)[f(P)+kf(P)]/f(P)=n(S,t)(1+k). \qquad (12)$$

After n generations the number of representatives of S will be:

$$n(S,t+n)=n(S,t)(1+k)^{n+1}. \qquad (13)$$

Equation (13) is the well known Holland's theorem 1. According to Holland's theorem 1: The number of representatives of schemata with above average fitness (f(S)>f(P)) grows in the population exponentially, while the number of representatives in those schemata which have below average fitness (f(S)<f(P)) decrease exponentially Crossover Despite the effectiveness of reproduction in increasing the percentage of representatives, the procedure is essentially sterile. It can not create new and better strings. Crossover and mutation operators perform this function.

For example, let the population consist of a string A and string B. String A is the representative of schemata $S_1$ and $S_2$, and string B represents neither. Then, the strings and schemata are given as follows:

| | |
|---|---|
| $S_1$ = * * 0 * \|* * * 1 | |
| $S_2$ = * * * * \|01 * * | |
| A = 0100 \|0101 | ($S_1$, $S_2$) |
| B = 1010 \|1000 | (no $S_1$, no $S_2$) |

The crossover operator mates random pairs of strings. It cuts the strings at a randomly determined position, and interchanges all bits to the right of the cut point. Doing so with strings A and B crossover produces the following new strings A' and B':

| | |
|---|---|
| A' = 0100 \|1000 | (no $S_1$ no $S_2$) |
| B' = 1010 \|0101 | ($S_2$) |

Now the string A' does not represent schemata $S_1$ and $S_2$, but the string B' represents $S_2$. This fact shows that crossover operator can reduce the number of representative of a schema.

The probability $p_{lost}$ of schema S losing a representative from a randomly chosen cut position (a crossover point), can be expressed as:

$$p_{lost}=P^{CR}\delta(S)/(l-1),$$

where $P^{CR}$ is the crossover probability and l is a length of a string.

Defining $p_{retaining}$ as the probability of schema S retaining a representative, then $$p_{retaining}=1-p_{lost}=1-p_c\delta(S)/(l-1). \qquad (14)$$

Combining Equations (9) and (14) gives $$n(S,t+1) \geq [n(S,t)f(S)/f(P)][1-P^{CR}\delta(S)/(l-1)]. \qquad (15)$$

Equation (15) corresponds to theorem 2 of Holland, which states that the growth of a schema depends upon the value of the fitness functions of its representatives, as well as its defining length.

Thus, a schema with a high fitness function and short defining length is more prolific.

Mutation

Each bit in a string has a chance of mutation to its opposite value. Let $P^{MU}$ be the probability of mutation in any bit position. Then, the probability that a bit does not change is $(1-P^{MU})$. If a string represents a schema that has o(S) bits that are either 0 or 1, then the probability that all corresponding o(S) bits in the string do not mutate is $(1-P^{MU})^{o(S)}$. In other words, the probability that a string remains a representation of a schema after mutation is:

$$(1-P^{MU})^{o(S)} \qquad (16)$$

Since $P^{MU}$ is usually small, then formula (16) can be simplified as:

$$(1-o(S)P^{MU}) \qquad (17)$$

The combined effects of reproduction, crossover and mutation can be written as follows. Combining Equations (15) and (17) gives the following schema theorem of Holland.

$$n(S,t+1) \geq [n(S,t)f(S)/f(P)][1-P^{CR}\delta(S)/(l-1)][1-o(S)P^{MU}] \qquad (18)$$

Schemata grow exponentially if they have high fitness values, short defining length, and low order.

In Equation (18), the following designations are used: n(S,t) is the number of representatives of schema S at time t; f(S) is the average fitness function for schema S; f(P) is the average fitness function over the population; $P^{CR}$ is the crossover probability; l is a length of a string; $\delta(S)$ is the defining length of schema S; o(S) is the order of schema S; and $P^{MU}$ is the probability of mutation at any bit position.

Coding Problems

The above disclosure dealt with a simple coding scheme using a binary alphabet without examining whether the binary coding is optimal or effective. Experimental observations show that a GA is robust and typically produces good results despite differences in coding. But, the coding method can have a significant effect on the accuracy and efficiency of the GA.

Goldberg in 1989 proposes two principles for effective coding:

1. The principle of minimal alphabets; and
2. The principle of meaningful building blocks: a user should select a coding so that short defining length, low-order schemata are relevant to the given problem.

A small alphabet tends to produce a long string. In this case, the efficiency of the implicit parallelism property is increased. A binary alphabet yields the maximum number of schemata for a string of a given length, making the binary alphabet the optimal choice for coding. But, binary coding is not a requirement. Other coding methods can be used in the GA. For example, real-coded chromosomes having real or integer numbers.

Following the results of the genetic algorithm theory, and mapping the principles of the GA effective coding into constraint control problems, the shortest alphabet for coding of such a control signals is a step-like alphabet such as $\{-1,0,1\}$, which can be interpreted as {"one step down", "hold", "one step up"}. For more effective computer realization of such alphabet it is possible to use two binary bits, and to use the following map table for interpretation of the numbers:

| Binary value | Interpreted value |
|---|---|
| 00 | 0 |
| 01 | 1 |
| 10 | −1 |
| 11 | 0 |

Control of a Holmes-Rand (Duffing-Van der Pol) Oscillator

The equation of the motion of the Holmes-Rand (Duffing-Van der Pol) dynamic system has the following form:

$$\ddot{x}+(x^2-1)\dot{x}-x+x^3=u(t)+\xi(t), \quad (19)$$

where u(t) is a control signal and $\xi(t)$ is a stochastic excitation signal.

In one embodiment, the control signal u(t) can be generated as a PID control signal with the following control function:

$$u(t) = k_P(t)e + k_D(t)\dot{e} + k_I(t)\int_0^t e(t)dt, \quad (20)$$

where e=y(t)−x(t) is the control error, and y(t) is the reference signal, defined by the user.

In one embodiment the control gains $k_P, k_D, k_I$ have stepwise constraints. Thus the control system optimization structure for such embodiments can be described as in FIG. 4, and the control signal can be coded according to Table 2.

In this case the entropy production rate of the plant is:

$$\frac{dS_P}{dt} = \frac{1}{T}(x^2-1)\dot{x}^2. \quad (21)$$

The entropy production rate of the control system is:

$$\frac{dSc}{dt} = k_D\dot{e}^2. \quad (22)$$

Kinetic energy is:

$$T = \frac{\dot{x}^2}{2}. \quad (23)$$

Potential energy is:

$$U = \frac{x^4}{4} - \frac{x^2}{2}. \quad (24)$$

Figure 14A:
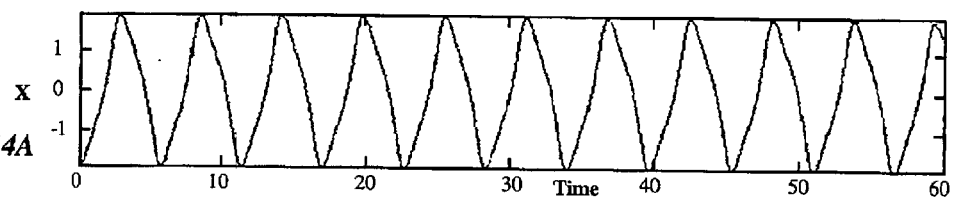
FIGS. 14A–14N are graphs that show the nature of the attractor of the Holmes-Rand (Duffing-Van der Pol) dynamic system.
Figure 14B:
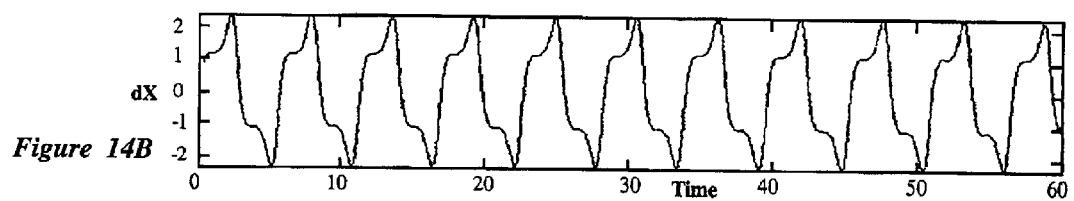
Figure 14D:
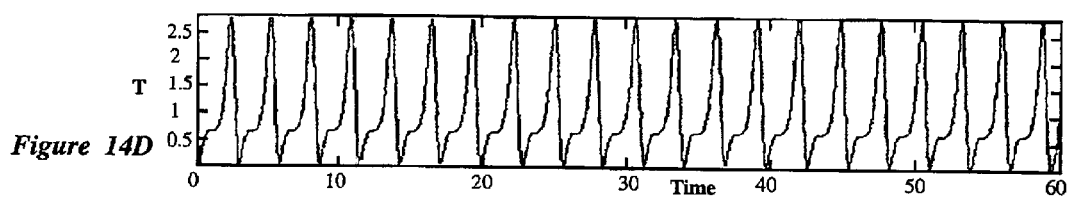
Figure 14G:
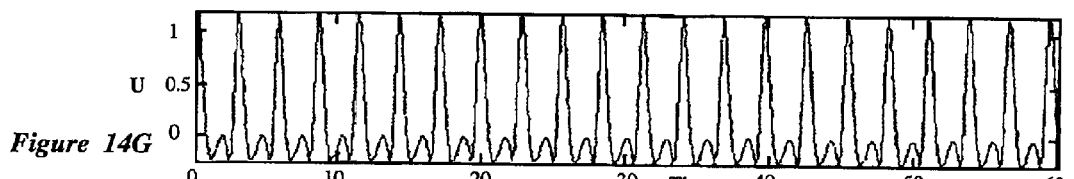
Figure 14I:
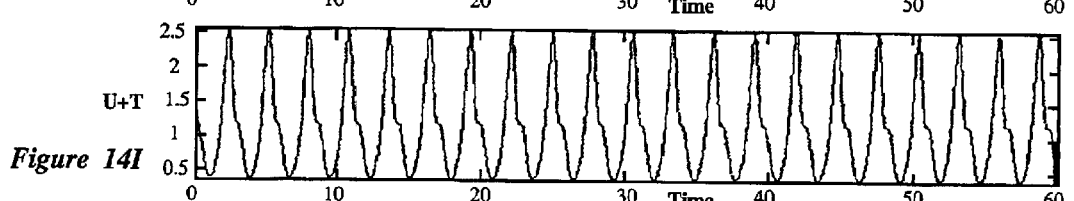
Figure 14L:
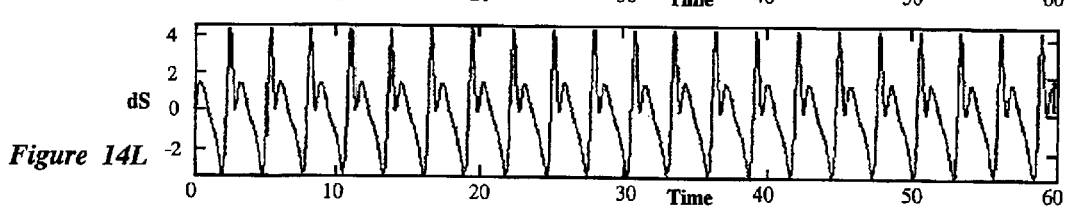
Figure 14M:
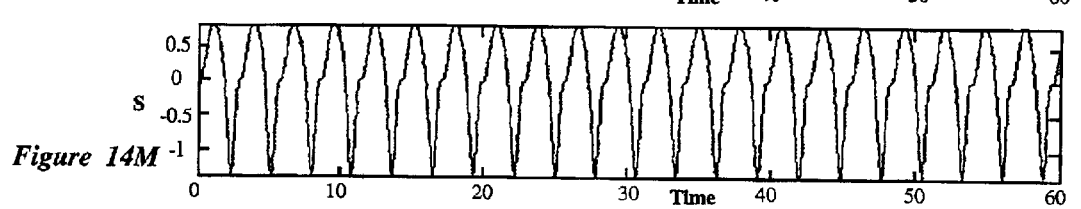
Figure 14C:
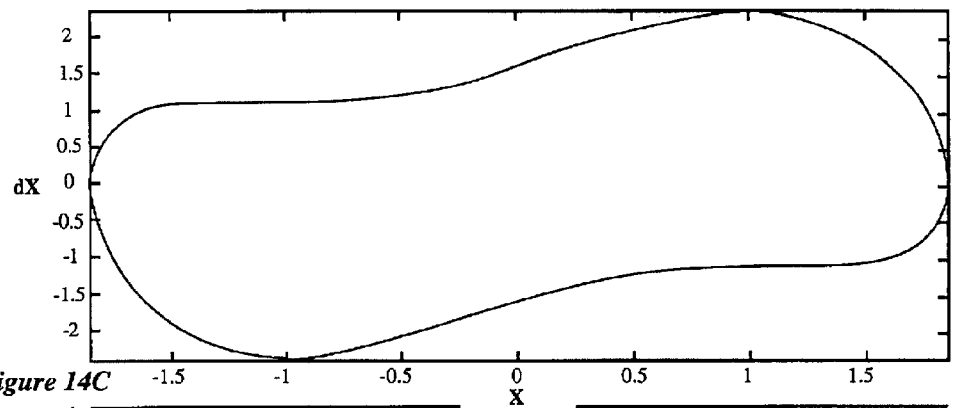
Figure 14E:
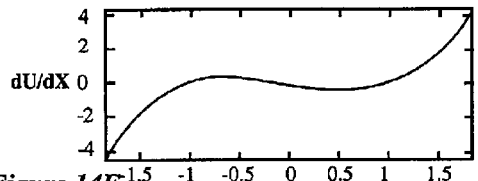
Figure 14F:
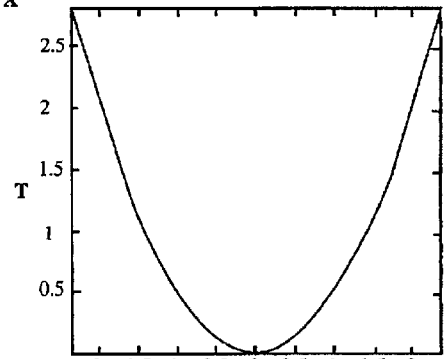
Figure 14H:
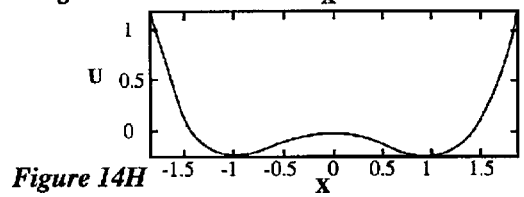
Figure 14J:
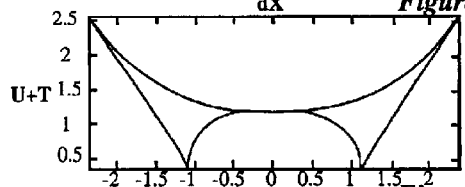
Figure 14K:
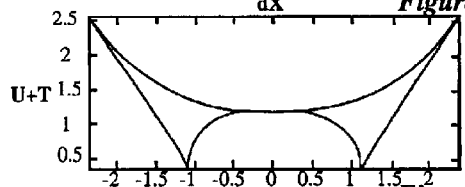
Figure 14N:
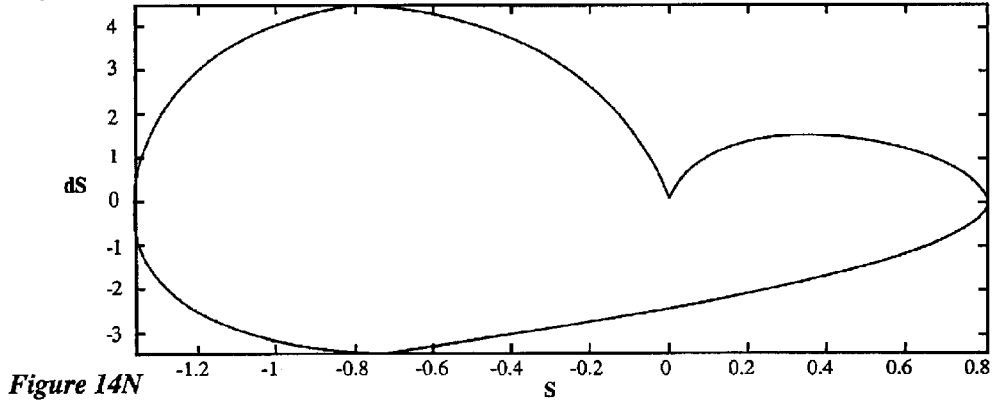

FIGS. 14A–14N show the simulation results of free dynamic and thermodynamic motion of the nonlinear dynamic system in Equation (19). FIG. 14A shows the dynamic evolution of coordinate x of the system (19). FIG. 14B shows the dynamic evolution of the velocity $\dot{x}$ of the system (19), where x-axis is a system coordinate x and the y-axis is a system velocity $\dot{x}$.

FIG. 14D shows the kinetic energy evolution of the Holmes-Rand oscillator. FIG. 14E shows the derivative of the potential energy of the Homes-Rand oscillator phase portrait. FIG. 14F shows the velocity phase portrait of kinetic energy. FIG. 14G shows the potential energy evolution of the Holmes-Rand oscillator. FIG. 14H shows coordinate phase portraits of potential energy of the Holmes-Rand oscillator. FIG. 14I shows the total energy evolution of the Holmes-Rand oscillator, and corresponding coordinate and velocity phase portraits of total energy are shown in FIGS. 14J and 14K, respectively.

FIG. 14L shows the plant entropy production evolution. FIG. 14M shows the plant entropy evolution. FIG. 14N shows the phase portrait of the plant entropy of the Holmes-Rand oscillator.

Figure 15C:
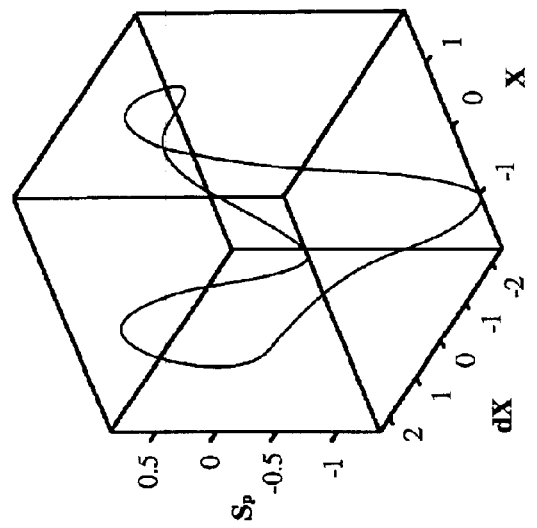
FIGS. 15A–15C are graphs that show the nature of the 3D attractor of the Holmes-Rand (Duffing-Van der Pol) dynamic system.
Figure 15B:
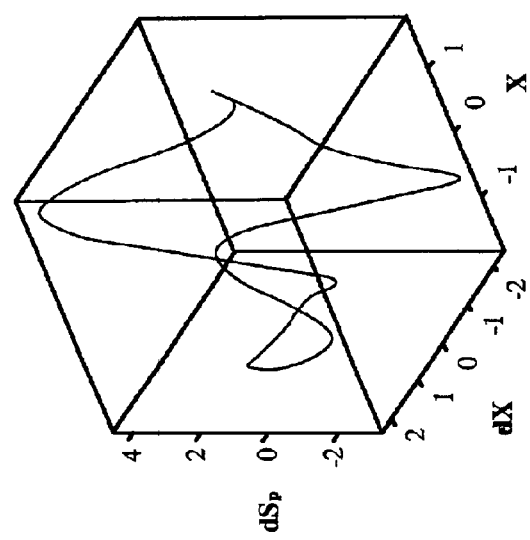
Figure 15A:
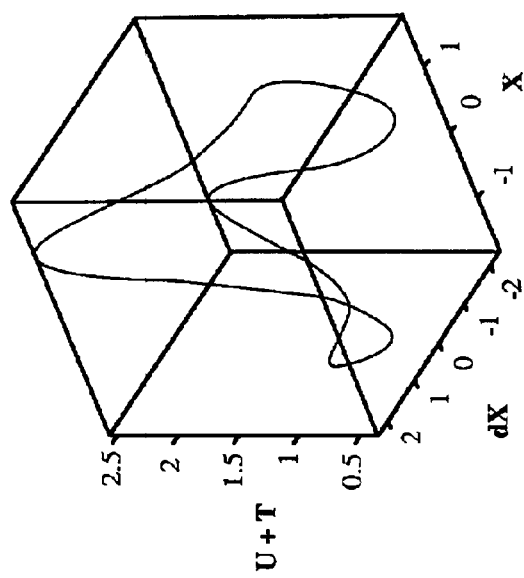

FIGS. 15A–15C show simulation results of free dynamic and thermodynamic motion of the nonlinear dynamic system (19). The x-axis and y-axis on the graphs of the FIGS. 15A–15C are the coordinate x and velocity $\dot{x}$. FIG. 15A shows the total energy of the attractor. FIG. 15B shows the entropy production of the attractor. FIG. 15C shows the entropy of the attractor.

Figure 16C:
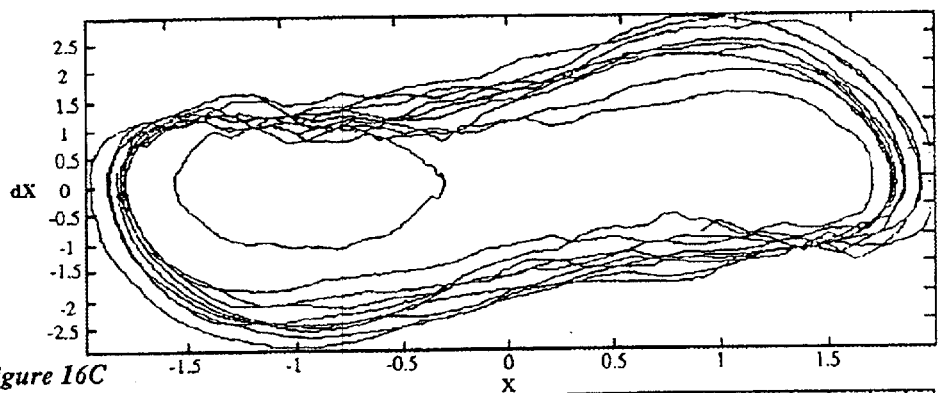
FIGS. 16A–16N are graphs that show the nature of the attractor of Holmes-Rand (Duffing-Van der Pol) dynamic system under stochastic excitation with normal probability distribution.
Figure 16E:
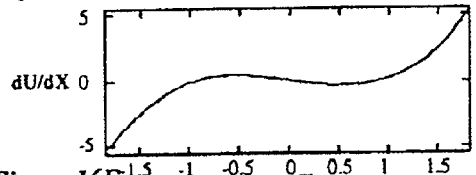
Figure 16F:
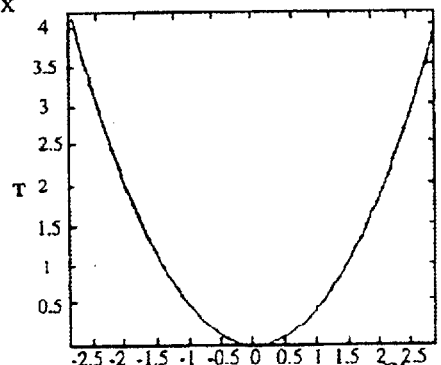
Figure 16H:
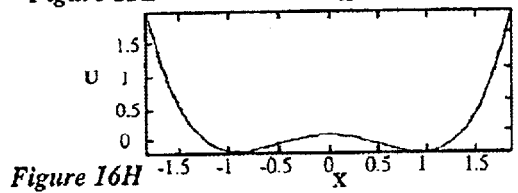
Figure 16J:
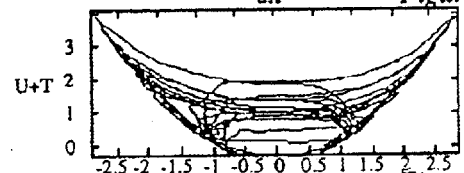
Figure 16K:
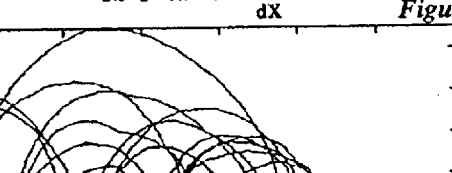
Figure 16N:
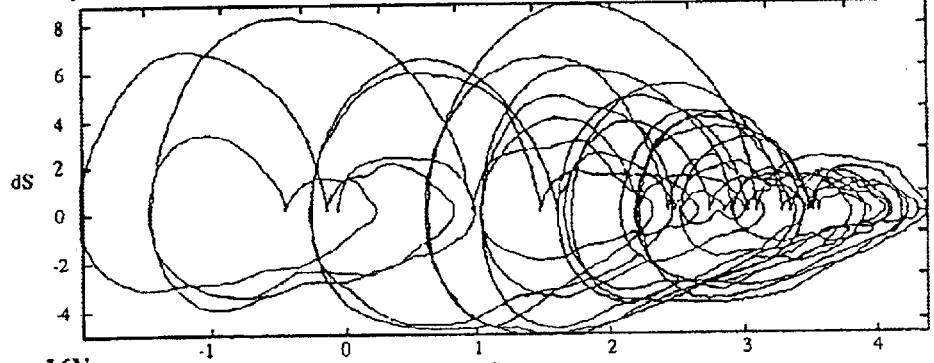

FIGS. 16A–16N show the simulation of dynamic and thermodynamic motion of the nonlinear dynamic system (19) under stochastic excitation. The excitation $\xi(t)$ is a band-limited white noise with zero mean.

FIG. 16A shows the dynamic evolution of coordinate x of the system (19). FIG. 16B shows the dynamic evolution of the velocity $\dot{x}$ of the system of Equation (19), where x-axis is a system coordinate x and the y-axis is a system velocity $\dot{x}$.

FIG. 16D shows the kinetic energy evolution of the Holmes-Rand oscillator. FIG. 16E shows the derivative of the potential energy of the Homes-Rand oscillator phase portrait. FIG. 16F shows the velocity phase portrait of kinetic energy. FIG. 16G shows the potential energy evolution of the Holmes-Rand oscillator. FIG. 16H shows coordinate phase portraits of potential energy of the Holmes- Rand oscillator. FIG. 16I shows the total energy evolution of the Holmes-Rand oscillator, and corresponding coordinate and velocity phase portraits of total energy are shown in FIGS. 16J and 16K, respectively.

FIG. 16L shows the plant entropy production evolution. FIG. 16M shows the plant entropy evolution. FIG. 16N shows the phase portrait of the plant entropy of the Holmes-Rand oscillator.

Figure 17C:
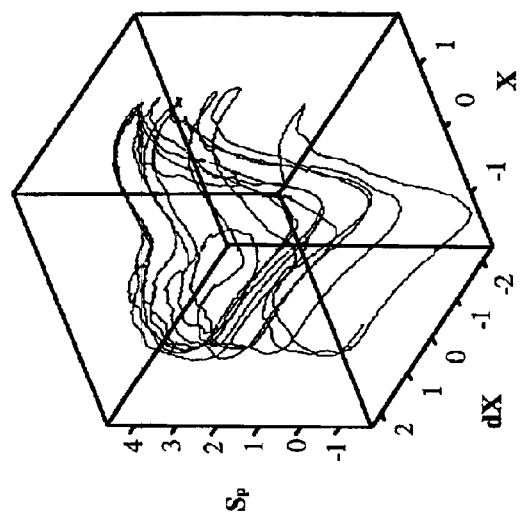
FIGS. 17A–17C are graphs that show the nature of the 3D attractor of the Holmes-Rand (Duffing-Van der Pol) dynamic system under stochastic excitation with normal probability distribution.
Figure 17B:
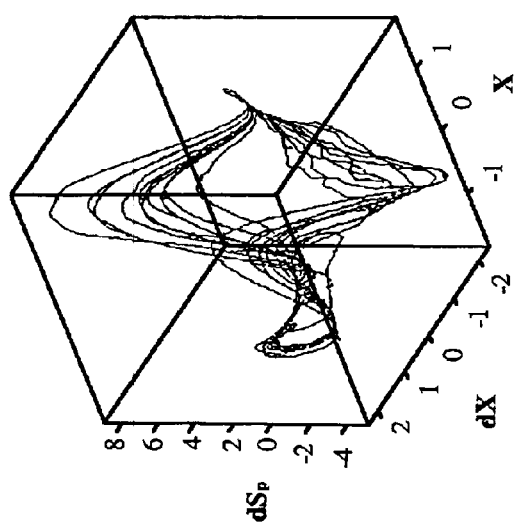
Figure 17A:
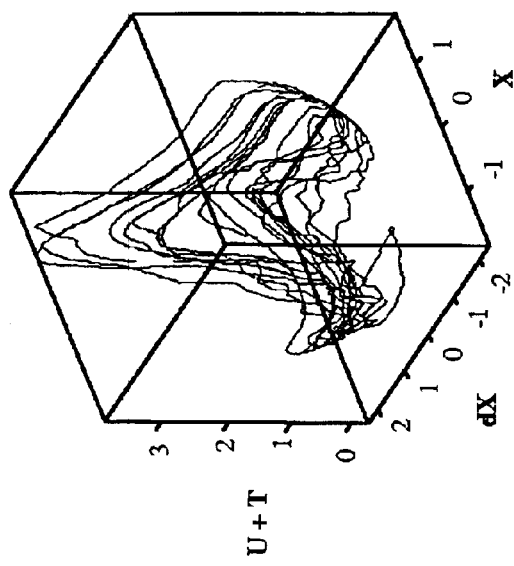

FIGS. 17A–17C show simulation results corresponding to FIGS. 16A–16N. The x-axis and y-axis on the graphs of the FIGS. 17A–17C are the coordinate x and velocity $\dot{x}$. FIG. 17A shows the total energy of the attractor. FIG. 17B shows the entropy production of the attractor. FIG. 17C shows the entropy of the attractor.

Figure 18:
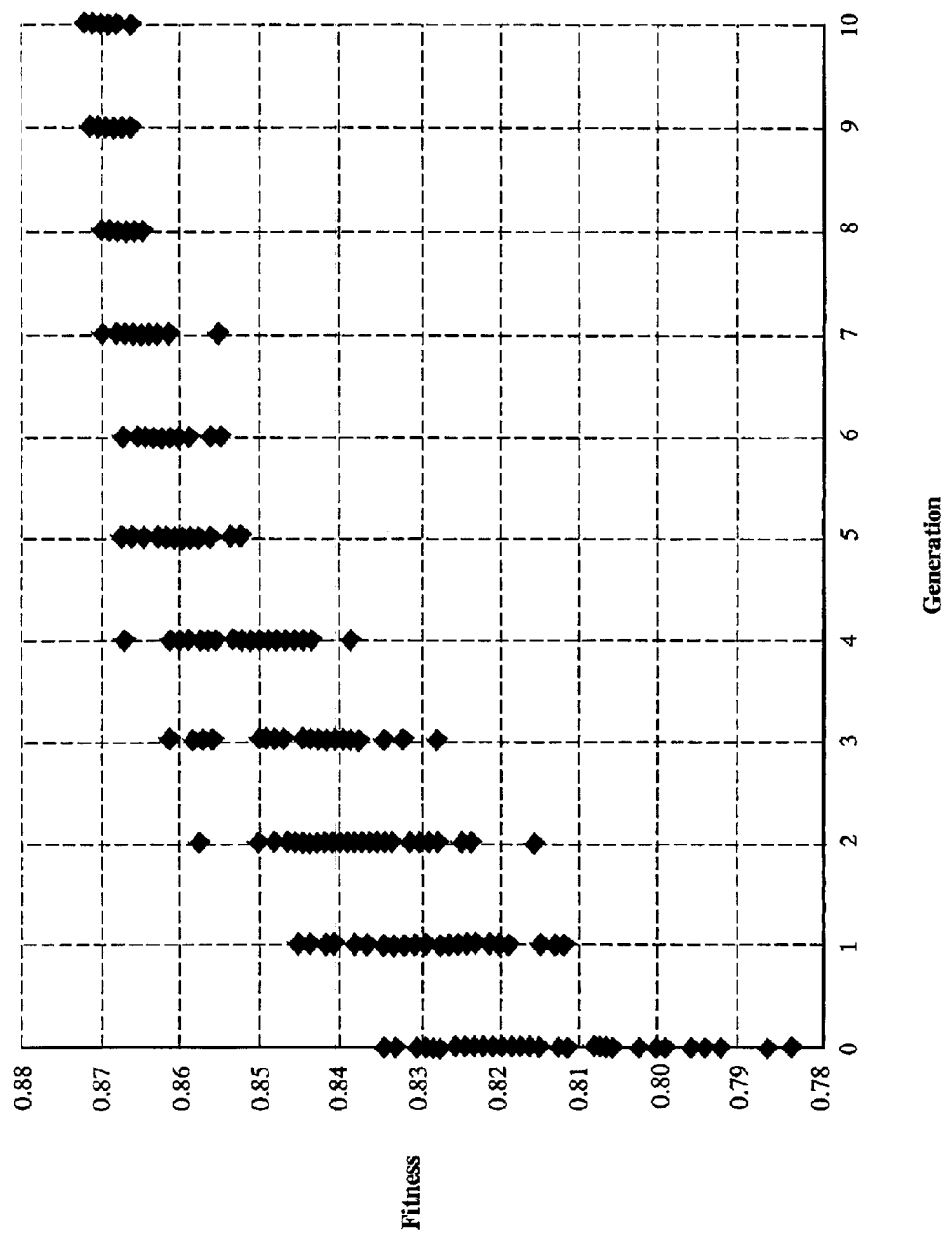
FIG. 18 shows GA optimization dynamics of SSCQ control of the Holmes-Rand dynamic system with a position-encoded GA (with coding according to Table 1).

FIG. 18 shows the performance of the GA 231 used in the SSCQ 230. In this case, the fitness function is a minimization of error signal between the reference signal $$y(t) = \sin\left(\frac{4\pi}{60}t\right)$$

and the coordinate x of the system (19) in the presence of stochastic excitation $\xi(t)$, described as a band limited Gaussian white noise with zero mean. In order to increase the sensitivity of the GA 231 to the variations of the fitness function, the fitness function is presented in the following form:

$$\text{Fitenss} = \frac{1}{1 + \sum_{t=T}^{t=T+T^E} (y(t) - x(t))^2} \to \max \quad (25)$$

The control system in this case has the following parameters:

$$K_i \in [0,20], i=\{P,D,I\}$$

The controller changes the gain coefficients every 0.01 seconds ($T^C$=0.01 sec) with the step of 0.1 per each coefficient. The evaluation time $T^e$ of the SSCQ 230 is taken as 4 seconds. For this example, the GA 231 population size is set to 50 chromosomes, and the number of generations the GA 231 should evolve is set to 10.

The performance of the GA 231 is shown on the time interval t∈[0,$T^E$] (first SSCQ call) is presented in FIG. 18, where the search space of the GA is specified according to Table 1. FIG. 16 shows the corresponding case where the GA search space is specified according to Table 2. The x-axis represents the generation number. The y-axis represents the values of the fitness function (25). Each point represents the fitness value of the single chromosome. In FIG. 18, the distribution of the chromosome fitness in the initial population is in the range [0.78,0.84], and after 10 generations the GA arrives at the fitness value of 0.87.

Figure 19:
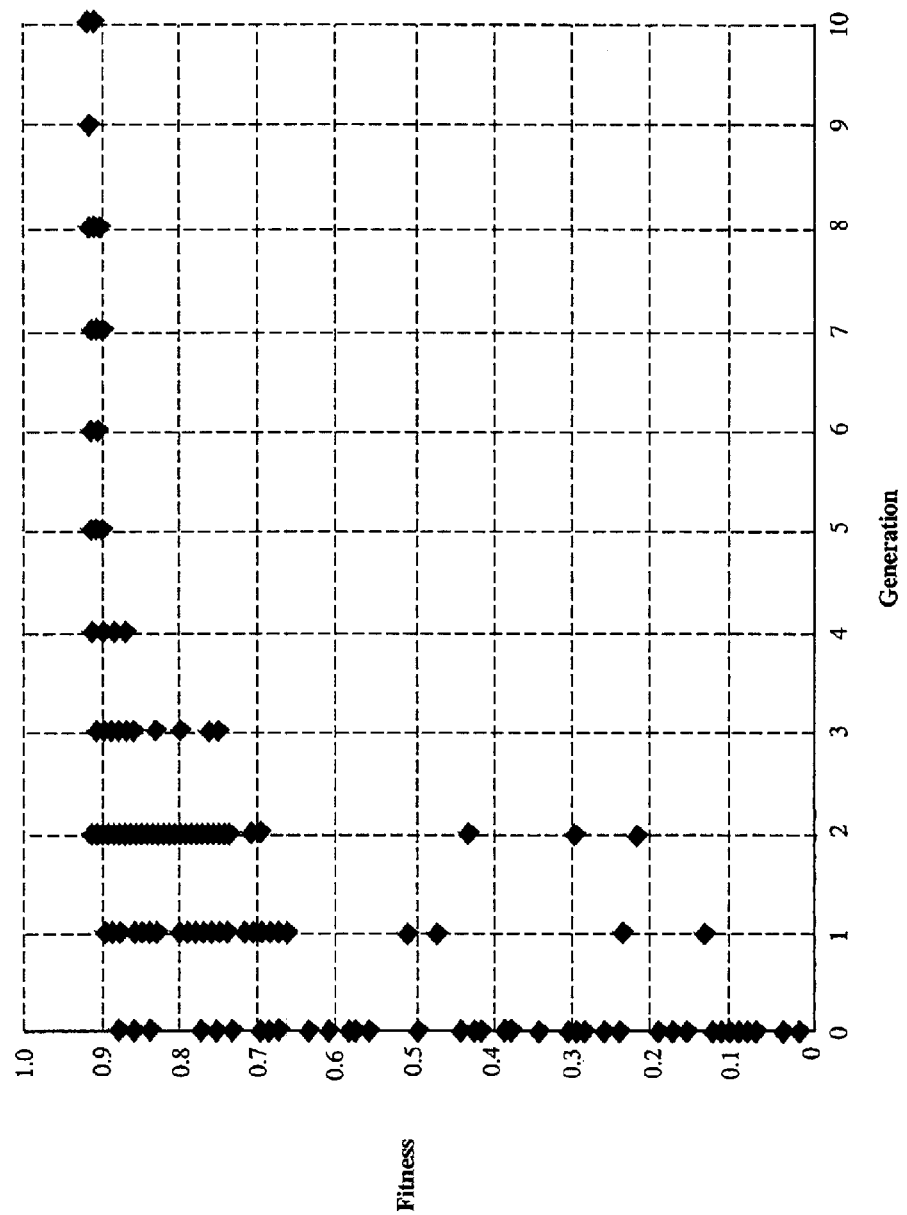
FIG. 19 shows GA optimization dynamics of SSCQ control of the Holmes-Rand dynamic system with a step-based GA (with coding according to Table 2).

In FIG. 19, the distribution of the chromosome fitness in the initial population is in the range [0,0.9], and after 10 generations the GA arrives at the fitness value of 0.92. Thus the coding according to the Table 2 gives better fitness function performance.

Results of the control of the system (19) are presented in FIGS. 20A–20N and 21A–21C based on coding was according to Table 1. FIGS. 22A–22N and 23A–23C correspond to coding according to Table 2.

Figure 20C:
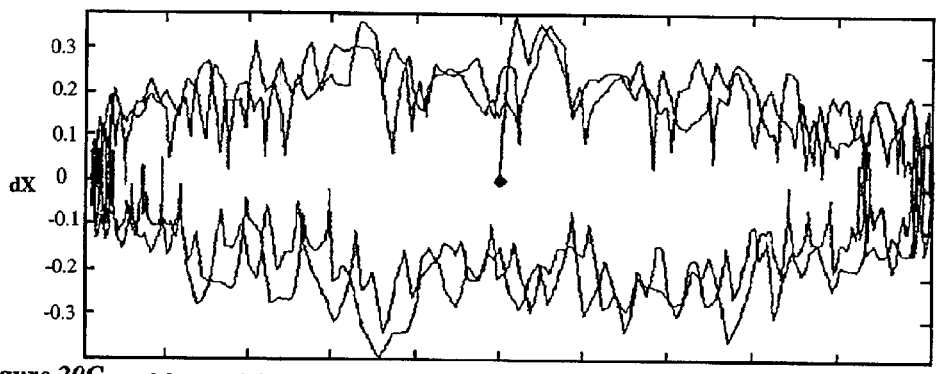
FIGS. 20A–20N are graphs that show results of control signal optimization using the GA coding method according to Table 1.

FIG. 20A shows the dynamic evolution of coordinate x of the system (19). FIG. 20B shows the dynamic evolution of the velocity $\dot{x}$ of the system of Equation (19), where the x-axis is a system coordinate x and the y-axis is a system velocity $\dot{x}$.

Figure 20E:
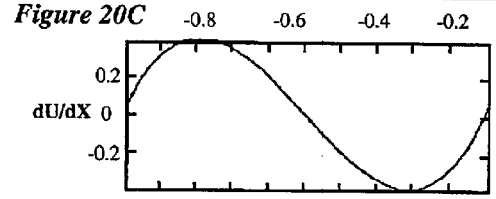
Figure 20F:
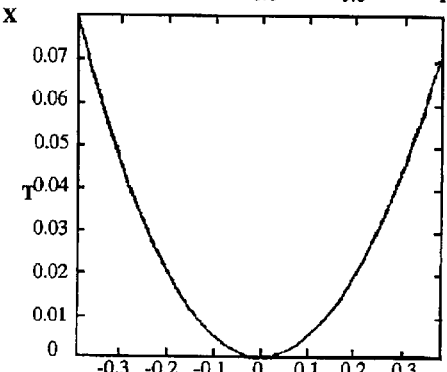
Figure 20H:
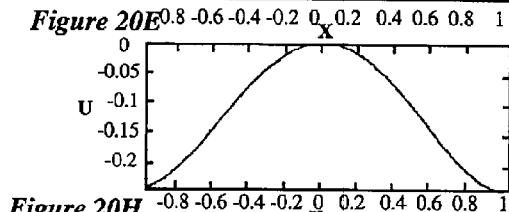
Figure 20J:
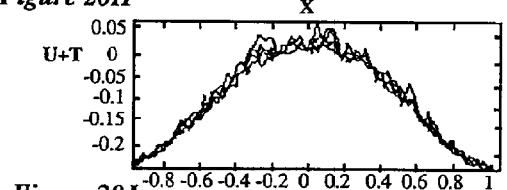
Figure 20K:
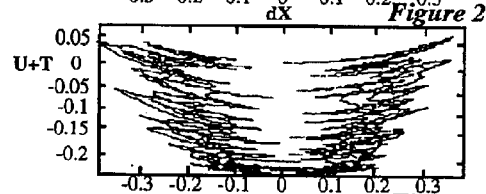

FIG. 20D shows the kinetic energy evolution of the Holmes-Rand oscillator. FIG. 20E shows the derivative of the potential energy of the Holmes-Rand oscillator phase portrait. FIG. 20F shows the velocity phase portrait of kinetic energy. FIG. 20G shows the potential energy evolution of the Holmes-Rand oscillator. FIG. 20H shows coordinate phase portraits of potential energy of the Holmes-Rand oscillator. FIG. 20I shows the total energy evolution of the Holmes-Rand oscillator, and corresponding coordinate and velocity phase portraits of total energy are shown in FIGS. 20J and 20K, respectively.

Figure 20N:
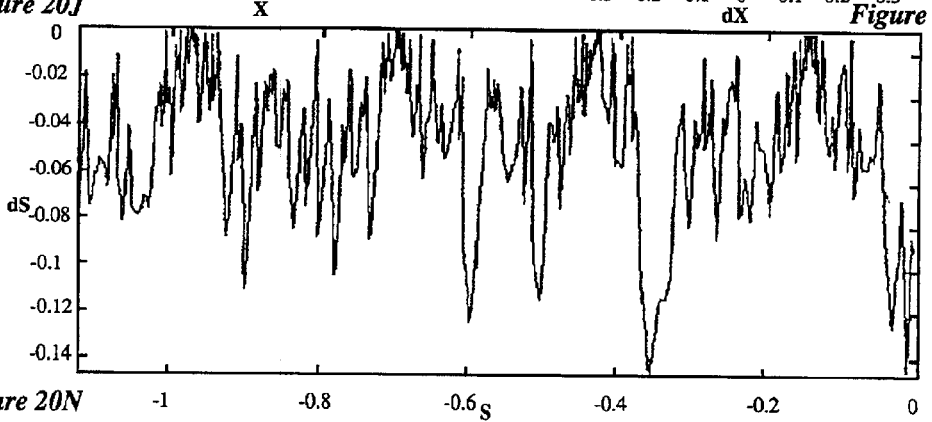

FIG. 20L shows the plant entropy production evolution. FIG. 20M shows the plant entropy evolution. FIG. 20N shows the phase portrait of the plant entropy of the Holmes-Rand oscillator.

Figure 21C:
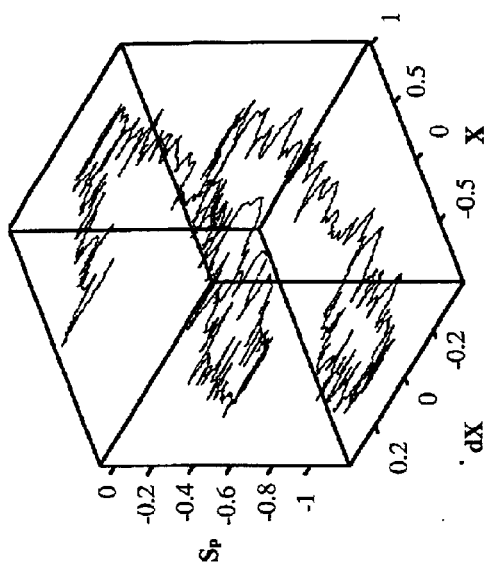
FIGS. 21A–21C are graphs that show 3D results of control signal optimization using the GA coding method according to Table 1.
Figure 21B:
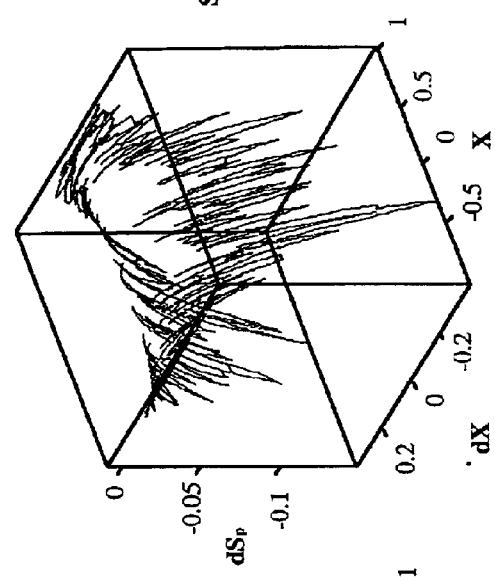
Figure 21A:
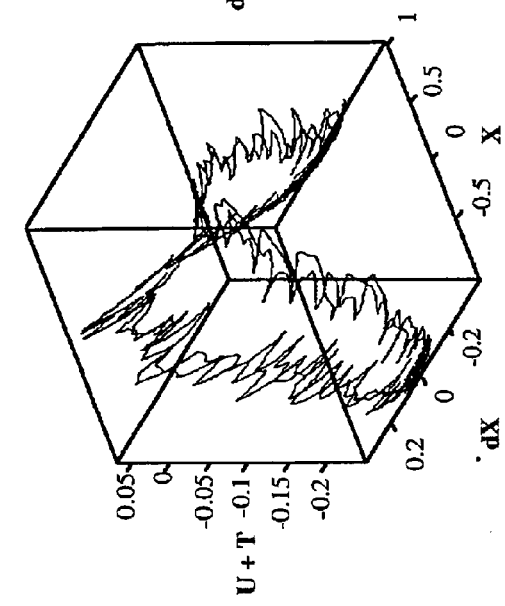

FIGS. 21A–21C show simulation results corresponding to FIGS. 20A–20N. The x-axis and y-axis on the graphs of the FIGS. 21A–21C are the coordinate x and velocity $\dot{x}$. FIG. 21A shows the total energy of the attractor. FIG. 21B shows the entropy production of the attractor. FIG. 21C shows the entropy of the attractor.

Figure 22C:
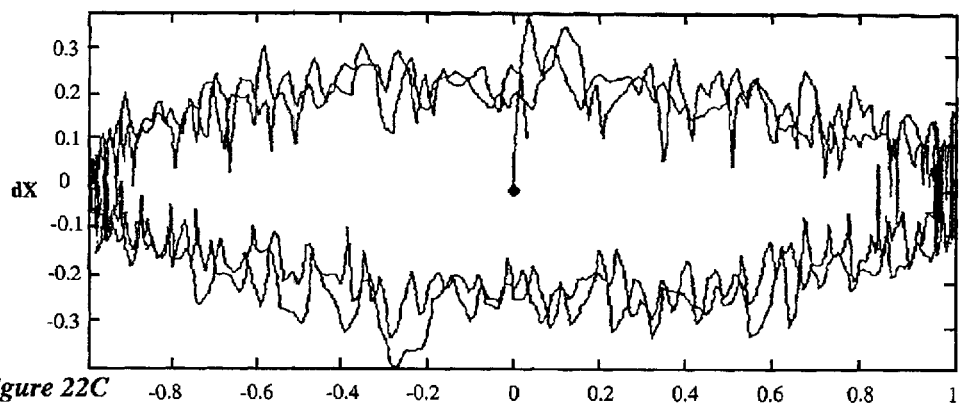
FIGS. 22A–22N are graphs that show results of control signal optimization using the GA coding method according to Table 2.

FIG. 22A shows the dynamic evolution of coordinate x of the system (19). FIG. 22B shows the dynamic evolution of the velocity $\dot{x}$ of the system of Equation (19), where the x-axis is a system coordinate x and the y-axis is a system velocity $\dot{x}$.

Figure 22E:
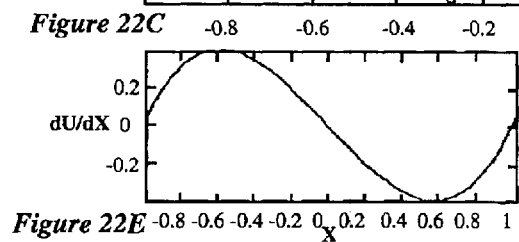
Figure 22F:
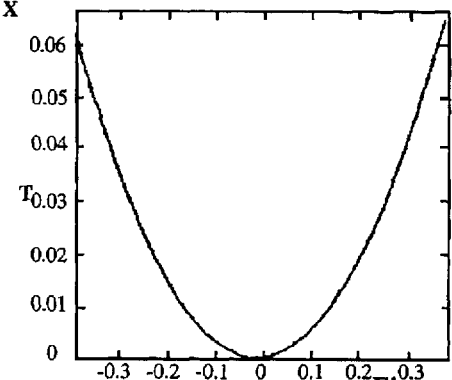
Figure 22H:
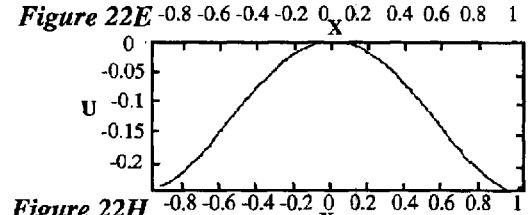
Figure 22J:
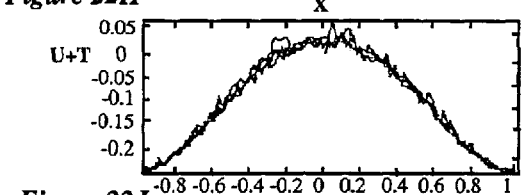
Figure 22K:
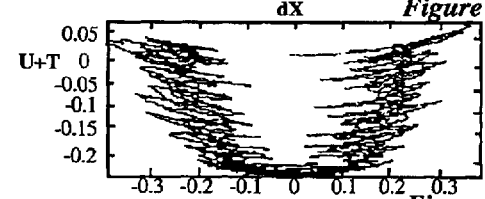

FIG. 22D shows the kinetic energy evolution of the Holmes-Rand oscillator. FIG. 22E shows the derivative of the potential energy of the Holmes-Rand oscillator phase portrait. FIG. 22F shows the velocity phase portrait of kinetic energy. FIG. 22G shows the potential energy evolution of the Holmes-Rand oscillator. FIG. 22H shows coordinate phase portraits of potential energy of the Holmes-Rand oscillator. FIG. 22I shows the total energy evolution of the Holmes-Rand oscillator, and corresponding coordinate and velocity phase portraits of total energy are shown in FIGS. 22J and 22K, respectively.

Figure 22N:
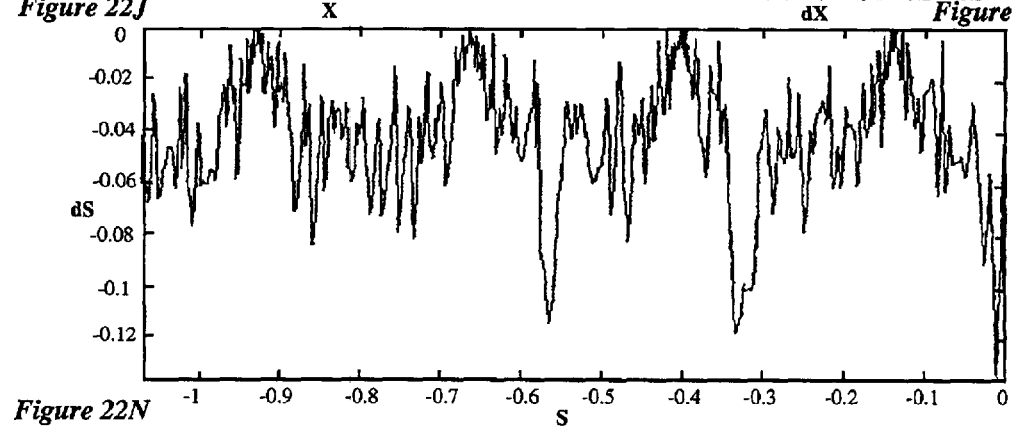

FIG. 22L shows the plant entropy production evolution. FIG. 22M shows the plant entropy evolution. FIG. 22N shows the phase portrait of the plant entropy of the Holmes-Rand oscillator.

Figure 23C:
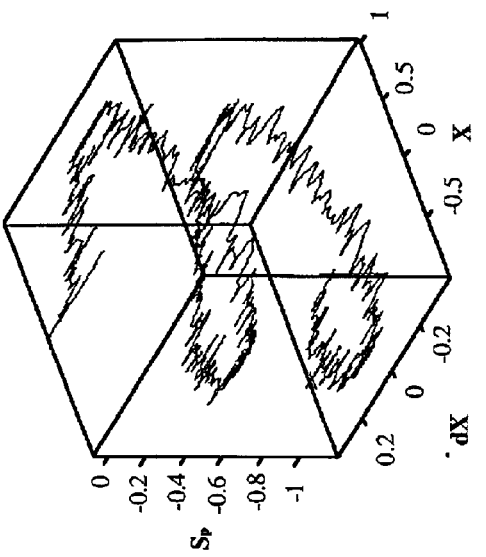
FIGS. 23A–23C are graphs that shows results of control signal optimization using the GA coding method according to Table 2.
Figure 23B:
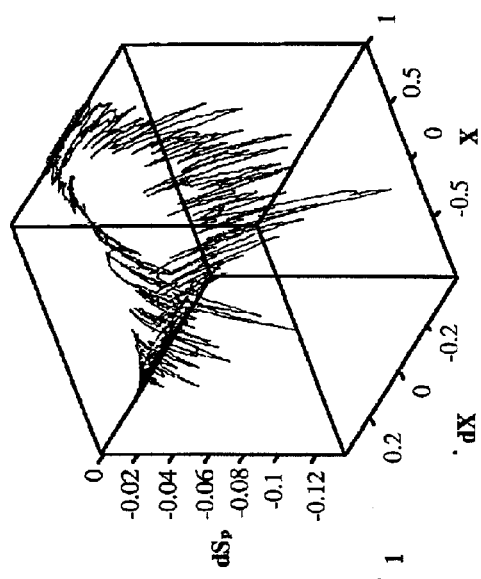
Figure 23A:
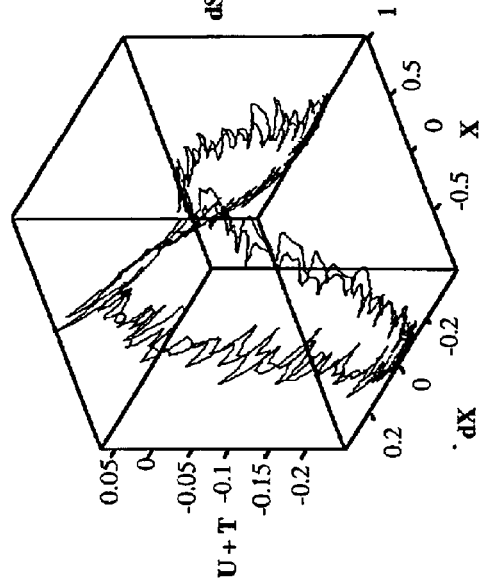

FIGS. 23A–23C show simulation results corresponding to FIGS. 22A–22N. The x-axis and y-axis on the graphs of the FIGS. 23A–23C are the coordinate x and velocity $\dot{x}$. FIG. 23A shows the total energy of the attractor. FIG. 23B shows the entropy production of the attractor. FIG. 23C shows the entropy of the attractor.

The results presented in FIGS. 20A–N, 21A–C, 22A–N and 23A–C show the good performance of SSCQ control of the system (19) in the presence of noise using both approaches. More analysis of these results is presented in FIGS. 24–28.

Figures 24A, 24B, 24C:
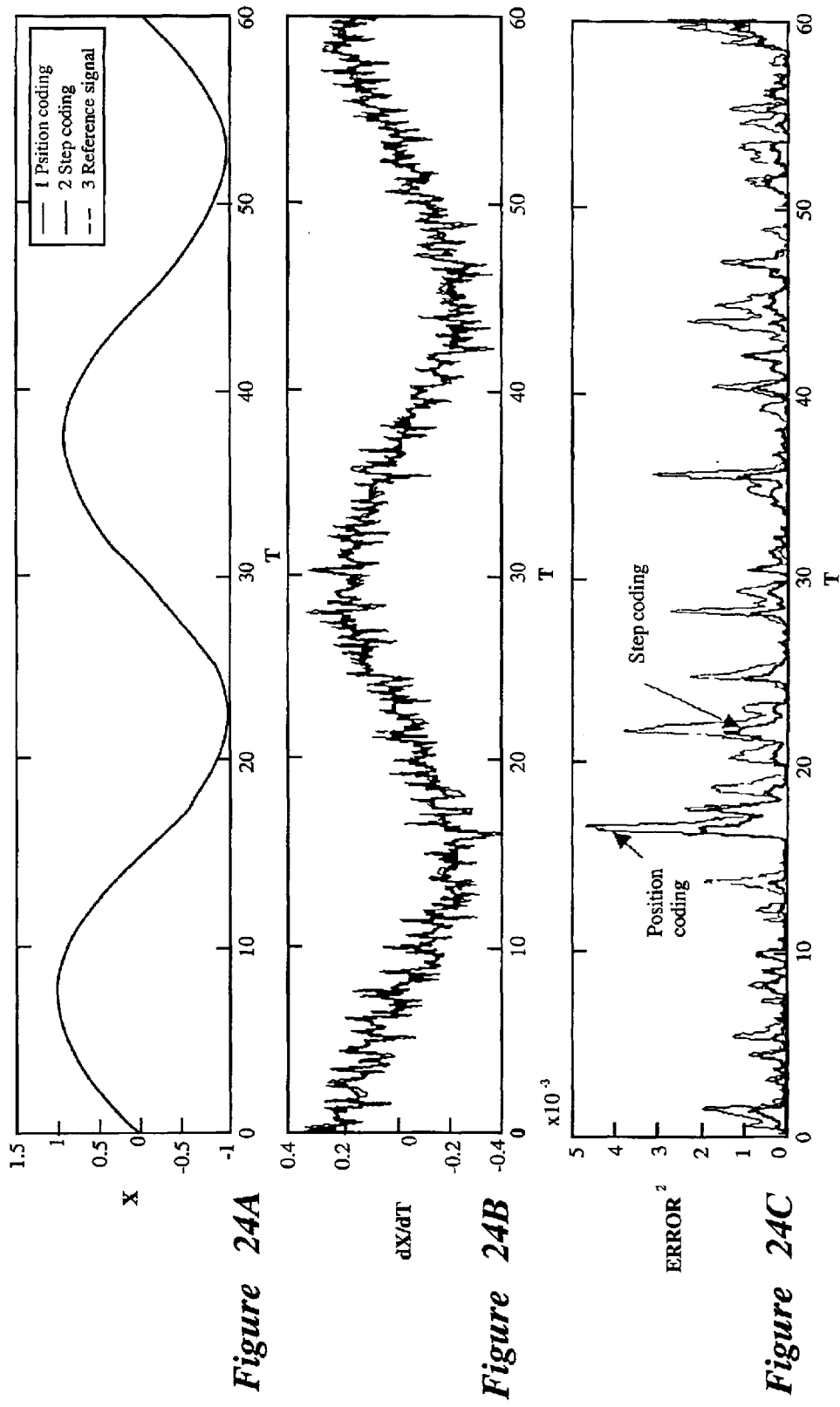
FIGS. 24A–24C are graphs that show comparisons, on an interval between 0 and 60 seconds, of control using the coding method according to Table 1 and the coding method according to Table 2.

FIGS. 24A–24C compare the dynamic results using position encoding and step coding over the interval 0 to 60 seconds. FIG. 24A shows the evolution of the x coordinate for the position-encoded and the step-encoded processes. FIG. 24B shows the evolution of the velocity $\dot{x}$ for the position-encoded and the step-encoded processes. FIG. 24C shows the evolution of the squared control error signal for the position-encoded and step-encoded processes.

Figure 25A:
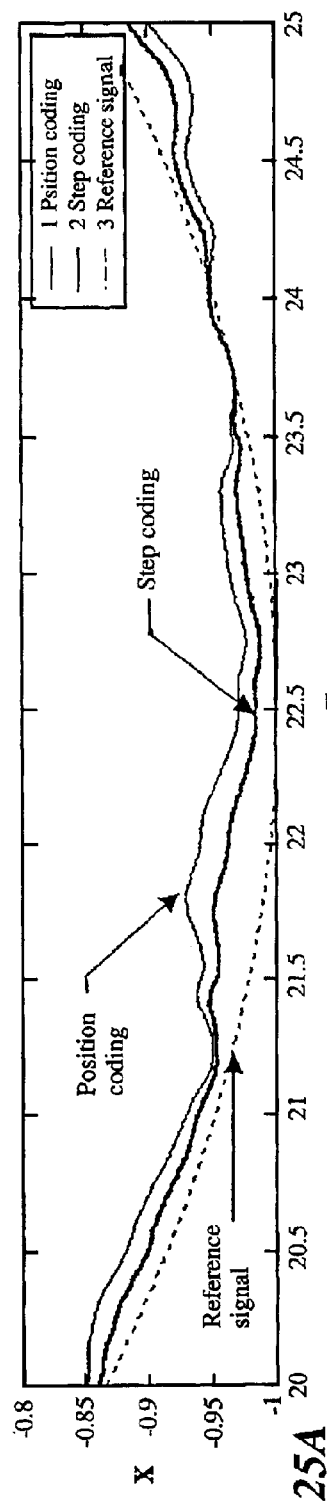
FIGS. 25A–25C are graphs that show comparisons of control, on an interval between 20 and 15 seconds, using the coding method according to Table 1 and the coding method according to Table 2.
Figure 25B:
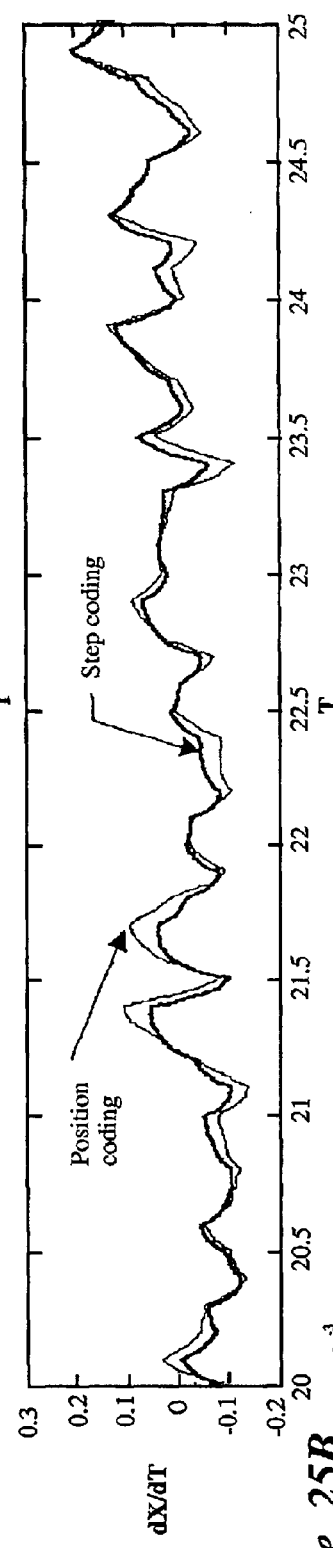
Figure 25C:
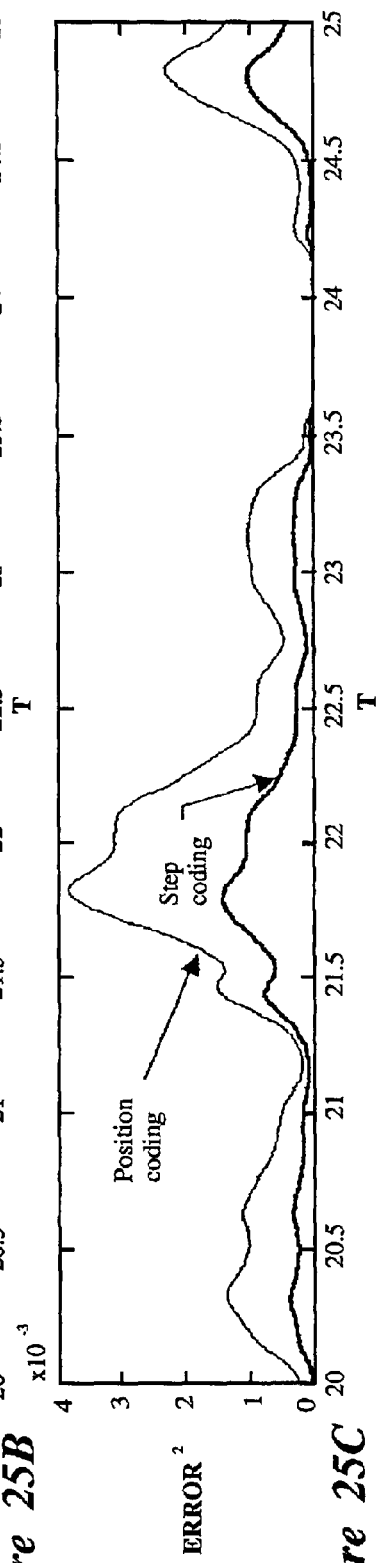

FIGS. 25A–25C compare the dynamic results using position encoding and step coding from FIGS. 24A–24C over the interval 20 to 25 seconds. FIG. 25A shows the evolution of the x coordinate for the position-encoded and the step-encoded processes. FIG. 25B shows the evolution of the velocity $\dot{x}$ for the position-encoded and the step-encoded processes. FIG. 25C shows the evolution of the squared control error signal for the position-encoded and step-encoded processes.

In particular, FIGS. 25C and 25C show using step-coding instead of position coding results in a smaller control error and thus better control performance. The smaller control error results from improved performance of the GA 430, caused by the search space reduction using the coding presented in Table 2.

Figures 26A, 26B, 26C, 26D, 26E, 26F:
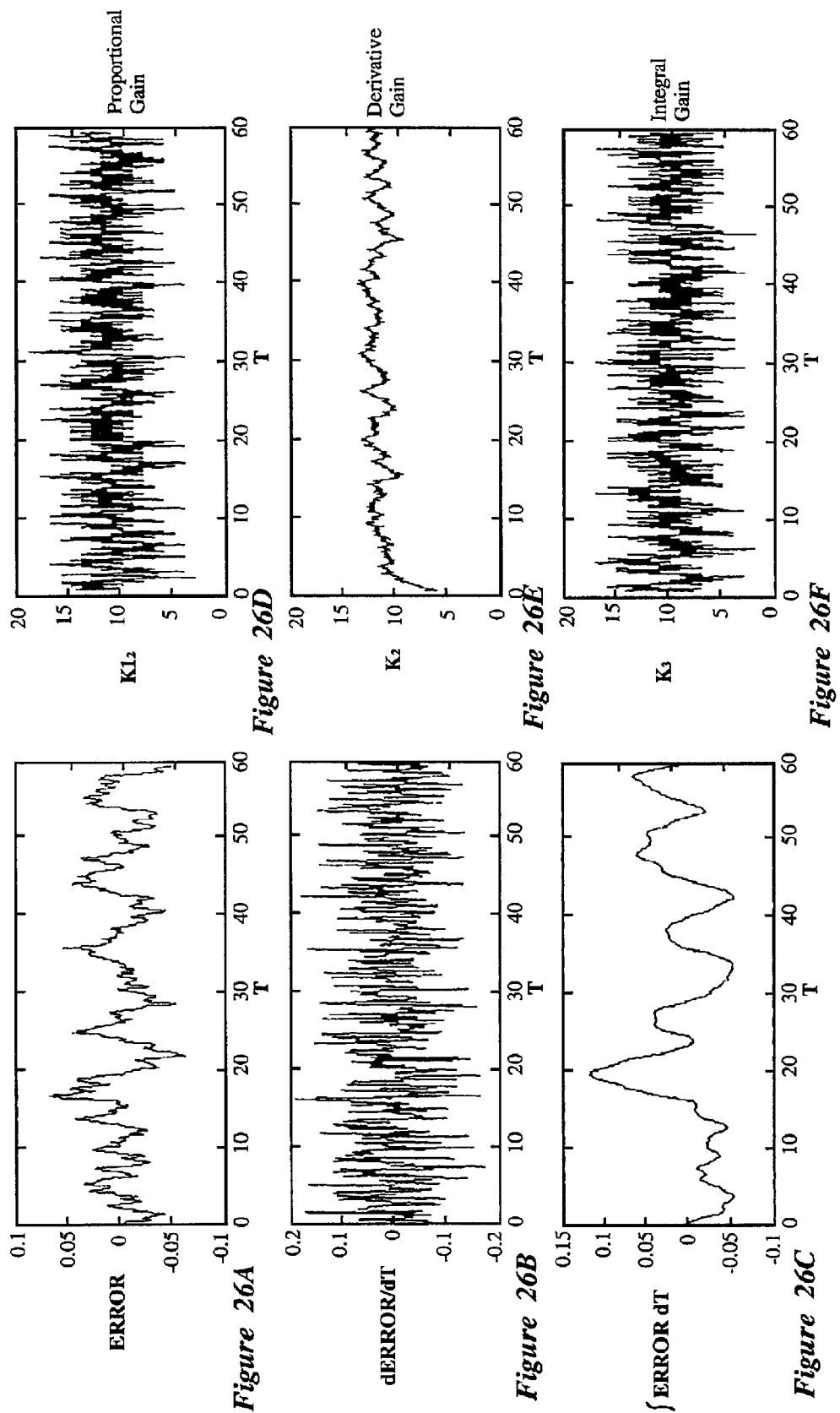
FIGS. 26A–26F are graphs that show control errors and control signals obtained using the coding method according to Table 1.

FIGS. 26A–26F show the control error evolution and the gain coefficient evolution of the PID controller for position-encoded control using the approach presented in Table 1. Similarly, FIGS. 27A–27F show the control error evolution and the gain coefficient evolution of the PID controller for step-encoded control using the approach presented in Table 2. FIGS. 26A and 27A show the error signal. FIGS. 26B and 27B show the time derivative of the error signal. FIGS. 26C and 27C show the time integral of the error signal. FIGS. 26D and 27D show the proportional gain $K_1$ of the PID controller. FIGS. 26E and 27E show the derivative gain $K_2$ of the PID controller. FIGS. 26F and 27F show the integral gain $K_3$ of the PID controller.

Figures 28A, 28B, 28C:
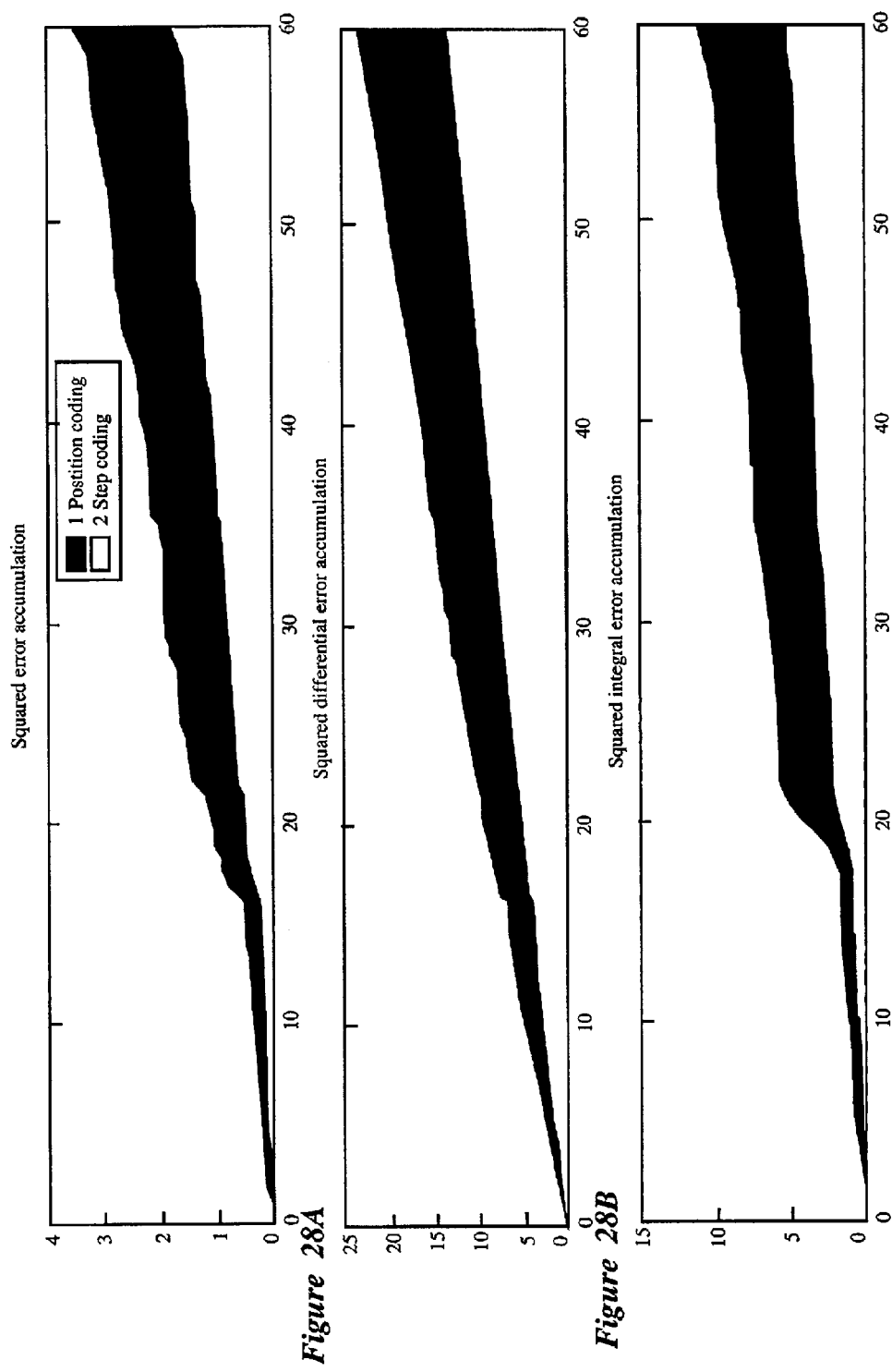
FIGS. 28A–28C are graphs that show comparison of control error accumulation.

FIGS. 28A–28C show the squared control error accumulation using both position coding and step coding. The y-axis values in FIGS. 28A–28C are calculated as a cumulative sum of the corresponding squared control errors along the simulation time. FIG. 28A shows the squared error accumulation. FIG. 28B shows the squared differential error accumulation. FIG. 28C shows the squared integral error accumulation. In FIGS. 28A–28C, the step coding approach described in the Table 2 gives approximately a 50% performance improvement, as compared to the position coding approach described in Table 1.

Figure 29B:
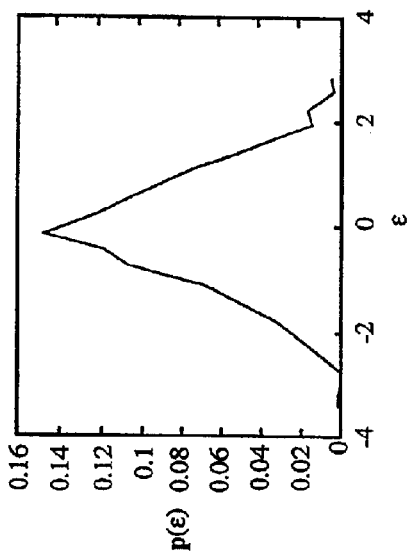
FIGS. 29A–29B are graphs that show stochastic excitation (band limited white noise with a mean of 0.0 and a variance of 1.0).
Figure 29A:
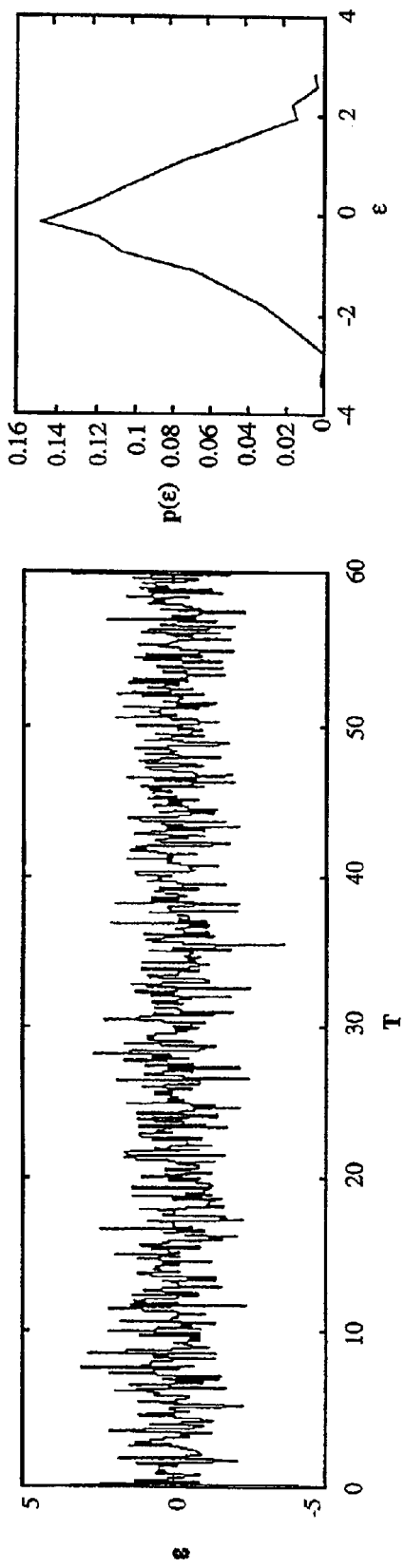

FIG. 29A shows the stochastic excitation signal used in the Holmes-Rand oscillator simulations is presented above. FIGS. 29A shows the probability distribution function of the stochastic excitation signal of FIG. 29A.

Control of an Automotive Suspension System

The control system of a active vehicle suspension is described in U.S. patent application Ser. No. 10/033,370, titled INTELLIGENT MECHATRONIC CONTROL SUSPENSION SYSTEM BASED ON SOFT COMPUTING, which is hereby incorporated by reference in its entirety.

Figure 35A:
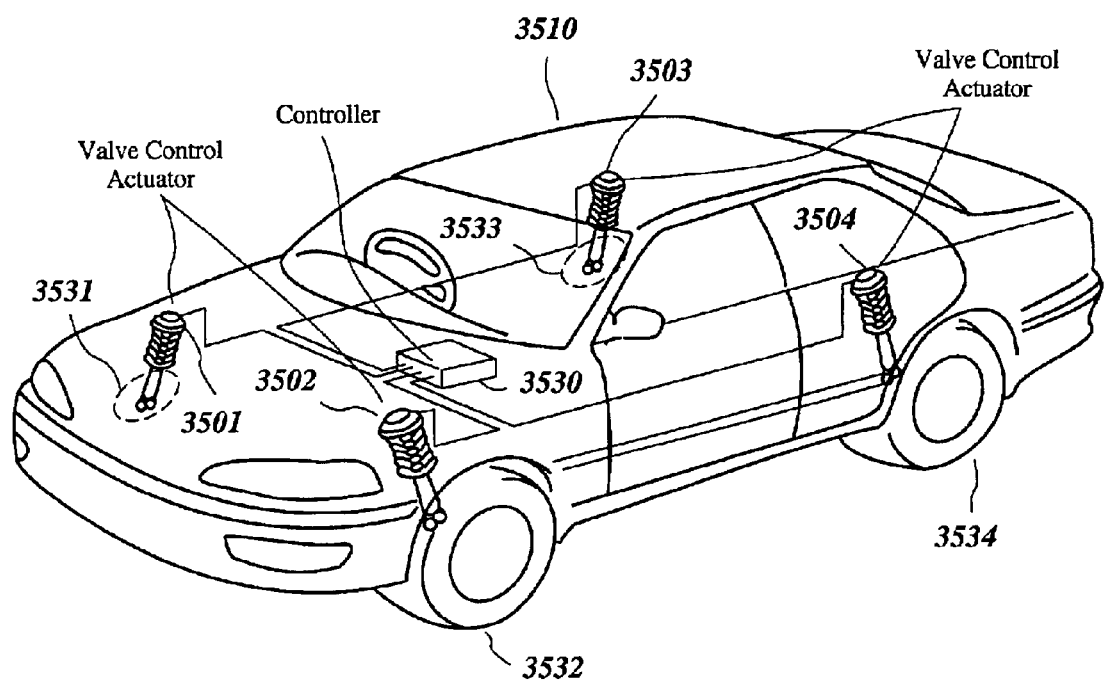
FIG. 35A shows a control damper layout for a suspension-controlled vehicle having adjustable dampers.

FIG. 35A shows a vehicle body 3510 and left-side wheels 3532 and 3534, and right-side wheels 3531 and 3533. FIG. 8A also shows dampers 3501–3504 configured to provide adjustable damping for the wheels 3531–3534 respectively. In one embodiment, the dampers 3501–3504 are electronically-controlled dampers controlled by an electronic controller 3536. In one embodiment, a stepping motor actuator on each damper controls an oil valve. Oil flow in each rotary valve position determines the damping factor provided by the damper.

Figure 35B:
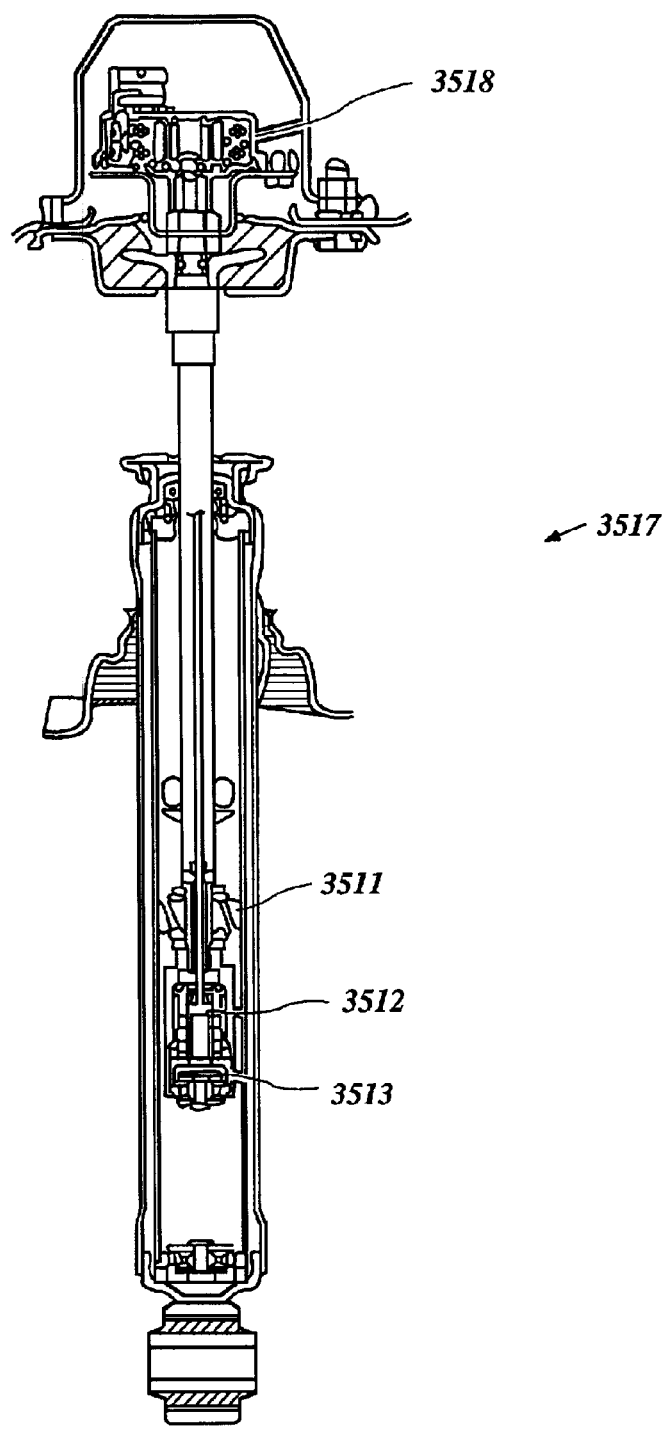
FIG. 35B shows an adjustable damper for the suspension-controlled vehicle.

FIG. 35B shows an adjustable damper 3517 having an actuator 3518 that controls a rotary valve 3512. A hard-damping valve 3511 allows fluid to in the adjustable damper 3517 to produce hard damping. A soft-damping valve 3513 allows fluid to flow in the adjustable damper 3517 to produce soft damping. The rotary valve 3512 controls the amount of fluid that flows through the soft-damping valve 3513. The actuator 3518 controls the rotary valve 3512 to allow more or less fluid to flow through the soft-damping valve 3513, thereby producing a desired damping. In one embodiment, the actuator 3518 is a stepping motor. The actuator 3518 receives control signals from the controller 3510.

Figure 35C:
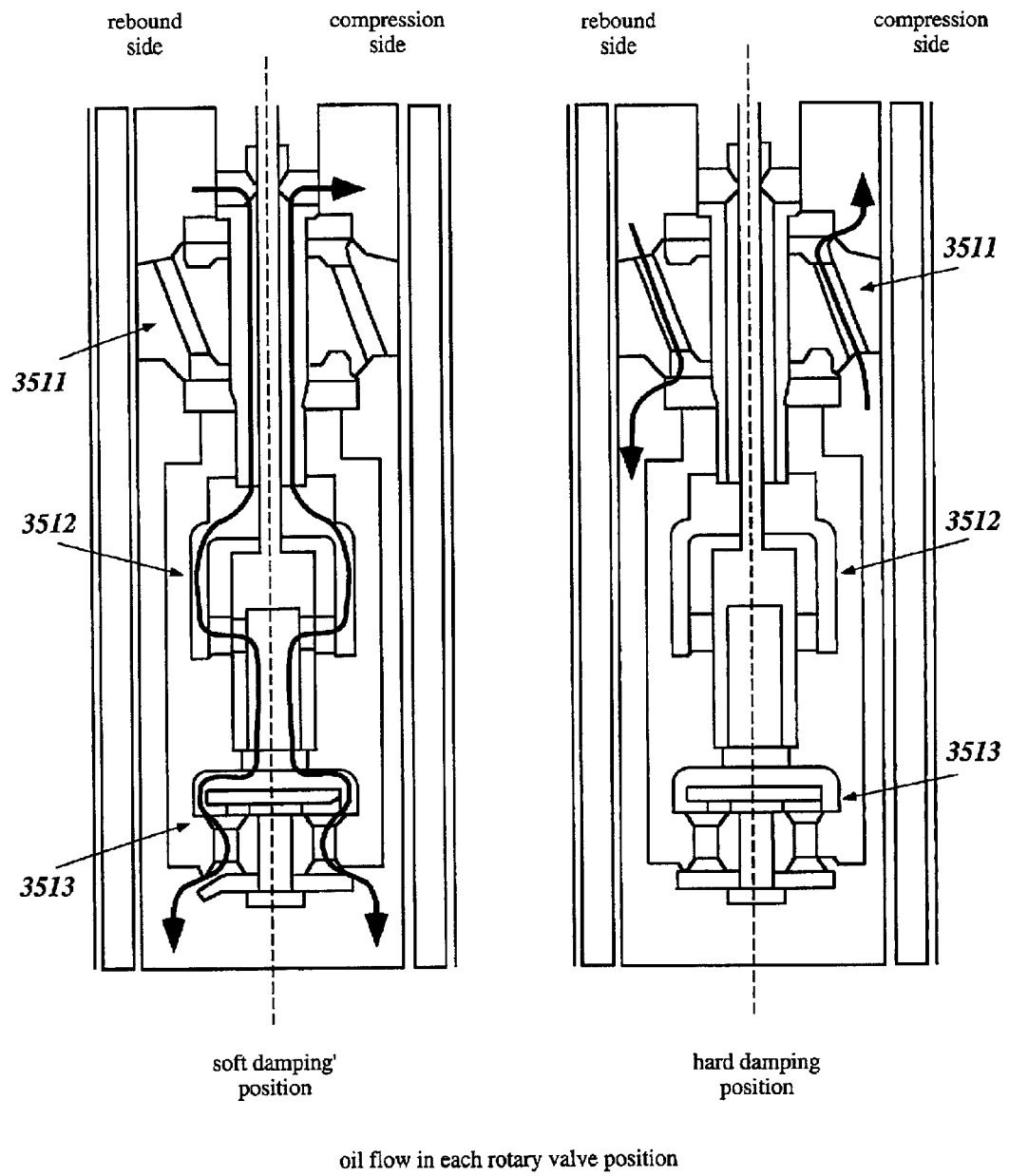
FIG. 35C shows fluid flow for soft and hard damping in the adjustable damper from FIG. 8B.

FIG. 35C shows fluid flow through the soft-damping valve 3513 when the rotary valve 3512 is opened. FIG. 35C also shows fluid flow through the hard-damping valve 3510 when then rotary valve 3512 is closed.

Figure 36:
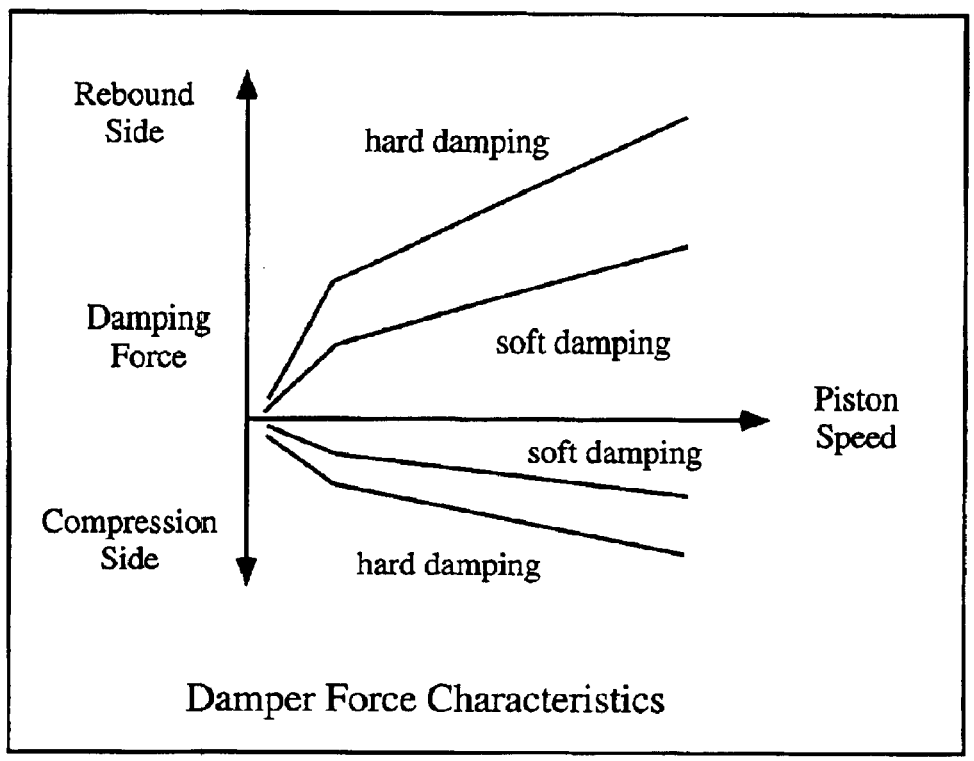
FIG. 36 shows damper force characteristics for the adjustable dampers illustrated in FIGS. 35A–C.

FIG. 36 shows damper force characteristics as damper force versus piston speed characteristics when the rotary valve is placed in a hard damping position and in a soft damping position. The valve is controlled by the stepping motor to be placed between the soft and the hard damping positions to generate intermediate damping force.

The following example demonstrates the results of the step-based coding approach to control of the vehicle dampers 3501–3504 (i.e., the vehicle shock absorbers). This approach is illustrative for suspension system application since each controlled valve can change one step position in each control cycle. In the illustrated example, the maximum controlled valve has a range of 0 to 8 and the control system has a 7.5 ms sampling period.

The following results are indicating the improved performance of the step-based coding approach on the control of the semi-active vehicle suspension. The SSCQ block in the results presented here has the following parameters (in both cases): evaluation time $T^e$=1.5 sec; 50 generations of the GA 231; and GA231 population size of 100. The fitness function optimized in both cases composed of the components shown in Table 3:

TABLE 3

| Variable | $z_o$ | $\dot{\beta}$ | $\ddot{\alpha}$ | $\ddot{z}_o$ | $\ddot{\beta}$ | $\ddot{\alpha}$ | $\dot{z}_o$ | $\dot{\beta}$ | $\dot{\alpha}$ | dS/dt |
|---|---|---|---|---|---|---|---|---|---|---|
| Variable index i in $X^{(e)(i)}$ matrix | 1 | 2 | 3 | 4 | 5 | 6 | 7 | 8 | 9 | 10 |
| Weight numerator | 0 | 1 | 0 | 1 | 1 | 0 | 1 | 1 | 0 | 0 |
| Weight term of fraction | 20 | 1246 | 1385 | 1 | 60 | 30 | 0.13 | 7.39 | 3.69 | 10 |
| Weight coefficient $w_i$ of the state variable | 0 | 1/1246 | 0 | 1 | 1/60 | 0 | 1/0.13 | 1/7.39 | 0 | 0 |

Omission of the value of the weight numerator means the exclusion of the parameter form the optimization.

According to Table 3, and the generalized fitness function equation (1), the fitness function of the automotive suspension system control can be described as:

$$\text{Fitness}^2 = \sum_{t \in [T; T^e]} \left[ \sum_i w_i (x_{it}^e)^2 \right] \to \min, \tag{26}$$

where i is the index of the state variables of the system, presented in Table 3, and were the absolute values of these components are to be minimized.

In one embodiment, $$x_{it}^e$$

can represent the frequency components of the corresponding state variables. Such frequency components can be selected according to comfort requirements of the passengers.

Figure 30A:
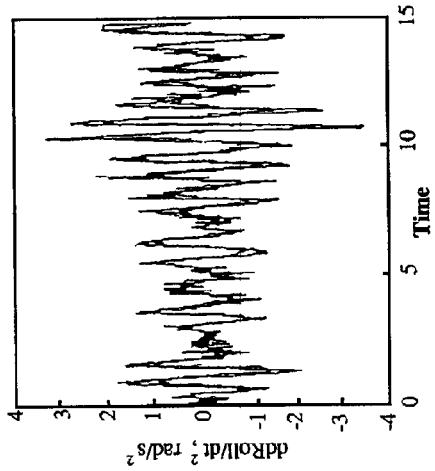
FIGS. 30A–30F are graphs that show results of control, on an interval between 0 and 15 seconds, of an automotive suspension system model.
Figure 30B:
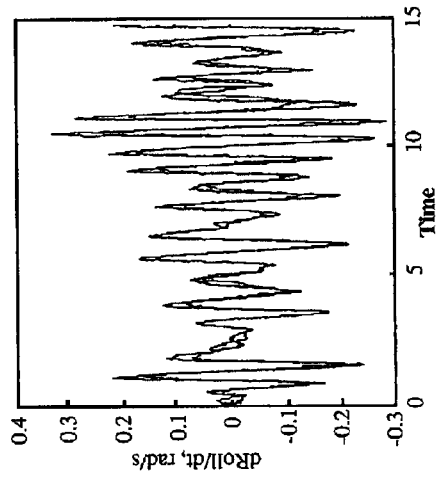
Figure 30C:
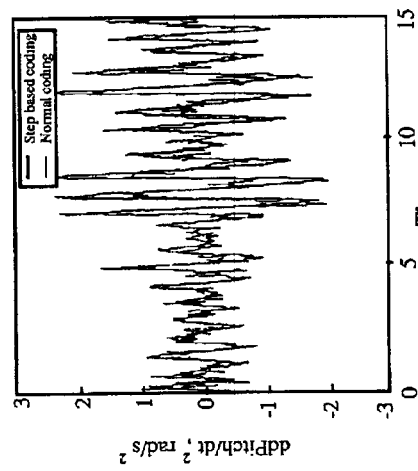
Figure 30D:
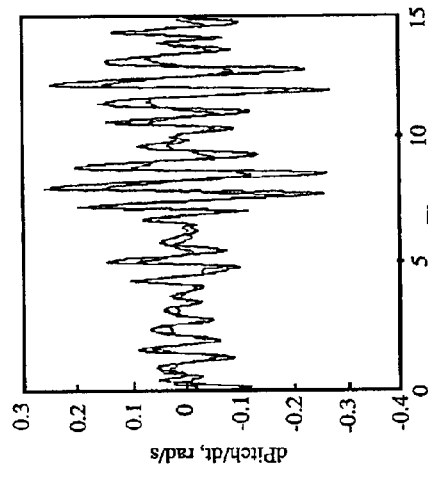
Figure 30E:
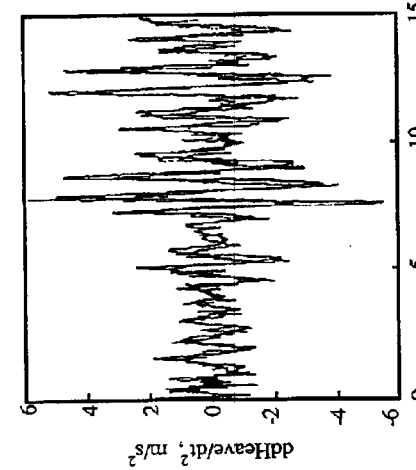
Figure 30F:
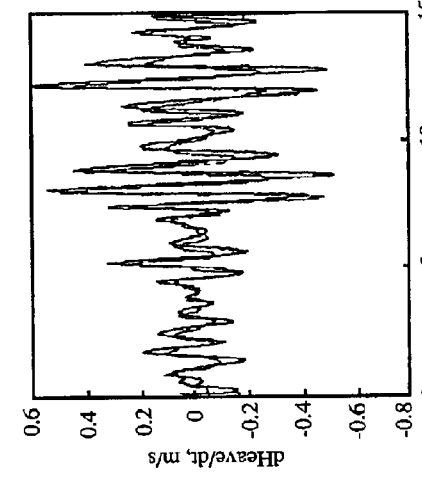
Figure 31A:
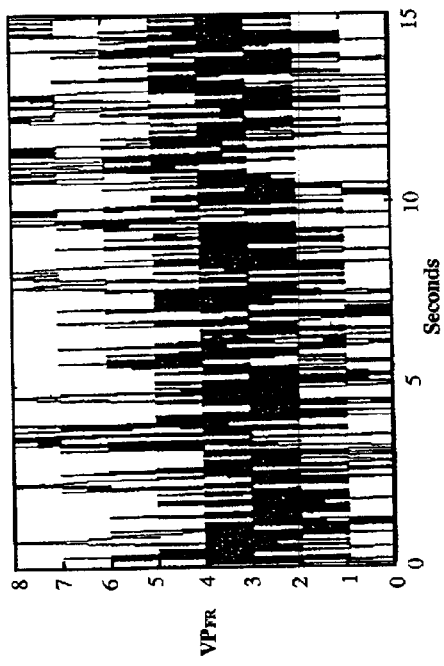
FIGS. 31A–31D are graphs that show optimal control signals, on the interval between 0 and 15 seconds, obtained to control the automotive suspension system model.
Figure 31B:
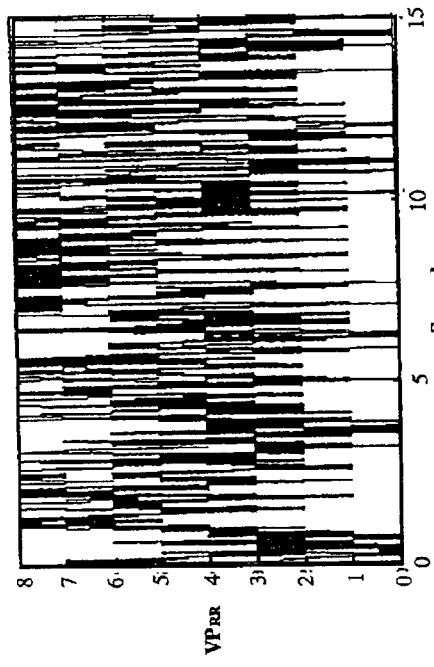
Figure 31C:
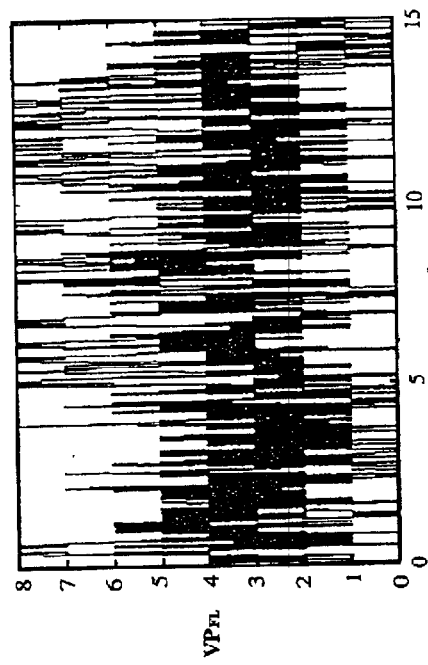
Figure 31D:
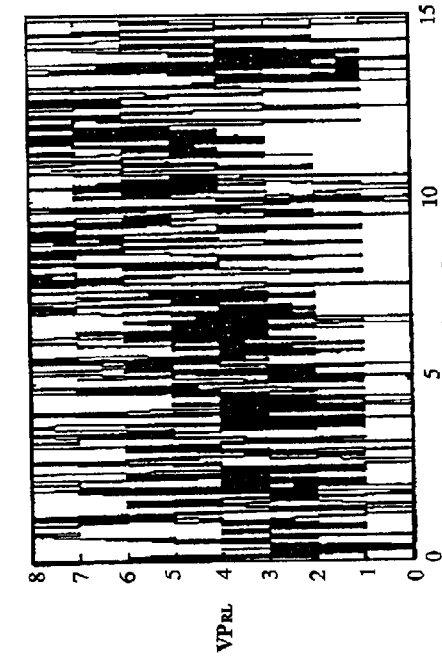

The simulation results of the optimization of the Fitness function (26) with parameters taken from the Table SS1 are presented on the FIGS. 30A–30F. FIG. 30A shows Heave acceleration output $\ddot{z}_0$. FIG. 30D shows heave velocity output $\dot{z}_0$. FIG. 30B shows pitch acceleration output $\ddot{\beta}_0$. FIG. 30E shows pitch velocity output $\dot{\beta}_0$. FIG. 30C shows roll acceleration output $\ddot{\alpha}_0$. FIG. 30F shows roll velocity output $\dot{\alpha}_0$.

FIGS. 31A–31D show the respective control signals obtained according to the code method presented in Table 1 and according the coding method presented in Table 2 for the front-left, front-right, rear-left, and rear-right shock absorbers.

FIGS. 32A–32F are the zoomed versions of the FIGS. 30A–30F, respectively for the time interval 5–7 seconds. Similarly, FIGS. 33A–33D are the zoomed versions of the FIGS. 31A–31D, respectively for the time interval 5–7 seconds.

FIGS. 30A–30F and 32A–32F show the improvements of the optimization results when the control signal is coded using the step-based method. The amplitude of the optimized fitness function components is smaller in the step-based coding case.

Figures 34A, 34B, 34C, 34D:
FIGS. 34A–34D are graphs that show fitness function component accumulation.

Comparisons of the optimization performance are shown in FIGS. 34A–34D based on cumulative error in the control signal. FIGS. 34A and 34B show the squared components of the fitness function, with the weight coefficients taken from the Table 3. The result indicates that in case of complicated fitness functions depending on many system parameters and state variables, the step-based coding approach described in Table 2 give improvement of the optimization performance comparing with the normal, direct coding method.

Although this invention has been described in terms of certain embodiments, other embodiments apparent to those of ordinary skill in the art also are within the scope of this invention. Various changes and modifications may be made without departing from the spirit and scope of the invention. Accordingly, the scope of the invention is defined by the claims that follow.

What is claimed is:

1. A self-organizing control system for optimization of a knowledge base, comprising:
   a fuzzy neural network configured to develop a knowledge base for a fuzzy controller;
   a genetic analyzer configured to develop a teaching signal for said fuzzy-logic classifier, said teaching signal configured to provide a desired set of control qualities, said genetic analyzer using chromosomes, a portion of said chromosomes being step coded; and
   a PID controller with discrete constraints, said PID controller configured to receive a gain schedule from said fuzzy controller.

2. A self-organizing control system of claim 1, further comprising a feedback module for simulation of look-up tables for said fuzzy-logic suspension controller.

3. The self-organizing control system of claim 1, wherein said genetic analyzer module uses a fitness function that reduces entropy production in a plant controlled by said PID controller.

4. The self-organizing control system of claim 1, where said genetic analyzer module comprises a fitness function that is based on physical laws of minimum entropy.

5. The self-organizing control system of claim 1, wherein said genetic analyzer is used in an off-line mode to develop said training signal.

6. The self-organizing control system of claim 1, wherein said step-coded chromosomes include an alphabet of step up, step down, and hold.

7. The self-organizing control system of claim 1, further comprising an evaluation model to provide inputs to an entropy-based fitness function.

8. The self-organizing control system of claim 7, further comprising a fuzzy controller that approximates the teaching signal using knowledge from the knowledge base.

9. A control system for a plant comprising:
   a neural network configured to control a fuzzy controller, said fuzzy controller configured to control a linear controller with discrete constraints;
   a genetic analyzer configured to train said neural network, said genetic analyzer that uses step-coded chromosomes.

10. The control system of claim 9, wherein said genetic analyzer uses a difference between a time derivative of entropy in a control signal from a learning control unit and a time derivative of an entropy inside the plant as a measure of control performance.

11. The control system of claim 10, wherein entropy calculation of an entropy inside said plant is based on a thermodynamic model of an equation of motion for said plant that is treated as an open dynamic system.

12. The control system of claim 9, wherein said genetic analyzer generates a teaching signal.

13. The control system of claim 9, wherein said linear control system produces a control signal based on data obtained from one or more sensors that measure said plant.

14. The control system of claim 13, wherein said plant comprises a suspension system and said cone or more sensors comprise angle and position sensors that measure angle and position of elements of the suspension system.

15. The control system of claim 9, wherein fuzzy rules used by said fuzzy controller are evolved using a kinetic model of the plant in an offline learning mode.

16. The control system of claim 15, wherein data from said kinetic model are provided to an entropy calculator that calculates input entropy production and output entropy production of the plant.

17. The control system of claim 16, wherein said input entropy production and said output entropy production are provided to a fitness function calculator that calculates a fitness function as a difference in entropy production rates constrained by one or more weights.

18. The control system of claim 17, wherein said genetic analyzer uses said fitness function to develop a training signal for an off-line control system, the training signal corresponding to an operational environment.

19. The control system of claim 18, wherein said step-coded chromosome includes codes for step up, step down, and hold.

20. The control system of claim 9, wherein control parameters in the form of a knowledge base from an off-line control system are provided to an online control system that, using information from said knowledge base.

21. A method for controlling a nonlinear plant by obtaining an entropy production difference between a time derivative $dS_u/dt$ of an entropy of the plant and a time derivative $dS_c/dt$ of an entropy provided to the plant from a controller; using a genetic algorithm that uses the entropy production difference as a performance function to evolve a control rule in an off-line controller with discrete constraints; and providing filtered control rules to an online controller with discrete constraints to control the plant.

22. The method of claim 21, further comprising using said online controller to control a stepping motor to change a damping factor of one or more shock absorbers in the vehicle suspension system.

23. The method of claim 21, further comprising evolving a control rule relative to a variable of the controller by using a genetic algorithm, said genetic algorithm using a fitness function based on said entropy production difference.

24. A self-organizing control system, comprising: a simulator configured to use a thermodynamic model of a non-linear equation of motion for a plant, a fitness function module that calculates a fitness function based on an entropy production difference between a time differentiation of an entropy of said plant $dS_u/dt$ and a time differentiation $dS_c/dt$ of an entropy provided to the plant by a step-constrained linear controller that controls the plant; a genetic analyzer that uses said fitness function to provide a teaching signal; a fuzzy logic classifier that determines one or more fuzzy rules by using a learning process and said teaching signal; and a fuzzy logic controller that uses said fuzzy rules to set a step control variable of the step-constrained linear controller.

25. The self-organizing control system of claim 24, wherein said genetic analyzer uses chromosomes, at least a portion of said chromosomes being step-coded.

26. A control system comprising: a step-coded genetic algorithm that computes a teaching signal using a fitness function that provides a measure of control quality based on reducing production entropy; a local entropy feedback loop that provides control by relating stability of a plant to controllability of the plant.

27. The control system of claim 26, wherein said step-coded genetic algorithm comprises step-coded chromosomes to limit the search space of the genetic algorithm.

28. The control system of claim 27, wherein a fuzzy neural network is used to create a database from said teaching signal.

29. The control system of claim 28, wherein said plant is a vehicle suspension system.

30. The control system of claim 29, wherein a knowledge base corresponds to stochastic characteristics of a selected stochastic excitation signal used to develop the teaching signal.

31. An optimization control method for a shock absorber comprising the steps of:
obtaining a difference between a time differential of entropy inside a shock absorber and a time differential of entropy given to said shock absorber from a control unit that controls said shock absorber; and
optimizing at least one control parameter of said control unit by using a discrete-constrained genetic algorithm, said discrete-constrained genetic algorithm using said difference as a fitness function, said genetic algorithm constrained by at least one step constraint of a chromosome.

32. The optimization control method of claim 31, wherein said time differential of said step of optimizing reduces an entropy provided to said shock absorber from said control unit.

33. The optimization control method of claim 31, wherein said control unit comprises a fuzzy neural network, and wherein a value of a coupling coefficient for a fuzzy rule is optimized by using said genetic algorithm.

34. The optimization control method of claim 31, wherein said control unit comprises an offline module and an online control module, said method further including the steps of optimizing a control parameter based on said discrete-constrained genetic algorithm by using said performance function, determining said control parameter of said online control module based on said control parameter and controlling said shock absorber using said online control module.

35. The optimization control method of claim 34, wherein said offline module provides optimization using a simulation model, said simulation model based on a kinetic model of a vehicle suspension system.

36. The optimization control method of claim 34, wherein said shock absorber is arranged to alter a damping force by altering a cross-sectional area of an oil passage controlled by a stepping motor, and said control unit controls said stepping motor to adjust said cross-sectional area of said oil passage.

37. A method for control of a plant comprising the steps of: calculating a first entropy production rate corresponding to an entropy production rate of a control signal provided to a model of said plant; calculating a second entropy production rate corresponding to an entropy production rate of said model of said plant; determining a fitness function for a step-constrained genetic optimizer using said first entropy production rate and said second entropy production rate; providing said fitness function to said genetic optimizer; providing a teaching output from said step-constrained genetic optimizer to a fuzzy neural network configured to produce a knowledge base; providing said knowledge base to a fuzzy controller, said fuzzy controller using an error signal and said knowledge base to produce a coefficient gain schedule; and providing said coefficient gain schedule to a step-constrained linear controller.

38. The method of claim 37, wherein said genetic optimizer minimizes entropy production under one or more constraints.

39. The method of claim 38, wherein at least one of said constraints is related to a weight based on user-perceived evaluation of control performance.

40. The method of claim 37, wherein said model of said plant comprises a model of a suspension system.

41. The method of claim 37, wherein said second control system is configured to control a physical plant.

42. The method of claim 37, wherein said second control system is configured to control a shock absorber.

43. The method of claim 37, wherein said second control system is configured to control a damping rate of a shock absorber.

44. The method of claim 37, wherein said linear controller receives sensor input data from one or more sensors that monitor a vehicle suspension system.

45. The method of claim 44, wherein at least one of said sensors is a vertical motion sensor that measures a vehicle vertical movement.

46. The method of claim 44, wherein at least one of said sensors is an accelerometer that measures a vehicle vertical acceleration.

47. The method of claim 44, wherein at least one of said sensors is an accelerometer that measures at least one component of a vehicle acceleration.

48. The method of claim 44, wherein at least one of said sensors is a length sensor that measures a change in length of at least a portion of said suspension system.

49. The method of claim 44, wherein at least one of said sensors is an angle sensor that measures an angle of at least a portion of said suspension system with respect to said vehicle.

50. The method of claim 44, wherein at least one of said sensors is an angle sensor that measures an angle of a first portion of said suspension system with respect to a second portion of said suspension system.

51. The method of claim 44, wherein said fitness function comprises a weighted combination of one or more state variables of said suspension system.

52. The method of claim 44, wherein said fitness function comprises a weighted combination of one or more variables related to passenger comfort.

53. The method of claim 44, wherein said fitness function comprises a weighted combination of one or more variables related to passenger comfort, and wherein one or more weights of said weighted combination can be adjusted according to passenger desires.

54. The method of claim 44, wherein said fitness function comprises a weighted combination of vehicle movements such that said control system will reduce one or more selected movements of said vehicle.

55. The method of claim 37, wherein said second control system is configured to control a throttle valve in a shock absorber.

56. The method of claim 37, wherein said fitness function comprises a weighted combination of one or more state variables.

57. The method of claim 37, wherein said fitness function comprises a weighted combination of one or more system variables.

58. A control apparatus comprising: off-line optimization means for determining a control parameter from an entropy production rate to produce a knowledge base from a teaching signal found by a step-constrained genetic analyzer; and online control means for using said knowledge base to develop a control parameter to control a plant.

* * * * *